US012722326B2

(12) United States Patent
Chapdelaine et al.

(10) Patent No.: US 12,722,326 B2
(45) Date of Patent: Sep. 1, 2026

(54) SYSTEM AND METHOD FOR MONITORING FRESH CONCRETE BEING HANDLED IN A CONCRETE MIXER USING TRAINED DATA PROCESSING ENGINES

(71) Applicant: Command Alkon Incorporated, Birmingham, AL (US)

(72) Inventors: Jerome Chapdelaine, Saint-Nicolas (CA); Denis Beaupre, Sainte-Catherine-de-la-Jacques (CA)

(73) Assignee: Command Alkon Incorporated, Birmingham, AL (US)

(*) Notice: Subject to any disclaimer, the term of this patent is extended or adjusted under 35 U.S.C. 154(b) by 258 days.

(21) Appl. No.: 17/544,590

(22) Filed: Dec. 7, 2021

(65) Prior Publication Data

US 2022/0355509 A1 Nov. 10, 2022

Related U.S. Application Data

(63) Continuation of application No. 17/332,298, filed on May 27, 2021, now Pat. No. 11,312,039.

(Continued)

(51) Int. Cl.
*B28C 5/42* (2006.01)
*B28C 7/02* (2006.01)

(52) U.S. Cl.
CPC ............ *B28C 5/422* (2013.01); *B28C 5/4213* (2013.01); *B28C 7/024* (2013.01); *B28C 7/026* (2013.01)

(58) Field of Classification Search
CPC ....... B28C 7/024; B28C 5/0812; B28C 5/422; B28C 5/4213; B28C 7/026; C04B 40/0028
See application file for complete search history.

(56) References Cited

U.S. PATENT DOCUMENTS 6,484,079 B2 * 11/2002 Buckelew ............... B28C 5/422 340/439
7,722,243 B2 * 5/2010 Schumacher ........... B28C 5/422 366/3

(Continued)

FOREIGN PATENT DOCUMENTS

JP 59016531 A * 1/1984 ............. B28C 5/422
WO WO-2017072223 A2 * 5/2017

OTHER PUBLICATIONS

International Search Report and Written Opinion received for PCT Patent Application No. PCT/US2022/027641, mailed May 1, 2026, 2022, 8 pages.

*Primary Examiner* — Charles Cooley
(74) *Attorney, Agent, or Firm* — Wiley Rein LLP

(57) ABSTRACT

A system for a concrete mixer having a drum receiving fresh concrete therein. The system generally has: a sensor measuring a set of measurand values indicative of a measurand associated with at least one of the fresh concrete, the drum and components of the concrete mixer; and a controller communicatively coupled to the sensor, the controller performing the steps of: accessing the set of measurand values generated by the sensor; using a trained data processing engine stored on the non-transitory memory, at least one of determining a property value indicative of a property of the fresh concrete, determining a parameter value indicative of a parameter of the drum, and determining that the set of measurand values are indicative of some operating conditions of the concrete mixer; and outputting a signal based on said determining.

16 Claims, 39 Drawing Sheets

Related U.S. Application Data

(60) Provisional application No. 63/184,986, filed on May 6, 2021.

(56) References Cited

U.S. PATENT DOCUMENTS

| | | | | |
|---|---|---|---|---|
| 8,118,473 | B2 * | 2/2012 | Compton | B28C 5/422 366/17 |
| 8,746,954 | B2 * | 6/2014 | Cooley | B28C 5/4275 366/54 |
| 8,764,272 | B2 * | 7/2014 | Hazrati | G01N 33/383 366/2 |
| 9,199,391 | B2 * | 12/2015 | Beaupre | B28C 7/024 |
| 9,702,863 | B2 * | 7/2017 | Beaupré | G01N 33/383 |
| 9,915,140 | B2 * | 3/2018 | Pelletier | E21B 43/10 |
| 10,041,928 | B2 * | 8/2018 | Berman | G01N 11/14 |
| 10,052,794 | B2 * | 8/2018 | Beaupré | B28C 7/12 |
| 10,414,067 | B2 * | 9/2019 | Datema | B28C 5/4217 |
| 10,520,410 | B2 * | 12/2019 | Beaupre | G01N 11/10 |
| 10,989,643 | B2 * | 4/2021 | Beaupre | G01N 29/222 |
| 11,041,794 | B2 * | 6/2021 | Beaupre | G01N 11/00 |
| 11,123,896 | B2 | 9/2021 | Beaupre | |
| 11,312,039 | B1 * | 4/2022 | Chapdelaine | B28C 5/422 |
| 11,679,529 | B2 * | 6/2023 | Datema | B28C 5/4244 366/2 |
| 12,510,530 | B2 * | 12/2025 | Newton | B28C 5/18 |
| 12,528,749 | B2 * | 1/2026 | Tregger | B28C 7/022 |
| 2008/0144424 | A1 * | 6/2008 | Schumacher | B28C 5/422 366/3 |
| 2009/0171595 | A1 * | 7/2009 | Bonilla Benegas | B28C 7/02 702/41 |
| 2011/0029134 | A1 | 2/2011 | Hazrati et al. | |
| 2014/0104066 | A1 * | 4/2014 | Jordan | B28C 5/4231 340/606 |
| 2015/0298351 | A1 * | 10/2015 | Beaupré | G01N 33/383 366/7 |
| 2015/0355160 | A1 * | 12/2015 | Berman | G01N 11/14 73/54.03 |
| 2017/0080600 | A1 * | 3/2017 | Dickerman | B60P 3/16 |
| 2017/0108421 | A1 * | 4/2017 | Beaupre | B28C 7/024 |
| 2017/0173822 | A1 * | 6/2017 | Beaupre | G01F 15/022 |
| 2017/0361492 | A1 * | 12/2017 | Datema | G06Q 10/06315 |
| 2018/0100791 | A9 * | 4/2018 | Beaupre | G01N 11/14 |
| 2018/0319040 | A1 * | 11/2018 | Beaupre | B01F 35/2115 |
| 2019/0204197 | A1 * | 7/2019 | Beaupre | G01N 9/24 |
| 2019/0242802 | A1 * | 8/2019 | Beaupre | G01N 11/10 |
| 2019/0344475 | A1 * | 11/2019 | Datema | B28C 5/422 |
| 2020/0078987 | A1 * | 3/2020 | Beaupre | G01N 11/14 |
| 2020/0225258 | A1 * | 7/2020 | Beaupre | G01P 3/48 |
| 2020/0230842 | A1 * | 7/2020 | Datema | B28C 7/026 |
| 2020/0232966 | A1 * | 7/2020 | Beaupre | G01N 9/16 |
| 2020/0282597 | A1 * | 9/2020 | Beaupre | C04B 40/0028 |
| 2020/0402619 | A1 * | 12/2020 | Tregger | G06Q 10/06 |
| 2021/0001765 | A1 * | 1/2021 | Beaupre | B28C 5/422 |
| 2021/0031408 | A1 * | 2/2021 | Beaupre | B28C 5/422 |
| 2021/0055195 | A1 * | 2/2021 | Beaupre | B28C 7/024 |
| 2021/0187786 | A1 * | 6/2021 | Beaupre | B28C 5/422 |
| 2022/0063133 | A1 * | 3/2022 | Van Dixhorn | B28C 7/12 |
| 2022/0355509 | A1 * | 11/2022 | Chapdelaine | B28C 7/024 |
| 2023/0264156 | A1 * | 8/2023 | Pereira | B01F 35/213 366/132 |
| 2024/0025078 | A1 * | 1/2024 | Datema | B60P 3/16 |
| 2025/0058498 | A1 * | 2/2025 | Datema | B28C 5/422 |
| 2025/0387948 | A1 * | 12/2025 | Steckling | B28C 5/422 |
| 2026/0070262 | A1 * | 3/2026 | Davies | B28C 5/422 |
| 2026/0086044 | A1 * | 3/2026 | Ghods | B28C 5/422 |

* cited by examiner

SYSTEM AND METHOD FOR MONITORING FRESH CONCRETE BEING HANDLED IN A CONCRETE MIXER USING TRAINED DATA PROCESSING ENGINES

CROSS-REFERENCE TO RELATED APPLICATIONS

This application is a continuation of U.S. application Ser. No. 17/332,298, filed 27 May 2021 ("the '298 application"), which claims the benefit of U.S. provisional application No. 63/184,986, filed 6 May 2021 ("the '986 provisional"). The '298 application and the '986 provisional are hereby incorporated by reference as though fully set forth herein.

FIELD

The improvements generally relate to systems and methods for determining a value of a property of fresh concrete being handled in a concrete mixer, and more particularly to such systems and methods involving machine learning, artificial intelligence and/or trained engines.

BACKGROUND

Fresh concrete is formed of a mixture of ingredients including at least cement-based material and water in given proportions. The ingredients are typically transported inside a drum of a concrete mixer truck where the fresh concrete mixture can be mixed and then agitated prior to being discharged at a job site. Care is required for any batch of fresh concrete to meet required strength expectations. For instance, adding too few or too much water or any other ingredients can adversely affect the quality of fresh and cured concrete. As such, properties including rheological properties (e.g., viscosity, yield and slump), density, and air content can be advantageously monitored. Alternatively or additionally, mixing the ingredients in a dirty drum or otherwise unsatisfactorily mixing the ingredients can also lead to undesirable effects. To monitor as much information as possible, the concrete mixer truck is generally equipped with a plethora of sensors monitoring different measurands over time. These sensors can lead to significant data sets which require processing to assess current values of some monitored properties of the fresh concrete being handled in the drum of the mixer truck in real time or quasi-real time. Although existing sensor information processing techniques have been found to be satisfactory to a certain degree, there remains room for improvement.

SUMMARY

In an aspect of the present disclosure, there is described a system for a concrete mixer having a drum receiving fresh concrete therein. The system has one or more sensors monitoring values of properties associated with the fresh concrete during use of the concrete mixer. The sensor(s) can also monitor parameters associated with the drum including, but not limited to, drum speed value(s) and the like. The system has a controller communicatively coupled to the one or more sensors. The controller has a processor and a non-transitory memory having stored thereon instructions that when executed by the processor perform the steps of: accessing at least a set of values generated by the one or more sensors; and using a data processing engine stored on the non-transitory memory and being trained, determining a value indicative of a property of the fresh concrete, the drum or the concrete mixer based the at least a set of values, and generating a signal based on that determination. Depending on the embodiment, the controller may be configured to determine that the set(s) of values generated by the one or more sensors is(are) indicative of expected or abnormal fresh concrete conditions.

In some embodiments, the data processing engine is trained using supervised learning whereas in other embodiments, the data processing engine is trained using unsupervised learning. As can be understood, involving such machine learning engines can advantageously compare over the existing sensor information processing techniques. For instance, in some embodiments, the accuracy and/or speed at which the properties are determined and/or the alerts are generated, thanks to the previously trained engines, can be sought. Also, in these embodiments, such machine learning engines can continuously access and learn from training data sets so as to enable the controller to identify hidden features in the acquired set(s) of measured values, especially in applications involving a significant number of sensors each generating its own dedicated data sets.

In some embodiments, the sensors can include, but not limited to, a rheological probe measuring a set of probe pressure values indicative of pressure exerted on the rheological probe by the fresh concrete as the drum rotates, a hydraulic pressure sensor measuring a set of hydraulic pressure values indicative of pressure of hydraulic liquid used to drive rotation of the drum, a drum speed sensor monitoring instantaneous drum speed values indicative of the rotational speed of the drum as it rotates, an accelerometer measuring acceleration values indicative of the acceleration of the drum in at least the x-, the y- and/or the z-axis, a temperature sensor monitoring temperatures values indicative of the temperature of the fresh concrete, an acoustic probe assembly measuring a time duration taken by an acoustic signal to propagate through a fresh concrete sample, a vibrating device having at least a vibrating surface against the fresh concrete with a sensor measuring the amplitude of the vibration of the vibrating surface and a high-energy photon probe assembly including a high-energy photon emitter emitting high energy photons across the fresh concrete and a high energy photon receiver measuring a number of received high energy photons. Other sensors can be used depending on the embodiment.

In accordance with a first aspect of the present disclosure, there is provided a system for a concrete mixer having a drum receiving fresh concrete therein, the system comprising: a sensor measuring a set of measurand values indicative of a measurand associated with at least one of the fresh concrete, the drum and components of the concrete mixer; and a controller communicatively coupled to the sensor, the controller having a processor and a non-transitory memory having stored thereon instructions that when executed by the processor perform the steps of: accessing the set of measurand values generated by the sensor; using a trained data processing engine stored on the non-transitory memory, at least one of determining a property value indicative of a property of the fresh concrete, determining a parameter value indicative of a parameter of the drum, and determining that the set of measurand values are indicative of some operating conditions of the concrete mixer; and outputting a signal based on said determining.

In accordance with a second aspect of the present disclosure, there is provided a method for monitoring fresh concrete being handled in a drum of a concrete mixer, the method comprising: using a controller having a processor and a non-transitory memory having stored thereon instructions that when executed by the processor perform the steps of: accessing a set of measurand values generated by a sensor, the measurand values being associated with at least one of the fresh concrete, the drum and components of the concrete mixer; using a trained data processing engine stored on the non-transitory memory, at least one of determining a property value indicative of a property of the fresh concrete, determining a parameter value indicative of a parameter of the drum, and determining that the set of measurand values are indicative of operating conditions of the concrete mixer; and outputting a signal based on said determining.

In accordance with a third aspect of the present disclosure, there is provided a system for a concrete mixer having a drum receiving fresh concrete therein, the system comprising: a sensor measuring a set of measurand values indicative of a measurand associated with at least one of the fresh concrete, the drum and components of the concrete mixer; and a controller communicatively coupled to the sensor, the controller having a processor and a non-transitory memory having stored thereon instructions that when executed by the processor perform the steps of: accessing the set of measurand values generated by the sensor; using a trained data processing engine stored on the non-transitory memory, at least one of determining a property value indicative of a property of the fresh concrete, determining a parameter value indicative of a parameter of the drum, and determining that the set of measurand values are indicative of some operating conditions of the concrete mixer; and outputting a signal based on said determining.

In accordance with a fourth aspect of the present disclosure, there is provided a system for a concrete mixer having a drum receiving fresh concrete therein, the system comprising: a drum speed sensor measuring a set of drum speed values indicative of rotation speed of the drum as it rotates; and a controller communicatively coupled to the sensor, the controller having a processor and a non-transitory memory having stored thereon instructions that when executed by the processor perform the steps of: accessing the set of drum speed values generated by the sensor; using a trained data processing engine stored on the non-transitory memory, determining a cleanliness of the drum based on the measured set of drum speed values; and outputting a signal based on said determining.

In accordance with a fifth aspect of the present disclosure, there is provided a system for a concrete mixer having a drum receiving fresh concrete therein, the system comprising: an acoustic emitter transmitting an acoustic signal across the fresh concrete; a sensor measuring a set of measurand values in response to said transmitting; and a controller communicatively coupled to the sensor, the controller having a processor and a non-transitory memory having stored thereon instructions that when executed by the processor perform the steps of: accessing the set of measurand values generated by the sensor; using a trained data processing engine stored on the non-transitory memory, determining at least one of a density value indicative of density of the fresh concrete, an air content indicative of an air content value of the fresh concrete and a speed of sound value indicative of speed of sound of the acoustic signal propagating through the fresh concrete based on the set of measurand values; and outputting a signal based on said determining.

In accordance with a sixth aspect of the present disclosure, there is provided system for a concrete mixer having a drum receiving fresh concrete therein, the system comprising: a rheological mounted inside the drum and immerged in the fresh concrete, the rheological probe measuring a set of probe pressure values indicative of pressure exerted on the rheological probe by the fresh concrete as the drum rotate; and a controller communicatively coupled to the sensor, the controller having a processor and a non-transitory memory having stored thereon instructions that when executed by the processor perform the steps of: accessing the set of probe pressure values generated by the sensor; using a trained data processing engine stored on the non-transitory memory, determining a property of the fresh concrete based on the measured set of probe pressure values; and outputting a signal based on said determining.

In accordance with a seventh aspect of the present disclosure, there is provided system for a concrete mixer having a drum receiving fresh concrete therein, the system comprising: a high photon energy probe emitting high energy photons across the fresh concrete and a high photon energy counting high energy photons after propagation across the fresh concrete; a controller communicatively coupled to the sensor, the controller having a processor and a non-transitory memory having stored thereon instructions that when executed by the processor perform the steps of: accessing the count of high energy photons; using a trained data processing engine stored on the non-transitory memory, determining an air content indicative of an air content value of the fresh concrete based on the count of high energy photons; and outputting a signal based on said determining.

In accordance with an eighth aspect of the present disclosure, there is provided a system for a concrete mixer having a drum receiving fresh concrete therein, the system comprising: an acoustic emitter transmitting an acoustic signal across the fresh concrete; an acoustic receiver facing the acoustic emitter and measuring a set of measurand values in response to said transmitting; and a controller communicatively coupled to the acoustic emitter and to the acoustic receiver, the controller having a processor and a non-transitory memory having stored thereon instructions that when executed by the processor perform the steps of: accessing the set of measurand values; using a trained data processing engine stored on the non-transitory memory, determining a speed of sound value indicative of speed of sound of the acoustic signal propagating through the fresh concrete based on the set of measurand values; and outputting a signal based on said determining. In some embodiments, the signal can be indicative of an air content value indicative of air content of the fresh concrete across which the acoustic signal has propagated.

Many further features and combinations thereof concerning the present improvements will appear to those skilled in the art following a reading of the instant disclosure.

DESCRIPTION OF THE FIGURES

In the figures,

FIGS. 10B and 100 are graphs showing examples of the training data sets of FIG. 10A, in accordance with one or more embodiments;

FIG. 12 is a sectional view of a drum of a concrete mixer truck, showing an acoustic probe assembly mounted therein, in accordance with one or more embodiments;

DETAILED DESCRIPTION

Figure 1:
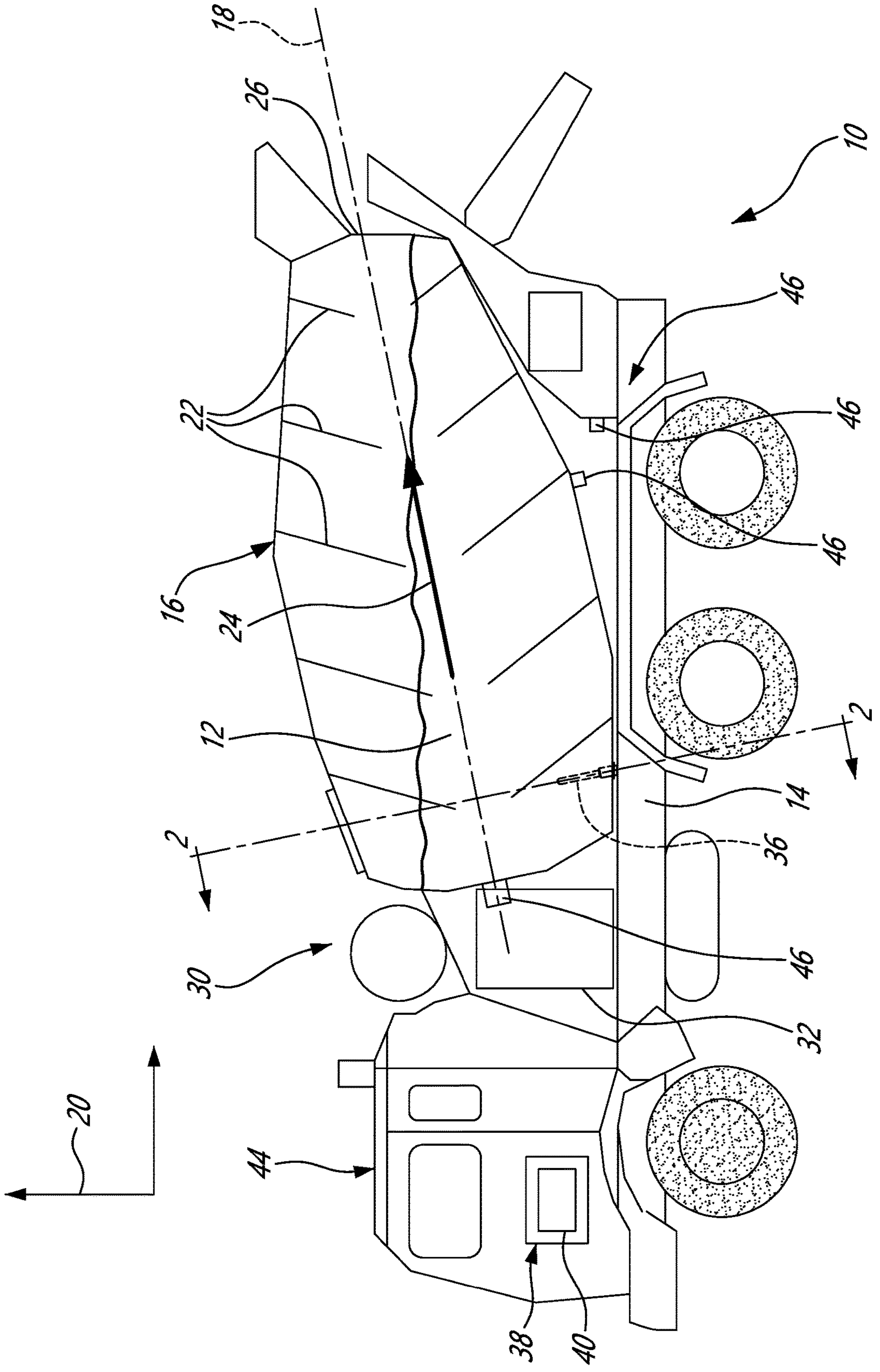
FIG. 1 is a side and sectional view of an example of a system for monitoring fresh concrete being handled in a drum of a concrete mixer, showing a rheological probe mounted inside the rotating drum, and a controller, in accordance with one or more embodiments.

FIG. 1 shows an example of a fresh concrete mixer truck 10 (hereinafter referred to as "mixer truck 10") for handling fresh concrete 12. As shown, the mixer truck 10 has a frame 14 and a rotating drum 16 which is rotatably mounted to the frame 14. As such, the drum 16 can be rotated about a rotation axis 18 which is at least partially horizontally-oriented relative to the vertical 20.

As illustrated, the drum 16 has inwardly protruding blades 22 mounted inside the drum 16 which, when the drum 16 is rotated in an unloading direction, force the fresh concrete 12 along a discharge direction 24 towards a discharge outlet 26 of the drum 16 so as to be discharged at a job site. In contrast, when the drum 16 is rotated in a mixing direction, opposite to the unloading direction, the fresh concrete 12 is kept and mixed inside the drum 16.

In some embodiments, concrete ingredients (e.g., cement, aggregates and water) are loaded in the drum 16 after which the drum 16 can be rotated a certain number of rotations in the mixing direction at a high rotational speed so as to suitably mix the concrete ingredients to one another, thus yielding the fresh concrete 12. In other embodiments, already mixed fresh concrete mixture is loaded inside the drum 16, in which case the fresh concrete 12 can still be further mixed inside the drum 16 before discharge. Once the concrete ingredients are deemed to be properly mixed, the rotational speed of the drum is generally reduced to a low rotational speed thereby agitating, rather than mixing, the fresh concrete 12 to prevent it to harden prior to arriving at the job site.

The mixer truck 10 generally has a driving device 32 which is mounted to the frame 14 for driving rotation of the drum 16. In this example, the driving device 32 is hydraulic and thus the rotation of the drum 16 is driven using a hydraulic fluid. The driving device 32 can be electrically powered, or powered in any other suitable manner, in some embodiments. The hydraulic fluid can be oil (e.g., mineral oil), water and the like. The driving device 32 exerts a torque on the drum 16, about the rotation axis 18 so as to rotate the drum 16 in any of the unloading and mixing directions. The torque exerted on the drum 16 by the driving device 32 can increase or decrease over time to accelerate or decelerate the rotation of the drum 16, as desired. Typically, the driving device 32 drives the rotation of the drum 16 at a high rotational speed during the mixing phase after which the rotational speed is reduced to a low rotational speed during the agitation phase. A hydraulic pressure sensor can be used to monitor the pressure of the hydraulic fluid as the driving device 32 drives rotation of the drum.

In this example, the fresh concrete mixer truck 10 has a system 30 for monitoring properties of the fresh concrete 12 being mixed or agitated in the drum 16. As shown in this specific example, the system 30 has at least a rheological probe 36 and a controller 38. Other types of sensors can be used in addition to, or even instead of, the rheological probe 36, depending on the embodiment.

Figure 2:
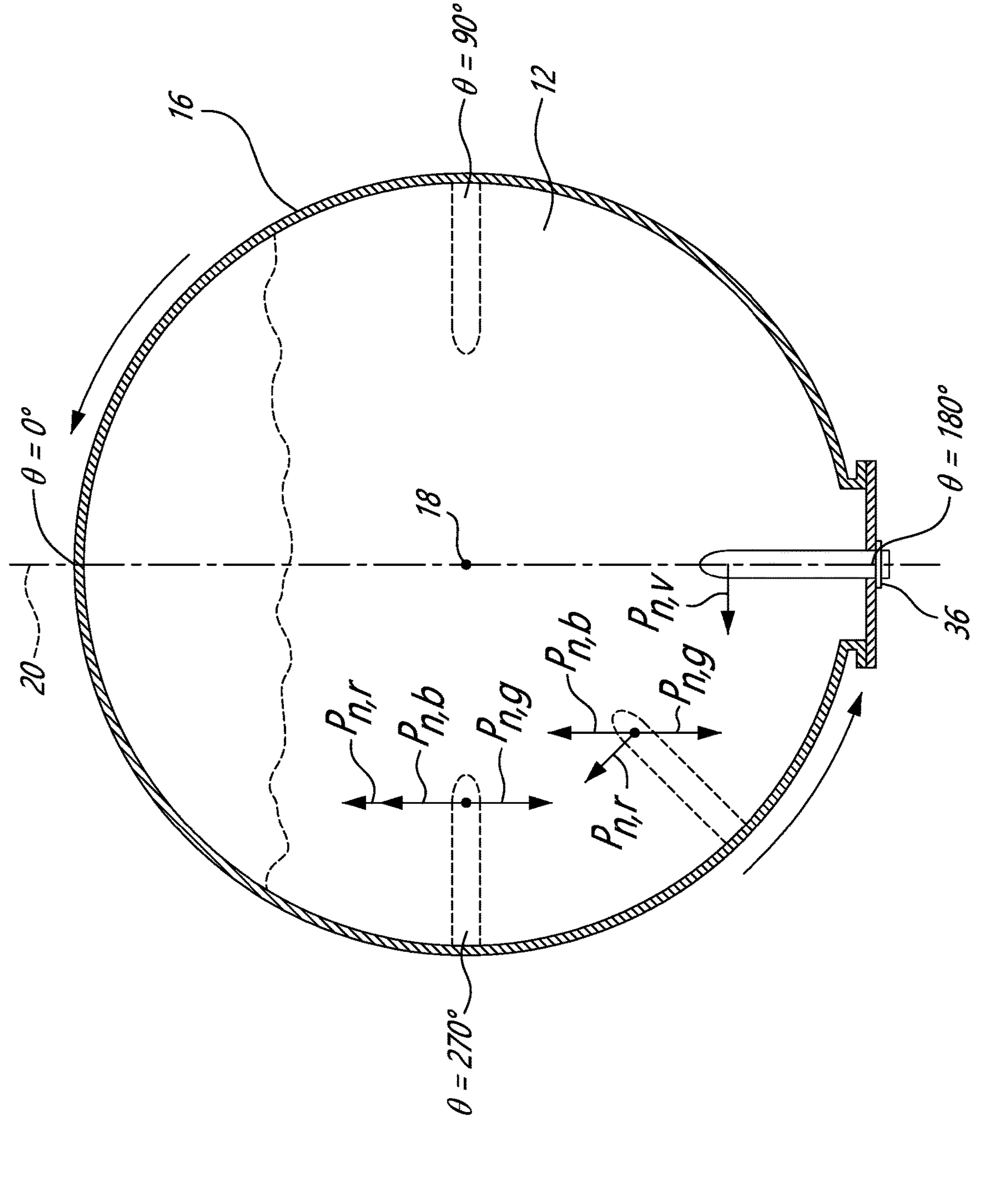
FIG. 2 is a sectional view taken along line 2-2 of FIG. 1, in accordance with one or more embodiments.

As best shown in FIG. 2, the rheological probe 36 is mounted inside the drum 16 and extends in a radial orientation of the drum 16. The rheological probe 36 is configured to measure pressure values as the probe 36 is moved circumferentially through the fresh concrete mixture by the rotation of the drum 16 about the rotation axis 18. As the rheological probe 36 is so moved, it reaches a plurality of circumferential positions at different moments in time, which can be associated with corresponding ones of the pressure values measured by the rheological probe 36. A potential example of the rheological probe 36 is described in international patent publication no. WO 2011/042880, the contents of which are hereby incorporated by reference. However, any other suitable rheological probes, devices or combination of devices that can measure pressure exerted thereon by fresh concrete can be used.

The controller 38 is communicatively coupled to the rheological probe 36. The communicative coupling can be wired, wireless, or a combination thereof depending on the embodiment. In some embodiments, the controller 38 can be wholly or partially located on the rotating drum 16, with the processed data being communicated to on-truck devices, external memory systems and/or networks. In some embodiments, the controller 38 can be wholly or partially located in a fixed manner in relation with the frame 14 of the concrete mixer truck 10, or remotely to the concrete mixer truck 10. For instance, in these embodiments, raw data generated by on-drum sensors may be communicated to the controller 38 via one or more wireless transducers 46. In such embodiments, the rheological probe 36 can be communicatively coupled to a first wireless transducer 46 rotating together with the drum 16 and which is itself in communication with a second wireless transducer 46 fixed to the frame 14. In these embodiments, the controller 38 may be in wired communication with that latter wireless transducer 46.

The controller 38 has a processor and a non-transitory memory having instructions stored thereon that when executed by the processor can access the set of probe pressure values generated by the rheological probe 36. Using one or more data processing engines stored on the non-transitory memory and being trained using supervised or unsupervised machine learning and/or artificial intelligence algorithms, the controller 38 performs a step of determining a property value indicative of a property of the fresh concrete based on the set of probe pressure values. Additionally or alternatively, the controller 38 can perform a step of determining that the set of probe pressure values is indicative of abnormal fresh concrete conditions. After the determination step(s), a signal indicative thereof is outputted. In some embodiments, the signal can be provided in the form of a numerical value or an alert that may be displayed in a cabin 44 of the concrete mixer truck, transmitted to an external network or stored onto an accessible memory system.

Other sensors can be provided depending on the embodiment. For instance, a drum speed sensor can be used to monitor instantaneous drum speed values indicative of the speed of the drum as it rotates. The drum speed sensor can be embodied by the rheological probe 36, the hydraulic pressure sensor, a periodicity sensor such as the wireless transducer pair, an inertial sensor such as an accelerometer or a gyroscope, depending on the embodiment. A temperature sensor having a sensing end immersed in the fresh concrete at least during a portion of the drum rotation may also be used to monitor temperatures values indicative of the temperature of the fresh concrete as it is mixed or agitated within the drum 16. In some embodiments, an acoustic probe assembly mounted inside the drum 16 can be used. In such embodiments, the acoustic probe assembly can be used to measure an acoustic speed value indicative of speed of sound as the acoustic signal travels within a fresh concrete sample. The acoustic probe assembly can also be configured to measure a time duration taken by an acoustic signal to propagate through the fresh concrete sample. Information relating to the measured speed of sound and/or the measured time duration and/or the speaker amplitude can be processed to determine a density value indicative of the density of the fresh concrete. Additionally or alternatively, a high-energy photon probe assembly can also be used to measure an air content value indicative of the air content of the fresh concrete. Such a high-energy photon probe assembly can include a high energy photon emitter emitting high energy photons across a fresh concrete sample and a high energy photon receiver measuring a number of received high energy photons propagated through or scattered by the fresh concrete sample. Other sensors can be used depending on the embodiment. All of these sensors can be directly or indirectly communicatively coupled to the controller 38 for data processing and/or storing, as will be discussed below.

The controller 38 can be provided as a combination of hardware and software components. The hardware components can be implemented in the form of a computing device 300, an example of which is described with reference to FIG. 3. Moreover, the software components of the controller 38 can be implemented in the form of a software application 400, an example of which is described with reference to FIG. 4.

Figure 3:
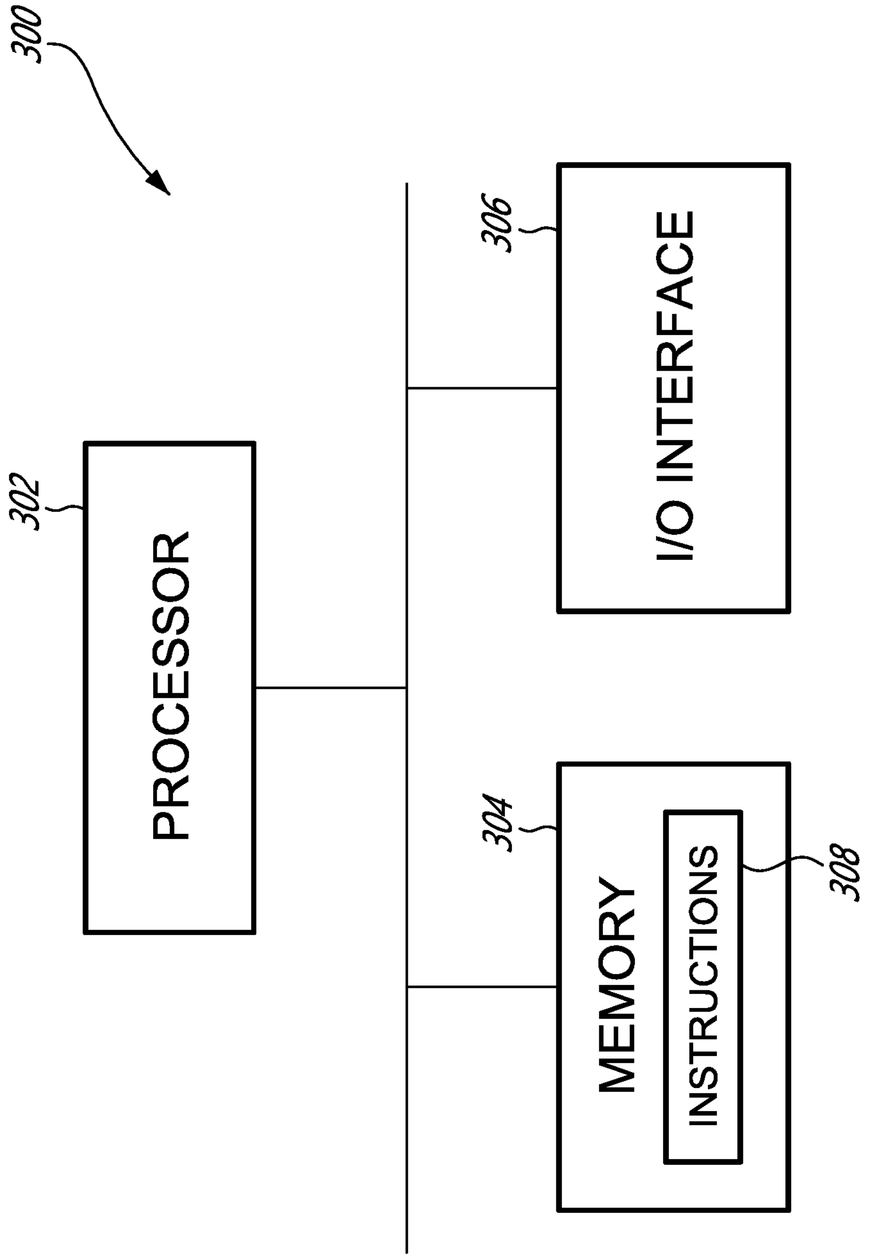
FIG. 3 is a schematic view of an example of a computing device of the controller of FIG. 1, in accordance with one or more embodiments.

Referring to FIG. 3, the computing device 300 can have a processor 302, a memory 304, and I/O interface 306. Instructions 308 for monitoring one or more properties of the fresh concrete or of the drum (e.g., drum speed value) and/or for generating alerts when some conditions are met (or unmet) can be stored on the memory 304 and accessible by the processor 302 when required.

The processor 302 can be, for example, a general-purpose microprocessor or microcontroller, a digital signal processing (DSP) processor, an integrated circuit, a field-programmable gate array (FPGA), a reconfigurable processor, a programmable read-only memory (PROM), or any combination thereof.

The memory 304 can include a suitable combination of any type of computer-readable memory that is located either internally or externally such as, for example, random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like.

Each I/O interface 306 enables the computing device 300 to interconnect with one or more input devices, such as the rheological probe(s) 36, hydraulic pressure sensor(s), drum speed sensor(s), accelerometer(s), gyroscope(s), acoustic probe assembly(ies), high energy photon probe assembly (ies) and the like, or with one or more output devices such as cabin-mounted computing device(s), display(s), remote memory system(s) and/or external network(s).

Each I/O interface 306 enables the controller 38 to communicate with other components, to exchange data with other components, to access and connect to network resources, to server applications, and perform other computing applications by connecting to a network (or multiple networks) capable of carrying data including the Internet, Ethernet, plain old telephone service (POTS) line, public switch telephone network (PSTN), integrated services digital network (ISDN), digital subscriber line (DSL), coaxial cable, fiber optics, satellite, mobile, wireless (e.g. Wi-Fi, WiMAX), SS7 signaling network, fixed line, local area network, wide area network, and others, including any combination of these.

Figure 4:
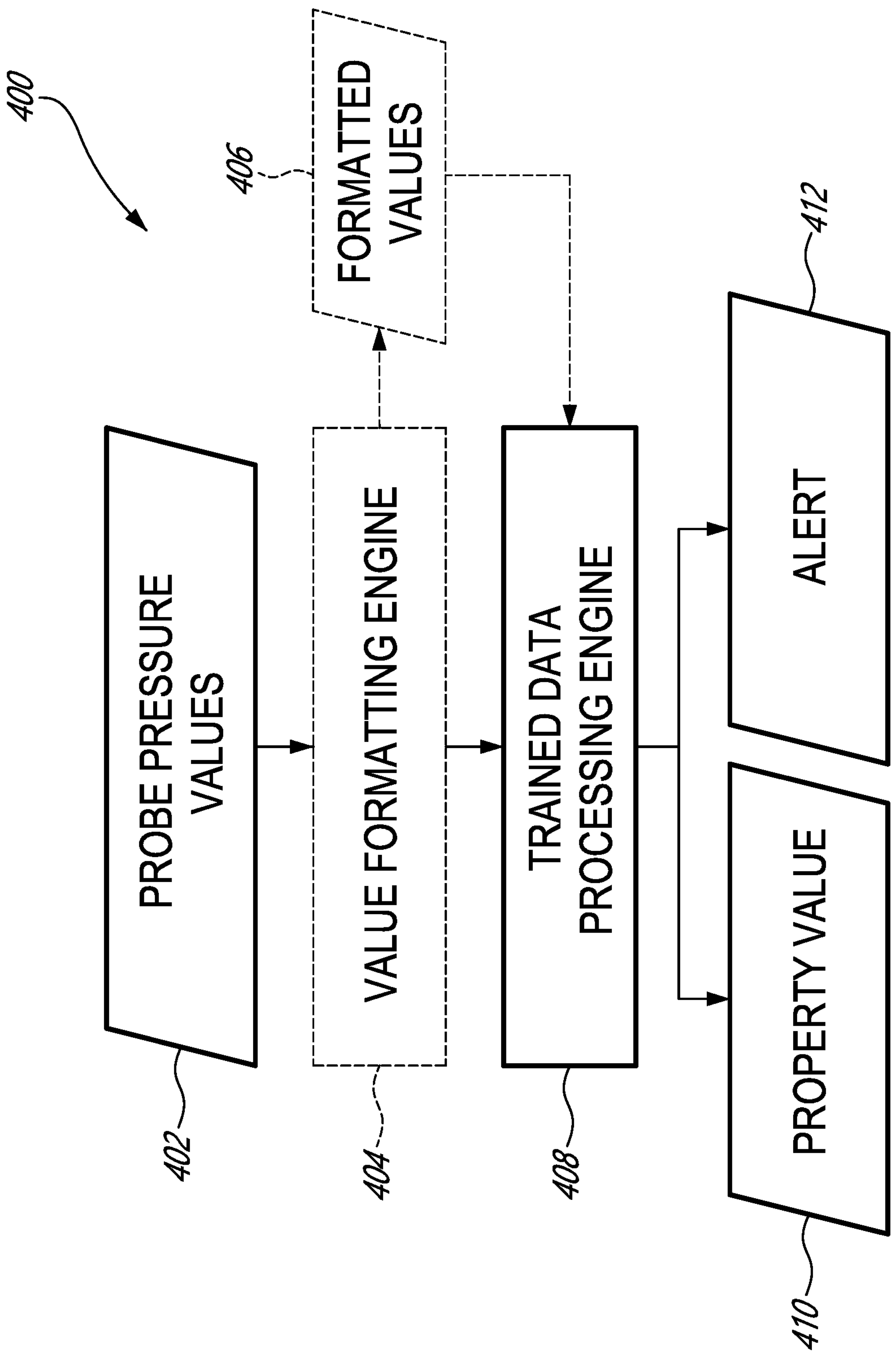
FIG. 4 is a schematic view of an example of a software application of the controller of FIG. 1, in accordance with one or more embodiments.

FIG. 4 shows an example of the software application 400 that can be executed by the computing device 300. As shown, the software application 400 can first receive a set of probe pressure values 402 (hereinafter "the probe pressure values 402"). In some embodiments, the probe pressure values 402 have been measured during a portion of a drum rotation, however, in some other embodiments the probe pressure values 402 have been measured during more than one drum rotation. The probe pressure values 402 can be received directly from the rheological probe or from an accessible memory system, depending on the embodiment. In some embodiments, the software application 400 has a value formatting engine 404 which when the probe pressure values are not suitably formatted outputs formatted values 406 for subsequent processing and/or storing. As depicted, the software application 400 has a trained data processing engine 408 which receives directly or indirectly the raw probe pressure values 402 and/or the formatted probe pressure values 406. The trained data processing engine 408 is configured to access the probe pressure values 402, to perform at least one of determining a property value indicative of a property of the fresh concrete based on the set of probe pressure values and determining that the set of probe pressure values is indicative of abnormal fresh concrete conditions, and to output a signal based on the determination step(s). In some embodiments, the outputted signal is indicative of the determined property value 410. Additionally or alternatively, the outputted signal is indicative of an alert 412 when the probe pressure values 402 stray away from expected probe pressure values. In some instances, the alert 412 can indicate that it was determined that the set of probe pressure values 402 is indicative of abnormal fresh concrete conditions. In some embodiments, the alert 412 is transmitted to an external network. In some other embodiments, the alert 412 is stored in an accessible memory system for subsequent consultation, e.g., for maintenance purposes.

In some embodiments, the data processing engine 408 has been trained using supervised learning during which the data processing engine 408 has learned what property value should be determined when some data sets are inputted. This determination is based on the study of a significant number of training data sets comprising test sets of probe pressure values and corresponding truth property values or truth abnormal fresh concrete conditions. The trained data processing engine 408 is trained using supervised learning. In such supervised learning, each data set in the set of training data sets may be associated with a label while training. Supervised machine learning engines can be based on artificial neural networks (ANN), support vector machines (SVM), capsule-based networks, linear discriminant analysis (LDA), classification tree, a combination thereof, and any other suitable supervised machine learning engine. However, as can be understood, in some other embodiments, it is intended that the trained data processing engine 408 can be trained using unsupervised where only training data sets are provided (no desired or truth outputs or labels are given), so as to leave the trained data processing engine 408 find a structure, pattern or resemblance in the provided training data sets. For instance, unsupervised clustering algorithms can be used. Additionally or alternately, the trained data processing engine 408 can involve reinforcement learning where the trained data processing engine 408 can interact with example training data sets and when they reach desired or truth outputs, the trained data processing engine 408 is provided feedback in terms of rewards or punishments. Two exemplary methods for improving classifier performance include boosting and bagging which involve using several classifiers together to "vote" for a final decision. Combination rules can include voting, decision trees, and linear and non-linear combinations of classifier outputs. These approaches can also provide the ability to control the trade-off between precision and accuracy through changes in weights or thresholds of some of the nodes or layers. These methods can lend themselves to extension to large numbers of localized pattern features. In any case, some of these engines may require human interaction during training, or to initiate the engine, however human interaction may not be required while the engine is being carried out, e.g., during analysis of an accessed set of probe pressure values. See Nasrabadi, Nasser M. "Pattern recognition and machine learning." Journal of electronic imaging 16.4 (2007): 049901 for further detail concerning such trained engines.

The computing device 300 and the software application 400 described above are meant to be examples only. Other suitable embodiments of the controller 38, the computing device 200, the software application 300 and the data processing engine 408 can also be provided, as it will be apparent to the skilled reader.

Example 1—Determining a Rheological Property Value Indicative of a Rheological Property of the Fresh Concrete In some embodiments, the properties to be determined by the data processing engine are rheological properties such as viscosity, yield and/or slump. The determination of such rheological properties typically requires probe pressure values measured as the drum rotates in a low-speed range and also probe pressure values measured as the drum rotates in a high-speed range. Accordingly, in these embodiments, the data processing engine may not only receive probe pressure values but also drum speed values indicative of the rotational speed of the drum during the measuring of the probe pressure values. In these embodiments, the system may include a drum speed sensor wholly or partially rotating with the drum. The drum speed sensor generally measures a set of drum speed values indicative of the rotation speed of the drum as the probe pressure values are measured. For instance, the data processing engine may receive data sets $P_P(V)$ including, but not limited to, probe pressure values and drum speed values, where $P_P$ denotes probe pressure and V denotes drum speed, and corresponding truth rheological property values. An example method of calculating such rheological properties can be found at least in International Patent Application No. PCT/IB2010/054542, the contents of which are hereby incorporated by reference.

Figure 5A:
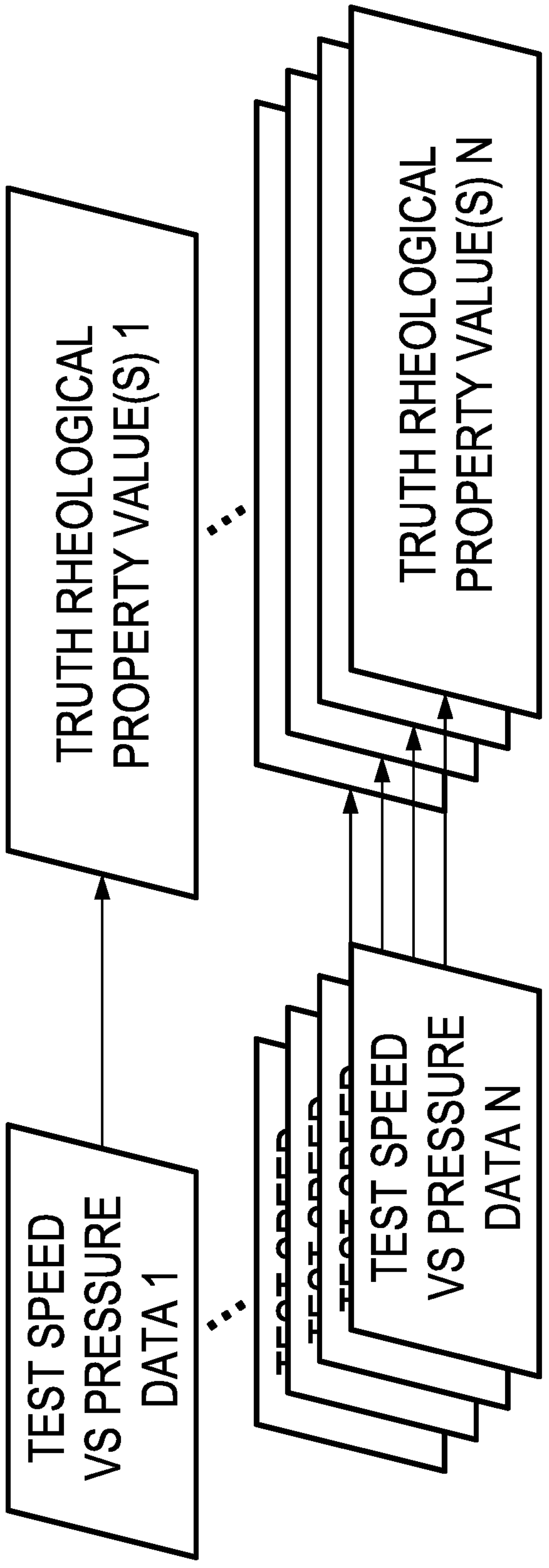
FIG. 5A is a schematic view of exemplary training data sets for training data processing engines of the controller of FIG. 1, in accordance with one or more embodiments.
Figure 5B:
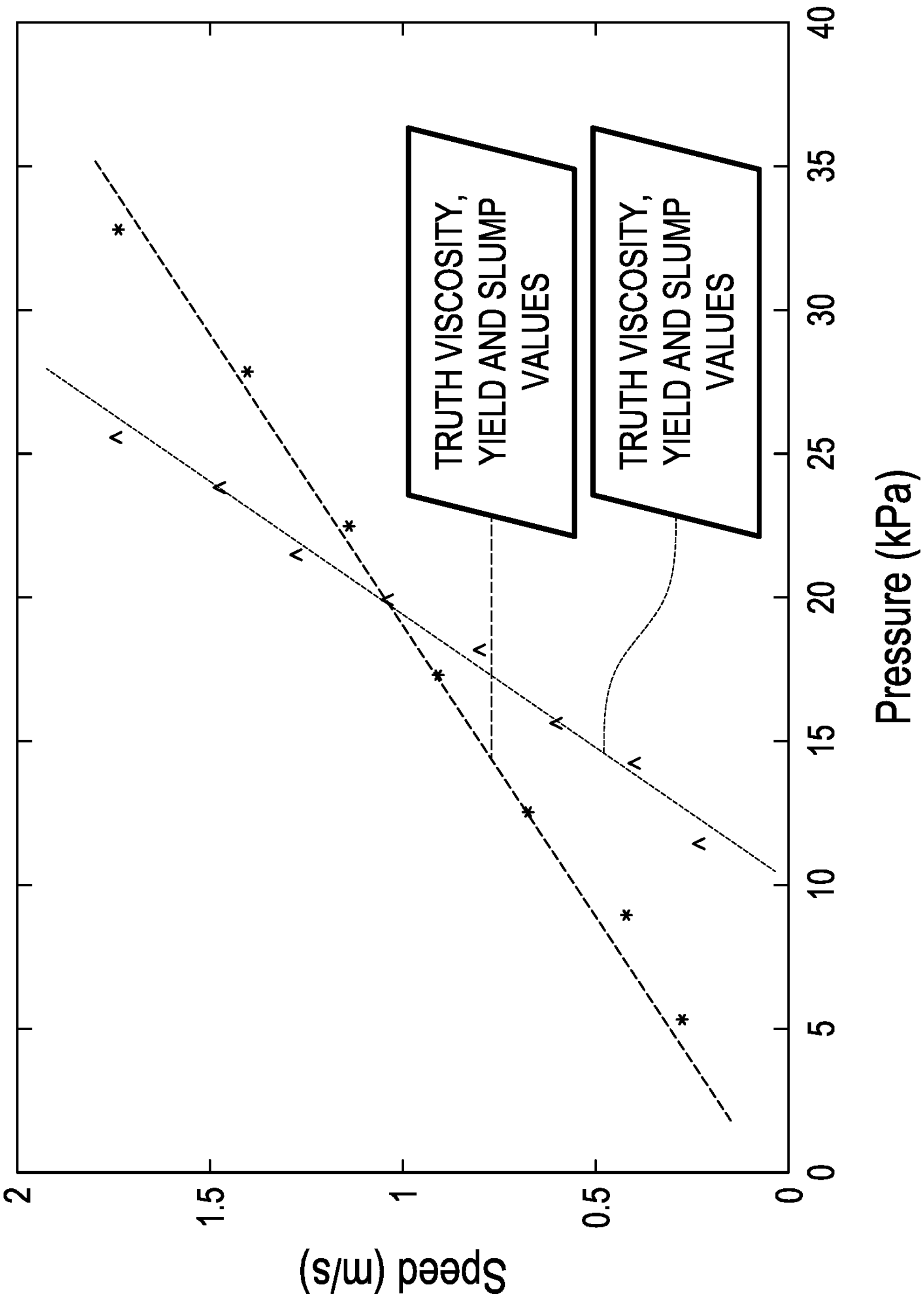
FIG. 5B is a graph showing exemplary training data sets and corresponding truth viscosity, yield and slump values, in accordance with one or more embodiments.

FIG. 5A shows an example of such training data sets with which the data processing engine can be supervisedly trained. FIG. 5B shows a specific example of such training data sets including test data sets $P_P(V)$ and corresponding truth rheological property values which can result from some reference or on-site tests. Linear fits of the probe pressure values $P_P$ as a function of their corresponding speed values V can then be analyzed to extract a viscosity value which corresponds to a slope of the linear fit, and a yield value which corresponds to the x-intercept of the linear fit. The slump can be determined by performing basic arithmetic operations on the viscosity and/or yield values. As depicted, a first data set shows a steeper increase of the probe pressure values as function of drum speed values whereas a second data set shows a smoother increase of the probe pressure values as function of drum speed values. Associated to each one of those two data sets are truth rheological property values including a truth viscosity value, a truth yield value and a truth slump value. Only one of the truth values can be provided in some embodiments. The truth rheological property values may have been measured either using the linear fit-based calculations or other conventional rheological tests such as the slump test, for instance. In some embodiments, the data processing engine is trained using a significant number of such test data sets $P_P(V)$ and corresponding truth values such as when a given set of probe pressure values is inputted, for which rheological property values are sought, the trained data processing engine can use its training to output corresponding rheological property values such as a viscosity value, a yield value and/or a slump value.

In some embodiments, the training data set includes a number of other parameter values to factor in during the determination steps. For instance, the training can further use a test set of hydraulic pressure values, fresh concrete compositions, volumes, a test set of drum speed values and/or a test set of temperature values depending on the embodiment. In some embodiments, the data processing engine is configured to annotate the measured set of probe pressure values, or the probe pressure values themselves, with an annotation indicative of the determined rheological property value(s). The annotation can be provided in the form of a text string overlaid on the set of probe pressure values or otherwise associated with the set of probe pressure values. For instance, these annotated sets of probe pressure values can be used for further supervised training. In some embodiments, the probe pressure values can be omitted as only hydraulic pressure values can be used. In these embodiments, the training data set includes test hydraulic pressure values and corresponding truth values.

Using a trained data processing engine can be advantageous in some embodiments as parameters such as mixture composition, drum speed and volume of concrete inside the drum speed affect the rheological property determination. These parameters may not be constant or fully known to add to the complexity, and they may influence each other. To mitigate certain effect, the measurements are usually done only within a particular range of drum speed, amount of concrete inside the drum and often for some categories of mixture. Use of the trained data processing engine may help in strengthening the confidence with which the rheological properties can be determined, and also the range of drum speed with which the probe pressure values are measured. At this time, the probe pressure values are only measured at a given mixing drum speed. Rheological property determination can be performed at other drum speeds. In some embodiments, the trained data processing engine can recognize when a given determined rheological property value is out of the expected range, and generate a corresponding alert.

Example 2—Determining a Density Value Indicative of Density of the Fresh Concrete In some embodiments, the property to be determined by the data processing engine is density. The determination of such a property can require probe pressure values measured as the drum rotates during at least a full drum rotation. Accordingly, in these embodiments, the data processing engine may not only receive one probe pressure value but a plurality of probe pressure values as the rheological probe moves across different circumferential positions of the drum, hereinafter the data set $P_P(\theta)$ where $P_P$ denotes the probe pressure values and $\theta$ denotes the circumferential positions of the rheological probe.

Figure 6A:
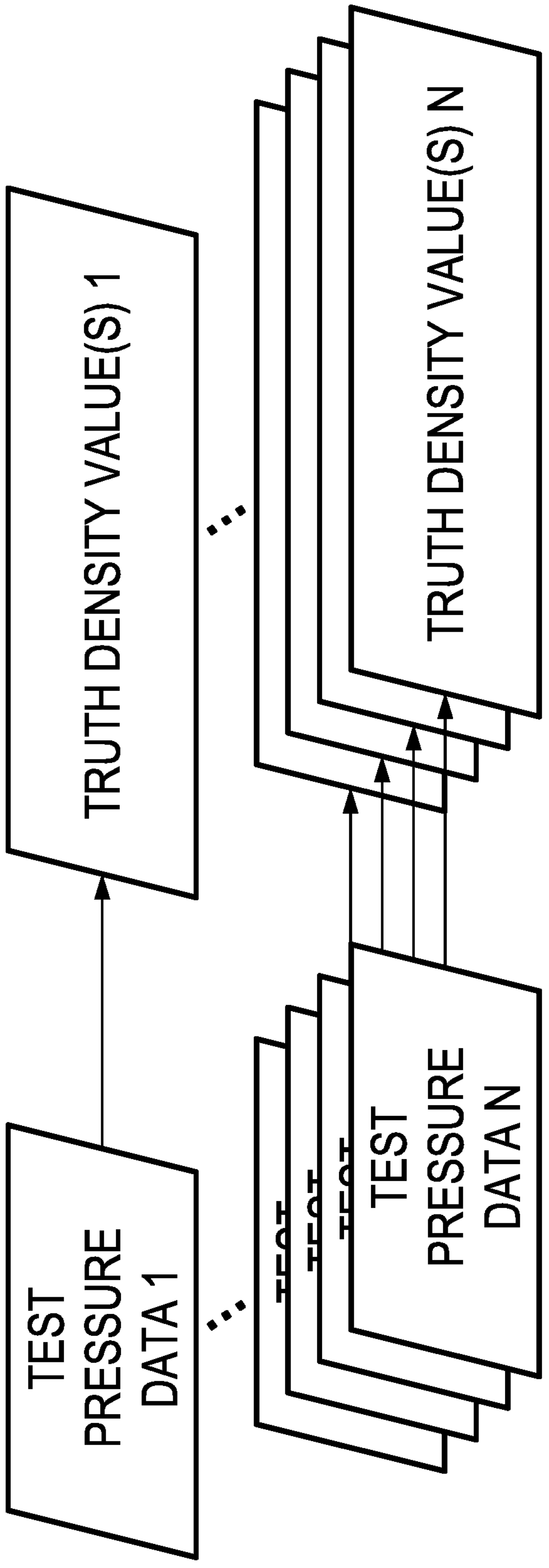
FIG. 6A is a schematic view of exemplary training data sets incorporating test pressure data and corresponding truth density values, in accordance with one or more embodiments.
Figure 6B:
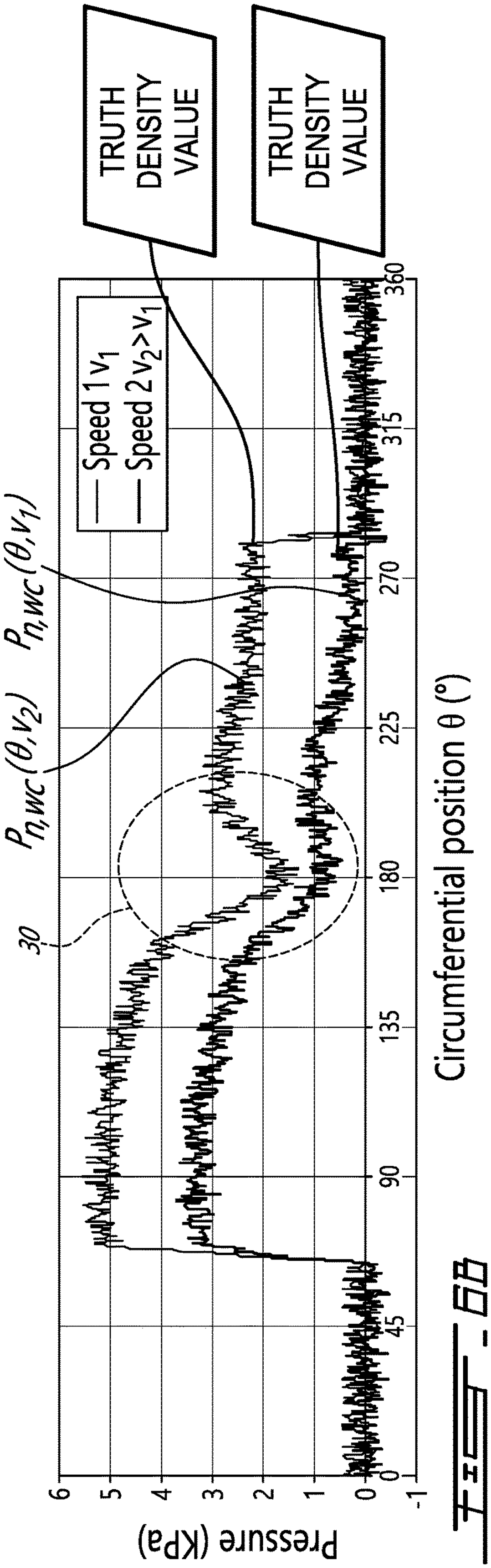
FIGS. 6B and 6C are graphs showing examples of the training data sets of FIG. 6A, in accordance with one or more embodiments.
Figure 6C:
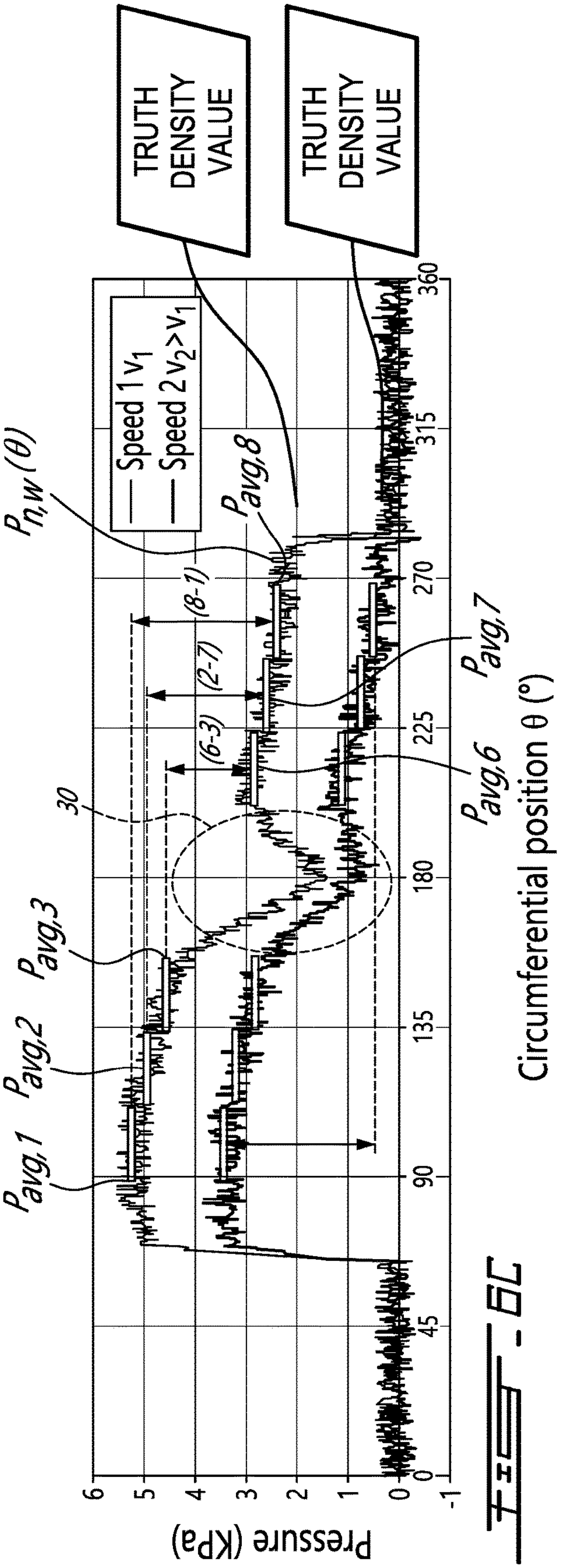

FIG. 6A shows an example of test data sets $P_P(\theta)$ and corresponding truth values with which the data processing engine can be supervisedly trained. FIGS. 6B and 6C show specific examples of such test data sets $P_P(\theta)$ resulting from some reference or on-site tests. As shown, the test data sets $P_P(\theta)$ show at which circumferential position the rheological probe enters the fresh concrete with a steep increase in probe pressure values. Correspondingly, a steep decrease in probe pressure values show at which circumferential position the rheological probe exits the fresh concrete. Generally, between the entry and exit circumferential positions, the probe pressure values tend to follow a pattern having a dip at the circumferential position corresponding to the bottom of the drum. The pattern of the probe pressure values can depend on a number of parameters with which the data processing engine can be trained using corresponding data sets. As depicted, each of the test data sets $P_P(\theta)$ are associated with corresponding truth density values thereby allowing the data processing engine to train itself. In some embodiments, the data processing engine is trained using a significant number of such test data sets $P_P(\theta)$ and corresponding truth density values such as when a given data set $P_P(\theta)$ is inputted, the trained data processing engine can output corresponding truth density values.

It is known that a density D of the fresh concrete can be determined based on a first pressure value indicative of a normal pressure exerted on the rheological probe at a first circumferential position of the drum and on a second pressure value indicative of a normal pressure exerted on the rheological probe at a second circumferential position different from the first circumferential position. Accordingly, the truth density values can be calculated from the test data sets $P_P(\theta)$ in some embodiments. In one of these embodiments, the density value can be determined based on the volume of the rheological probe and on a difference between the first pressure value and the second pressure value. In some embodiments, the difference is compensated by a trigonometric factor corresponding to a difference between the sinus of the first circumferential position and the sinus of the second circumferential position. In further embodiments, the first and second circumferential positions are preferably chosen so as to be circumferentially away from the bottom of the drum to avoid potential discrepancies in the measured pressure values when the probe is in the vicinity of the bottom of the drum. For instance, the density value can be determined based on a mathematical equation equivalent to the following mathematical equation:

$$D=(Pn,_{WC}(\theta 1)-Pn,_{WC}(\theta 2))/(K_v(\sin\theta 1-\sin\theta 2)), \quad (1)$$

where D denotes the density value, $Pn,_{WC}(\theta\mathbf{1})$ denotes a first weight compensated pressure value Pn,WC(θ1) measured when the rheological probe is at a first circumferential position θ1, $Pn,_{WC}(\theta\mathbf{2})$ denotes a second weight compensated pressure value Pn,WC(θ2) measured when the rheological probe is at a second circumferential position θ2, and $K_v$ denotes a constant depending on a volume V of the rheological probe, and can be known for a given probe, so as to allow the determination of the density value D of the fresh concrete. This example method of calculating the density D can be found at least in PCT Application No. PCT/EP2018/070031, the contents of which are hereby incorporated by reference. Other techniques of calculating the density value based on the test data sets $P_P(\theta)$ can be used in some other embodiments. In some other embodiments, the truth density value can be measured using a density sensor that is different from the rheological probe, or combination of such density sensors.

It was found that by training a data processing engine using such training data sets, the data processing engine can receive a set of probe pressure values measured by the rheological probe and then determine, using its training, the density D of the fresh concrete based on those probe pressure values. In some embodiments, the data processing engine use all the probe pressure values of the set in its determination, and find and identify a pattern of probe pressure values which can be associated to a known pattern of probe pressure values as learned from the training data sets. However, in some other embodiments, the set of probe pressure values can be formatted to remove at least some probe pressure values and keep some other of the probe pressure values. For instance, the probe pressure values corresponding to the discrepancy measured at the bottom of the drum can be removed. In some embodiments, the density determination is made on the basis of a first probe pressure value $P_P(\theta 1)$ taken at a first circumferential position $\theta 1$ and a second probe pressure value $P_P(\theta 2)$ taken at a second circumferential position $\theta 2$. In some other embodiments, the data processing engine can be trained with training data sets pertaining to different drum speed values, fresh concrete compositions, fresh concrete temperatures and the like. As such, the data processing engine can receive a drum speed value, or other values, and use it(them) in the density determination. Other properties of the fresh concrete can also be used in the density determination including, but not limited to, an air content value indicative of air content of the fresh concrete, and the like. The data processing engine can be trained using unsupervised learning in some other embodiments.

Example 3—Generating Mixing Statuses Indicative of Whether the Ingredients being Mixed in the Drum are Satisfactorily Mixed In some embodiments, the data processing engine is not used to determine a property of the fresh concrete per se but rather to generate a mixing status indicative of whether the mixing of the ingredients within the drum has ended, or of a mixing degree (e.g., 1 being fully mixed, 0.5 being partially mixed, and 0 being unmixed). The determination of such a status can require probe pressure values measured as the drum rotates during at least a full drum rotation, and a preferably number of drum rotations. Accordingly, in these embodiments, the data processing engine may not only receive one probe pressure value but a plurality of probe pressure values as the rheological probe moves across different circumferential positions of the drum. In some embodiments, separate outputs can be provided to increase robustness and confidence when determining any given state. For instance, example outputs can include, but not limited to, an unmixed or heterogeneity output (e.g., varying from 0 to 1), a mixed or homogeneity output (e.g., varying from 0 to 1) and the like. Should both of the latter outputs be near 0 or near 1, then an output indicating that the state is either unknown or unreliable can be generated. If only one of the homogeneity and heterogeneity outputs is near 1, then an output indicating that the state is determined with a good confidence can be generated.

Figure 7A:
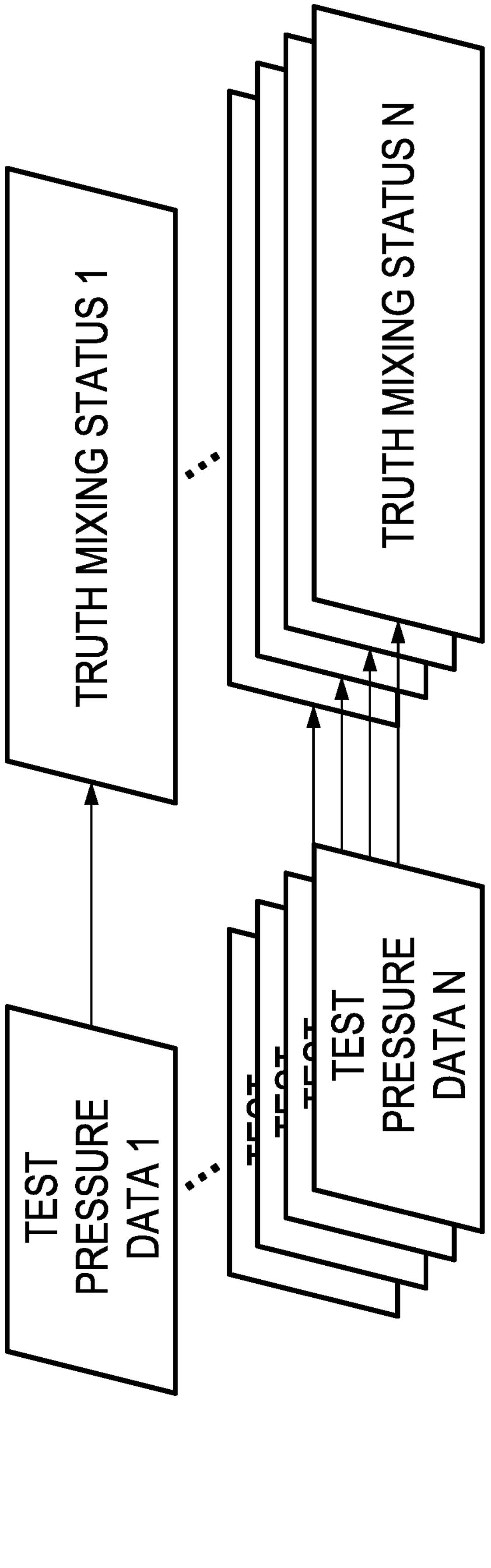
FIG. 7A is a schematic view of exemplary training data sets incorporating test pressure data and corresponding truth mixing statuses, in accordance with one or more embodiments.
Figure 7B:
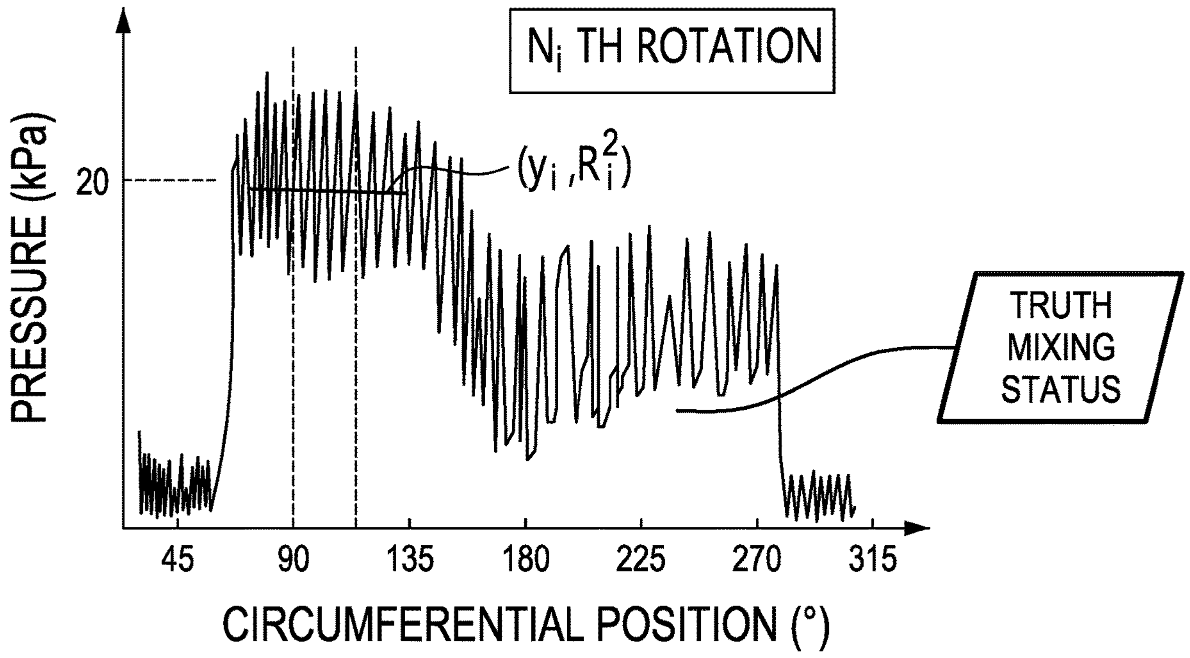
FIGS. 7B and 7C are graphs showing examples of the training data sets of FIG. 7A, in accordance with one or more embodiments.
Figure 7C:
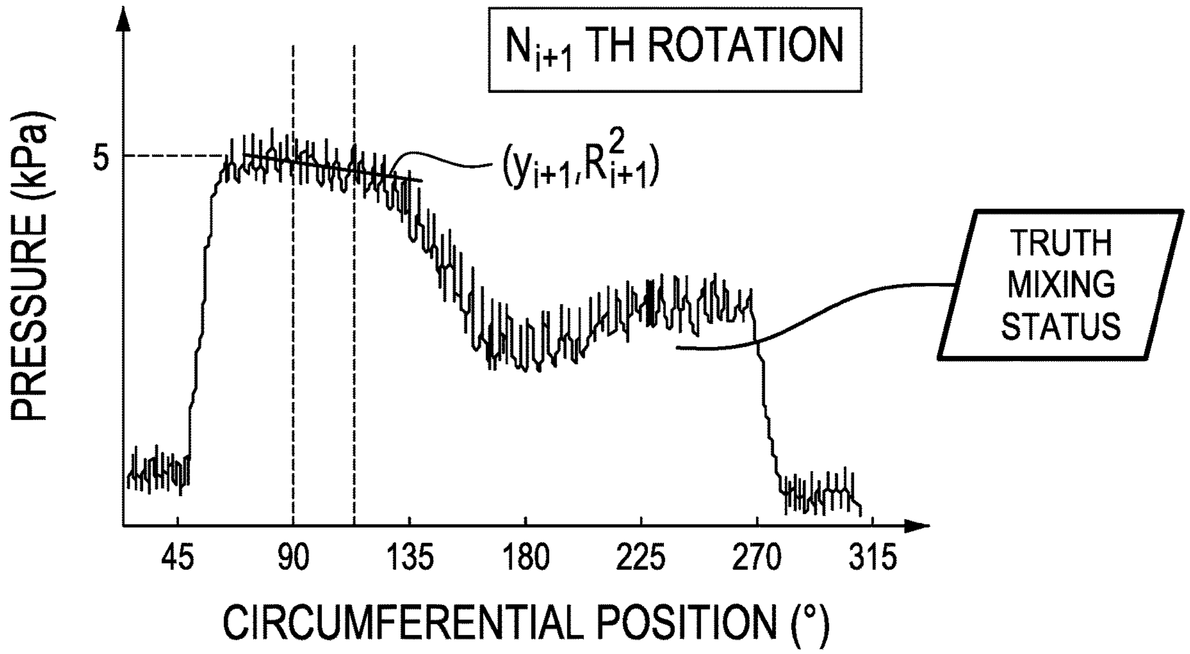

FIG. 7A shows an example of test data sets $P_P(\theta)$ and corresponding truth values with which the data processing engine can be supervisedly trained. FIGS. 7B and 7C show specific examples of such test data sets $P_P(\theta)$ resulting from some reference or on-site tests. The training data set of FIG. 7B has a truth mixing status indicating that the ingredients are not satisfactorily mixed whereas the training data set of FIG. 7C has a truth mixing status indicating that the ingredients are satisfactorily mixed. As shown, once the rheological probe has entered the fresh concrete, and before it has exited the fresh concrete, the probe pressure values show oscillations (which look like noise) which can be quantified to determine whether the rheological probe experiences contact with homogeneously mixed ingredients, i.e., properly mixed fresh concrete or heterogeneously mixed ingredients, i.e., not yet properly mixed fresh concrete. As depicted, each of the test data sets $P_P(\theta)$ are associated with corresponding truth mixing statuses thereby allowing the data processing engine to train itself. In some embodiments, the truth mixing status can be an homogeneity or heterogeneity status. In some embodiments, the data processing engine is trained using a significant number of such test data sets $P_P(\theta)$ and corresponding truth mixing status such as when a given data set $P_P(\theta)$ is inputted, the trained data processing engine can output corresponding truth mixing status.

It is known to determine whether the ingredients are properly mixed by determining a deviation of the probe pressure values from corresponding threshold values. Such an example of determining whether the ingredients are satisfactorily mixed can be found at least in Published PCT Application no. PCT/US2018/053977, the contents of which are hereby incorporated by reference.

It was found that by training a data processing engine using such training data sets, the data processing engine can receive a set of probe pressure values measured by the rheological probe and then determine, using its training, whether the ingredients are satisfactorily mixed based on those probe pressure values. By accurately determined whether the ingredients are satisfactorily mixed, the rotation speed of the drum can be reduced, from a higher mixing speed to a lower agitating speed, as soon as it is determined that the concrete constituents are well mixed to one another, which can provide savings both in terms of fuel and time. For instance, in the context of mixer trucks, fuel can be saved as rotating the drum at the lower rotation speed is significantly less costly than rotating the drum at the higher rotation speed. Further, time can be saved as the mixer truck is typically allowed to leave towards the client only when the rotation speed of the drum is reduced, to avoid accidents. In some embodiments, the data processing engine can use all the probe pressure values of the set in its determination, and find and identify a pattern of probe pressure values which can be associated to a known pattern of probe pressure values as learned from the training data sets. However, in some other embodiments, the set of probe pressure values can be formatted to remove at least some probe pressure values and keep some other of the probe pressure values. For instance, the probe pressure values corresponding to the discrepancy measured at the bottom of the drum can be removed. In some embodiments, the density determination is made on the basis of a standard deviation of the probe pressure values in a given range of circumferential positions. One or more additional deviation can be calculated for other ranges of circumferential positions, e.g., following entry of the rheological probe in the fresh concrete, just before exit of the rheological probe out of the fresh concrete. In some other embodiments, the data processing engine can be trained with training data sets pertaining to different drum speed values, fresh concrete compositions, fresh concrete temperature and the like. As such, the data processing engine can receive a drum speed value and use it in its density determination. Other properties of the fresh concrete can also be used in the determination including, but not limited to, an air content value indicative of air content of the fresh concrete, and the like. The data processing engine can be trained using unsupervised learning in some other embodiments.

Example 4—Generating Segregation Statuses Indicative of Whether the Fresh Concrete is Segregating in the Drum In some embodiments, the status to be generated by the data processing engine is a segregation status indicative of whether the fresh concrete is segregating in the drum or of a segregation degree (e.g., 1 being fully segregated, 0.5 being partially segregated, and 0 being unsegregated). The determination of such a status can require probe pressure values measured as the drum rotates during at least a full drum rotation, and preferably a number of drum rotations. Accordingly, in these embodiments, the data processing engine may not only receive one probe pressure value but a plurality of probe pressure values as the rheological probe moves across different circumferential positions of the drum. In some embodiments, separate outputs can be provided to increase robustness and confidence when determining any given state. For instance, example outputs can include, but not limited to, an segregated output (e.g., varying from 0 to 1), an unsegrated output (e.g., varying from 0 to 1) and the like. Should both of the latter outputs be near 0 or near 1, then an output indicating that the state is either unknown or unreliable can be generated. If only one of the segregated and unsegregated outputs is near 1, then an output indicating that the state is determined with a good confidence can be generated.

Figure 8A:
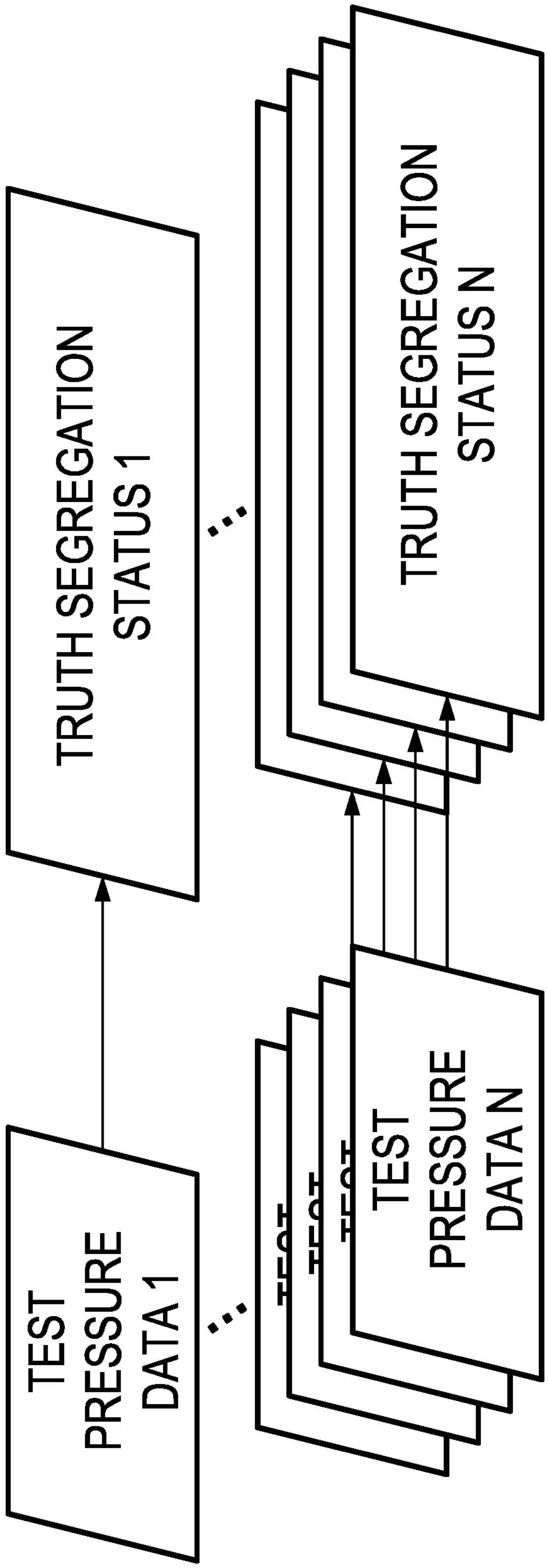
FIG. 8A is a schematic view of exemplary training data sets incorporating test pressure data and corresponding truth segregation statuses, in accordance with one or more embodiments.
Figure 8B:
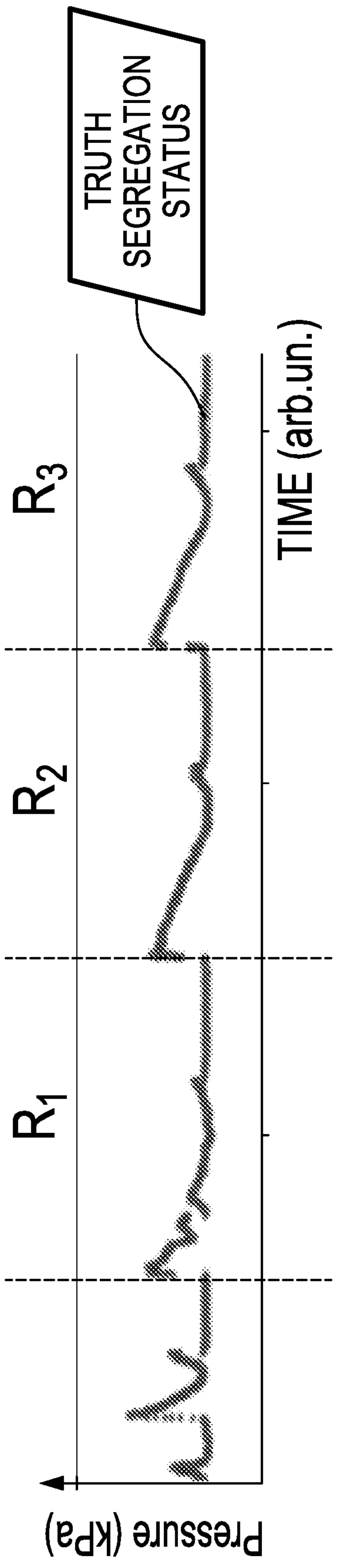
FIGS. 8B, 8C and 9 are graphs showing examples of the training data sets of FIG. 8A, in accordance with one or more embodiments.
Figure 8C:
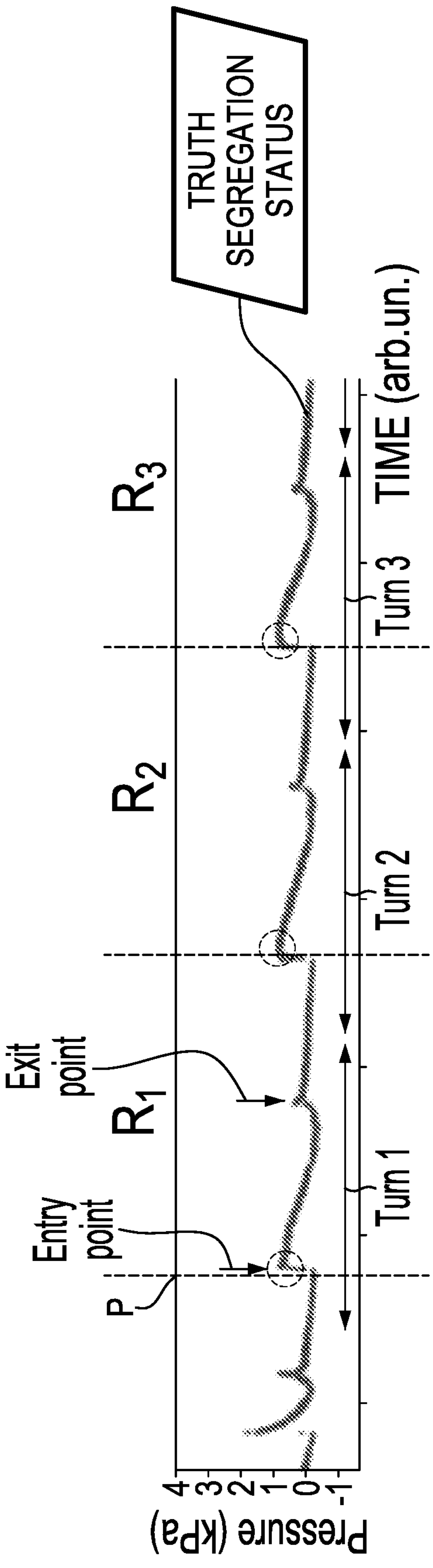
Figure 9:
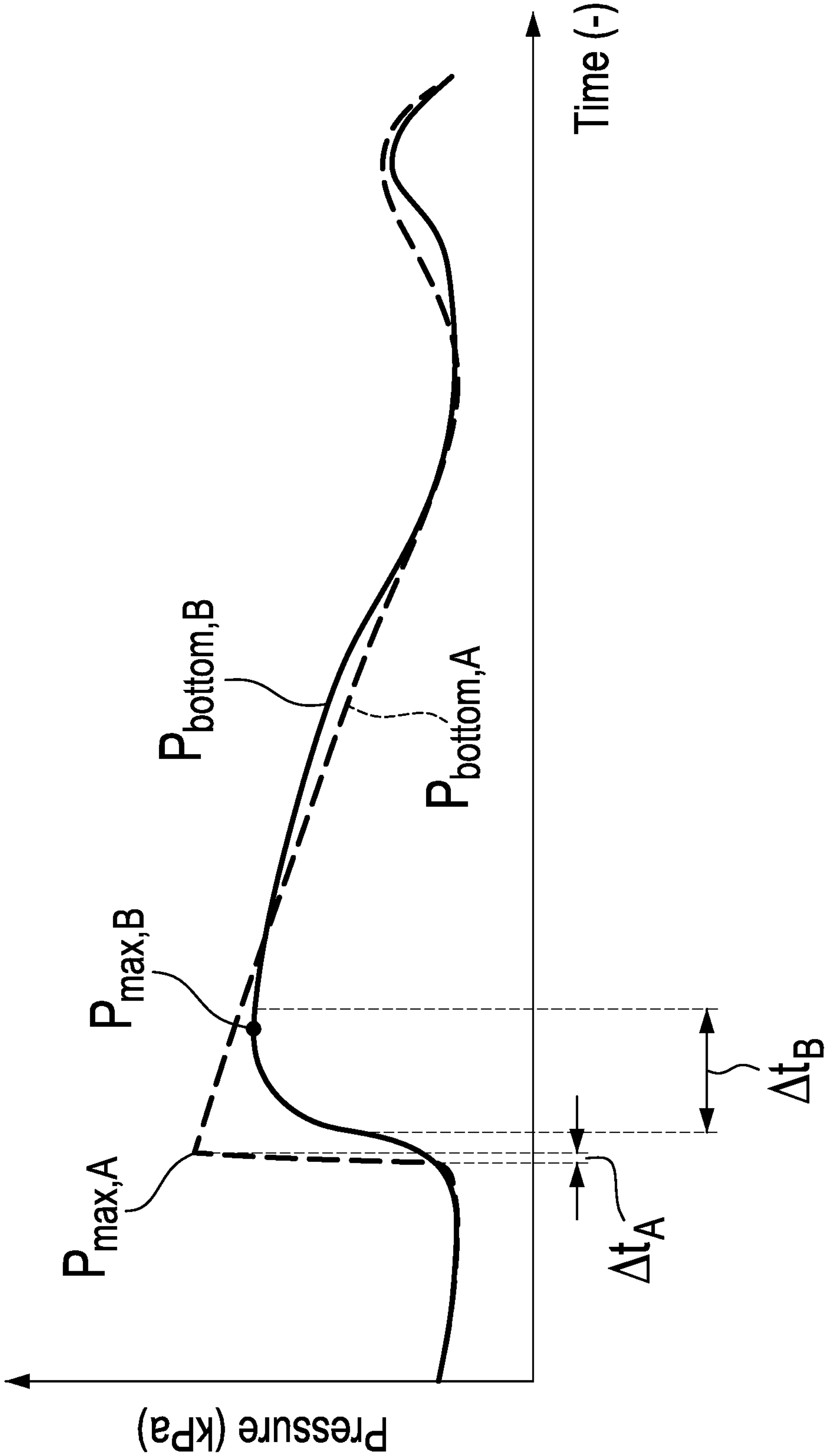

FIG. 8A shows an example of test data sets $P_P(\theta)$ and corresponding truth segregation statuses with which the data processing engine can be supervisedly trained. FIGS. 8B and 8C show specific examples of such test data sets $P_P(\theta)$ resulting from some reference or on-site tests. As shown, these test data sets $P_P(\theta)$ extend over a plurality of drum rotations. The training data set of FIG. 8B has a truth segregation status indicating that the fresh concrete mixture is not segregating within the drum whereas the training data set of FIG. 8C has a truth segregation status indicating that the fresh concrete mixture is segregating within the drum. FIG. 9 shows overlapping patterns of probe pressure for these two typical truth statuses, emphasizing the difference between the probe pressure value patterns of a segregating fresh concrete mixture and a non-segregating fresh concrete mixture. As depicted, each of the data sets $P_P(\theta)$ are associated with corresponding truth segregation statuses thereby allowing the data processing engine to train itself. In some embodiments, the data processing engine is trained using a significant number of such data sets $P_P(\theta)$ and corresponding truth segregation statuses such as when a given data set $P_P(\theta)$ is inputted, the trained data processing engine can output a segregation status indicative of whether the fresh concrete mixture is segregating or not.

It is known to determine whether the fresh concrete mixture is segregating in the drum based on the patterns of the probe pressure values at each drum rotation. An example of such a determination technique is described in at least in U.S. Provisional Application No. 63/148,215, the contents of which are hereby incorporated by reference.

It was found that by training a data processing engine using such training data sets, the data processing engine can receive a set of probe pressure values measured by the rheological probe and then determine, using its previous training, whether the fresh concrete mixture is segregating or not in the drum. When segregation is detected, the drum speed at which the drum is rotated can be increased and go from the agitation phase back to the mixing phase, in some embodiments. In some embodiments, the data processing engine can use all the probe pressure values of the set in its determination, and find and identify a pattern of probe pressure values which can be associated to a known pattern of probe pressure values as learned from the training data sets. However, in some other embodiments, the set of probe pressure values can be formatted to remove at least some probe pressure values and keep some other of the probe pressure values. For instance, the probe pressure values corresponding to the discrepancy measured at the bottom of the drum can be removed or isolated. In some embodiments, the density determination is made on the basis of a difference between one or more of the probe pressure values and corresponding reference probe pressure values that are expected to be measured at those circumferential positions. As best shown in FIG. 9, a difference in the maximal probe pressure value as measured by the rheological probe from a reference maximal probe pressure value (the reference can be taken from a previous drum rotation in some embodiments) exceeding a given threshold can be indicative of segregation. One or more additional differences can be calculated for other values or ranges of circumferential positions, e.g., following entry of the rheological probe in the fresh concrete, just before the exit of the rheological probe out of the fresh concrete. In some other embodiments, the data processing engine can be trained with training data sets pertaining to different drum speed values, fresh concrete compositions, fresh concrete temperature and the like. As such, the data processing engine can receive a drum speed value and/or a fresh concrete composition and use them in its determination. Other properties of the fresh concrete can also be used in the density determination including, but not limited to, an air content value indicative of air content of the fresh concrete, and the like. The data processing engine can be trained using unsupervised learning in some other embodiments.

Example 5—Determining a Drum Speed Value of the Drum of the Concrete Mixer

In some embodiments, the value that is determined by the data processing engine is a drum speed value indicative of rotation speed of the drum of the concrete mixer. The determination of the drum speed can require probe pressure values measured as the drum rotates during at least a full drum rotation, and preferably a number of drum rotations. Accordingly, in these embodiments, the data processing engine may not only receive one probe pressure value but a plurality of probe pressure values as the rheological probe moves across different circumferential positions of the drum.

Figure 10A:
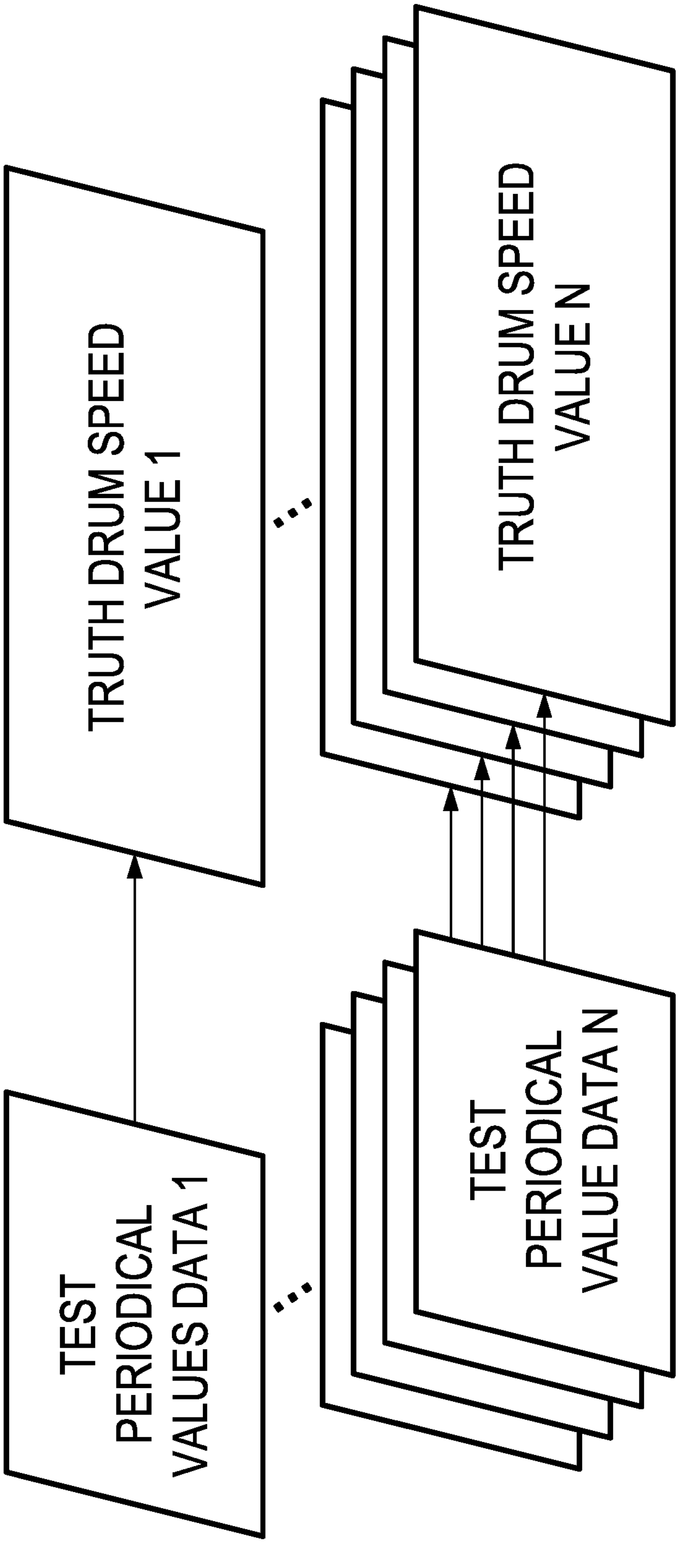
FIG. 10A is a schematic view of exemplary training data sets incorporating test periodical data and corresponding truth drum speed values, in accordance with one or more embodiments.
Figure 10B:
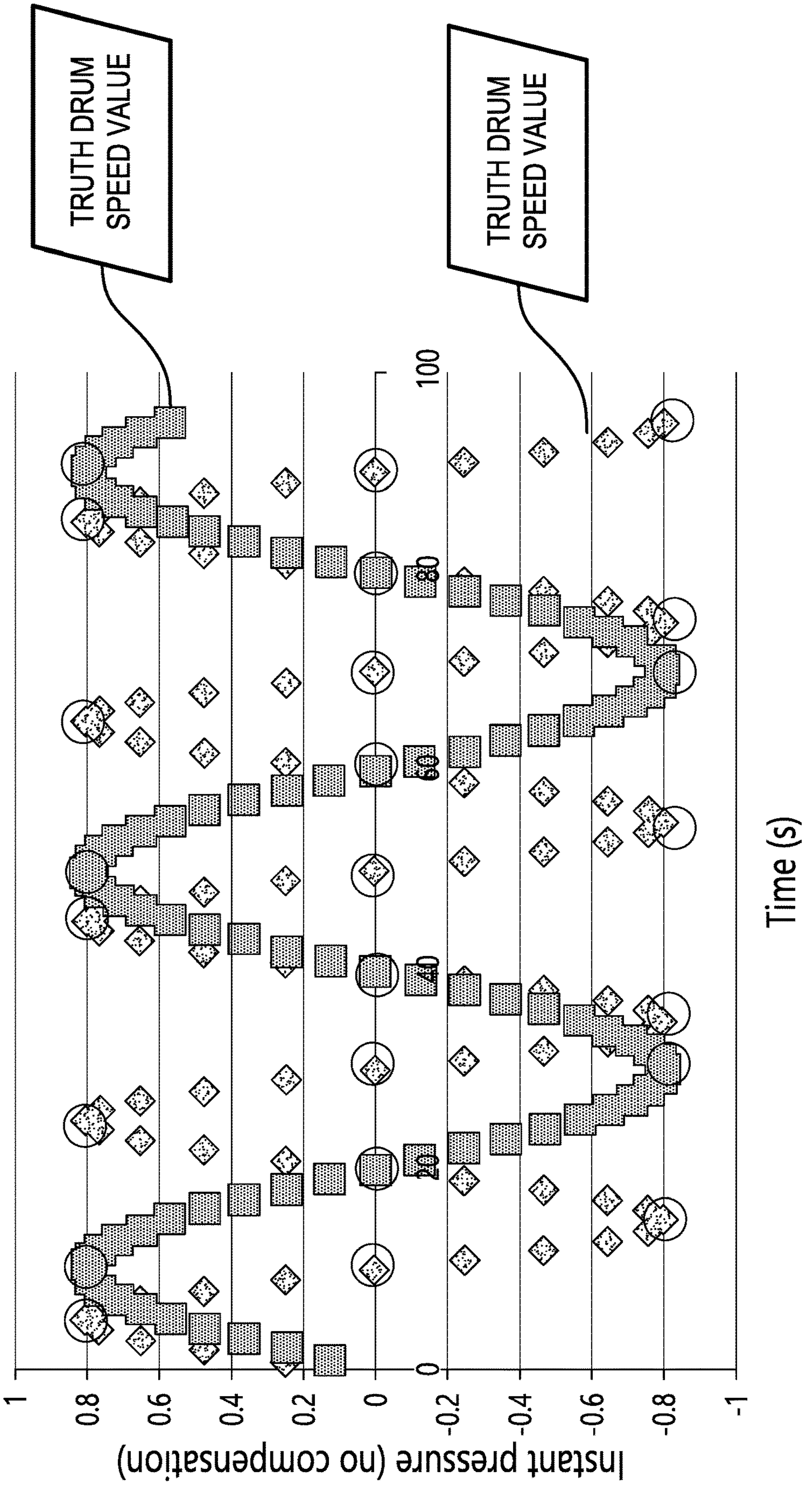
Figure 10C:
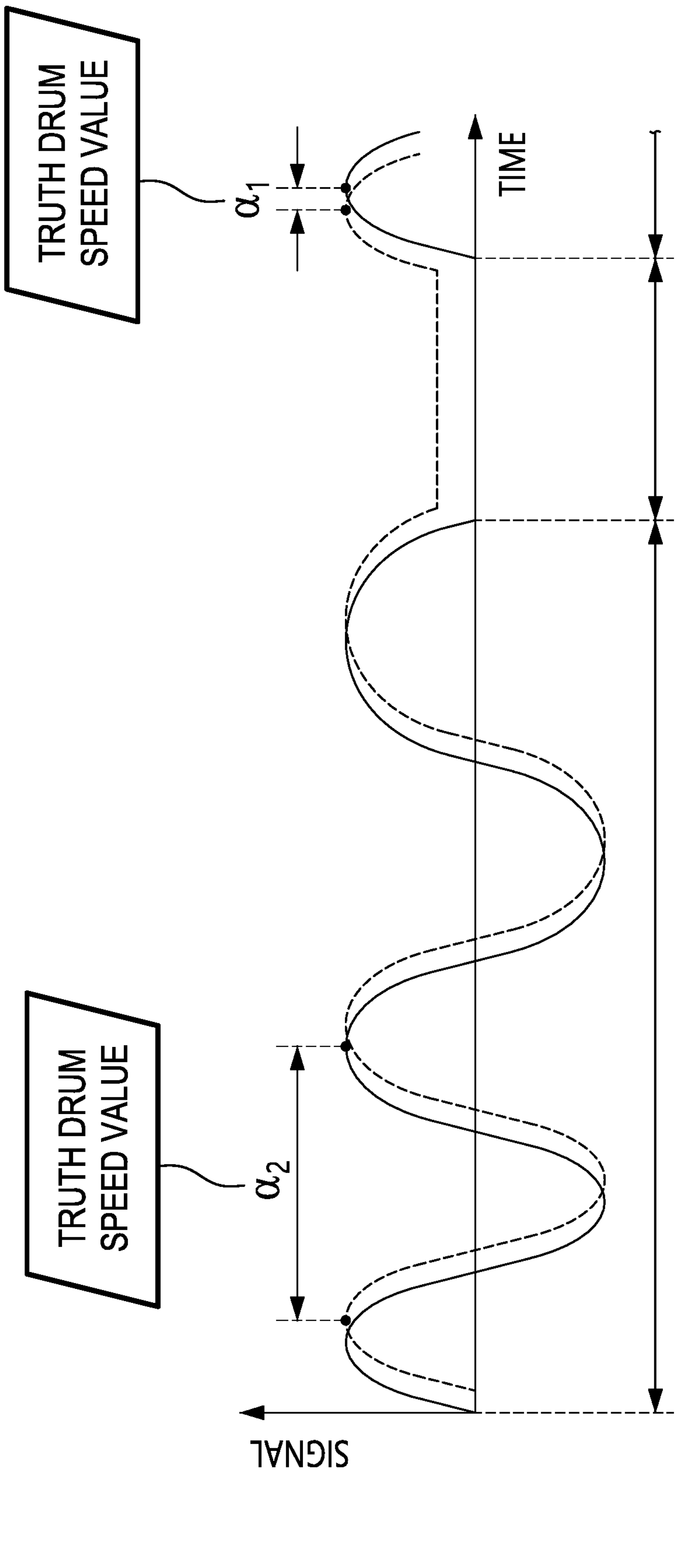

FIG. 10A shows an example of test data sets $P_P(\theta)$ and corresponding truth drum speed values with which the data processing engine can be supervisedly trained. FIG. 10B shows specific examples of such test data sets $P_P(\theta)$ resulting from some reference or on-site tests. More specifically, FIG. 10B shows a first test data set associated with a first truth drum speed value and a second test data set associated with a second truth drum speed value. As depicted, each of the test data sets $P_P(\theta)$ is associated with corresponding truth drum speed values thereby allowing the data processing engine to train itself. In some embodiments, the data processing engine is trained using a significant number of such test data sets $P_P(\theta)$ and corresponding truth drum speed values such as when a given data set of probe pressure values measured by the rheological probe is inputted, the trained data processing engine can output the drum speed value associated to that set of measured values.

It is known to determine the drum speed based on probe pressure values measured by a rheological probe mounted inside the drum and immersed in the fresh concrete. An example of such a calculation technique is described in U.S. Patent Application Publication No. US 2020/0225258 A1, the contents of which are hereby incorporated by reference. To determine the rotational drum speed, the probe pressure values measured by the rheological probe can advantageously be monitored to determine a difference between first and second circumferential positions θ1 and θ2 and divide it by the time required for the rheological probe to travel from the first circumferential position θ1 to the second circumferential position θ2. Other techniques of calculating the drum speed value based on the test data sets $P_P(\theta)$ can be used in some other embodiments. In some other embodiments, the truth drum speed value can be measured using a periodicity or speed sensor that is different from the rheological probe, or combination of such periodicity or speed sensors.

Other techniques of calculating the drum speed value based on the test data sets can be used in some other embodiments. In some embodiments, the drum speed determination does not involve probe pressure values but rather stem from other sensor data. For instance, the drum speed value can be determined based on the variation of hydraulic pressure values indicative of hydraulic pressure used to drive rotation of the drum, on the variation of accelerometer values measured by an accelerometer moving together with the drum, on the variation of the strength of a signal emitted by a first transducer and received by a second transducer, with one of the transducers being fixed to the frame of the mixer truck and the other transducer moving together with the drum. FIG. 100 shows a training data set showing the signal strength values as emitted and received using a wireless transducer pair during rotation of the drum. As shown, a first portion of these values is associated with a first truth drum speed value whereas a second portion of these values is associated with a second truth drum speed value. In some embodiments, the drum speed value can be determined by finding a periodic pattern in the probe pressure values or any type of data measured in or out of the drum. In any case, the data processing engine can be trained using any of these training data sets, if necessary.

Example 6—Determining Drum Cleanliness Statutes Indicative of Whether the Drum is Clean or Dirty In some embodiments, the data processing engine is not used to determine a property of the fresh concrete per se but rather to generate a drum cleanliness status indicative of whether the drum is clean or dirty with hardened concrete, for instance. A drum cleanliness degree where 1 being clean, 0.5 being partially clean/dirty, and 0 being dirty can also be determined in some other embodiments. The determination of the drum cleanliness status can require drum speed values measured as the drum rotates during at least a full drum rotation, and preferably during a number of drum rotations. Accordingly, in these embodiments, the data processing engine may not only but a plurality of drum speed values as the drum reaches successive circumferential positions.

Figure 11A:
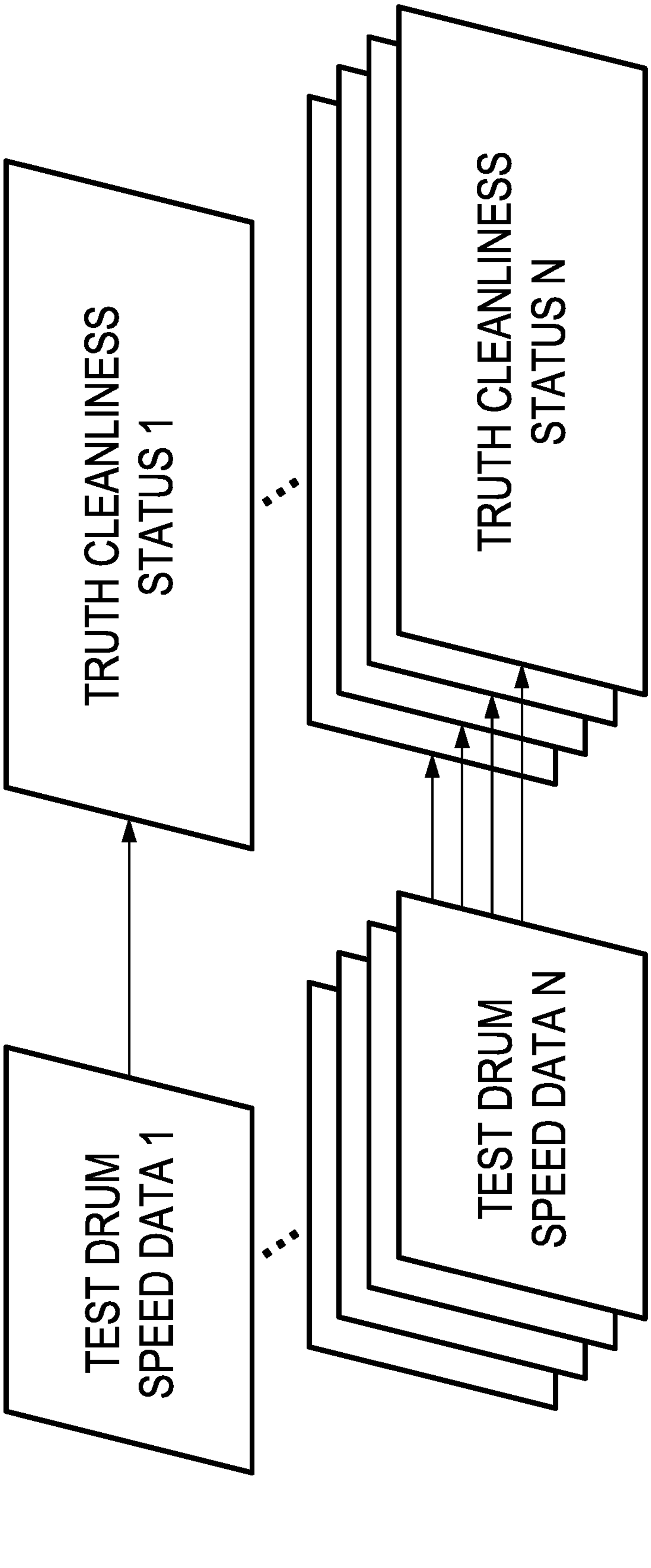
FIG. 11A is a schematic view of exemplary training data sets incorporating test drum speed data and corresponding truth cleanliness statuses, in accordance with one or more embodiments.
Figure 11B:
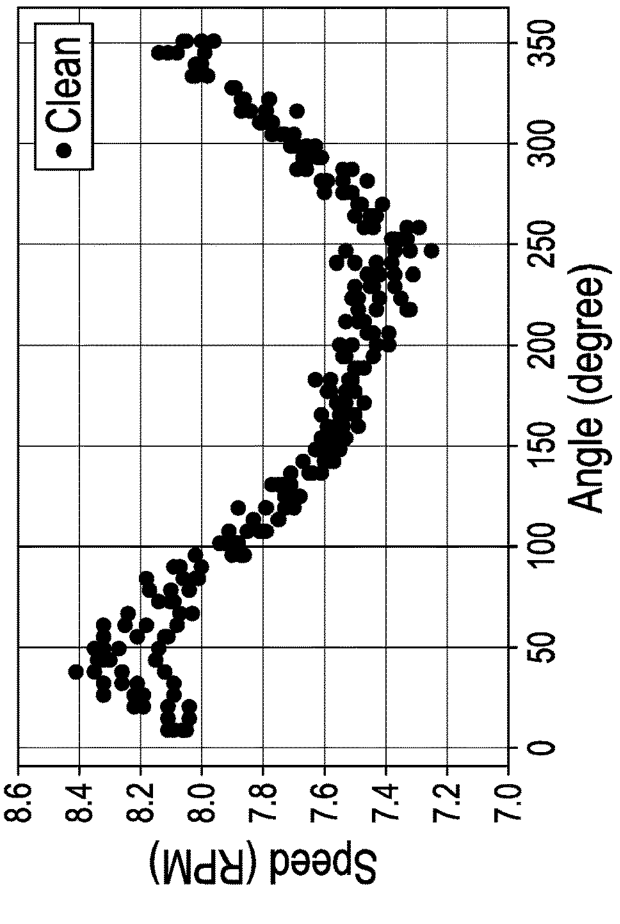
FIGS. 11B through 11O are graphs showing examples of the training data sets of FIG. 11A, in accordance with one or more embodiments.
Figure 11C:
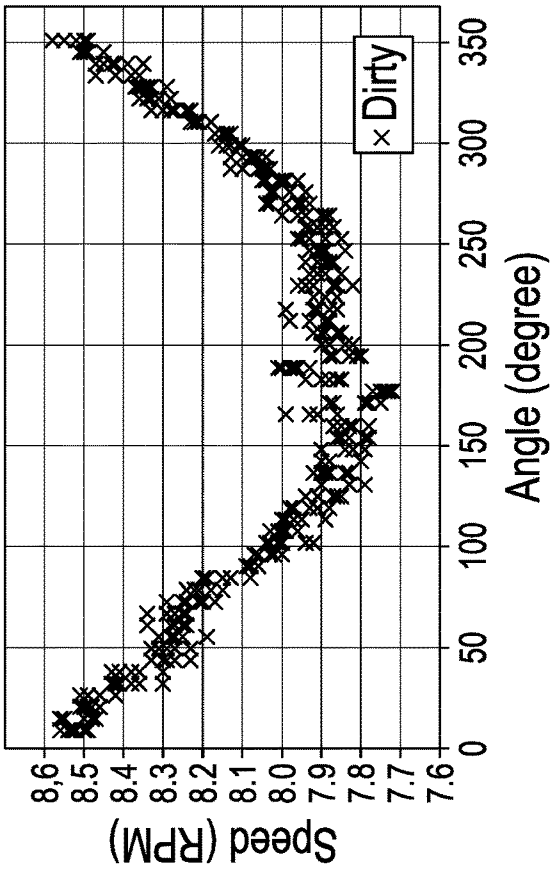
Figure 11D:
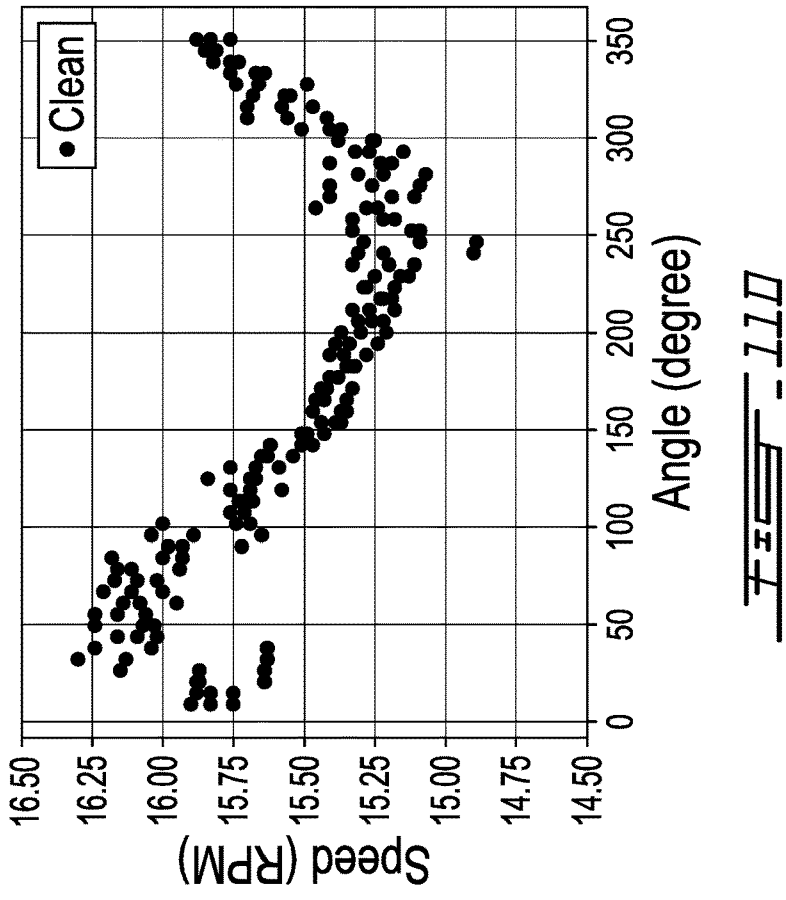
Figure 11E:
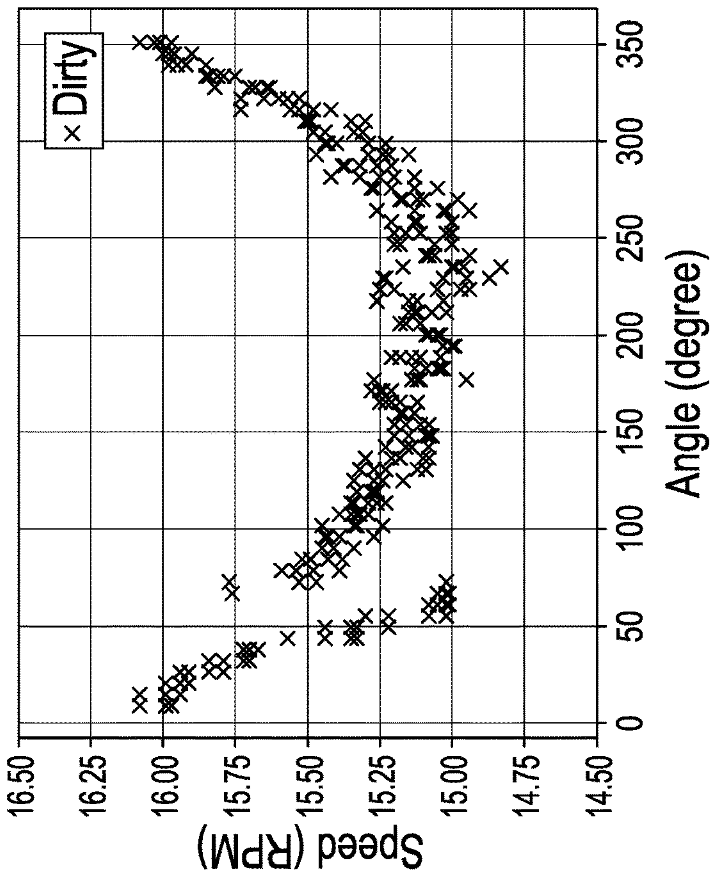
Figure 11G:
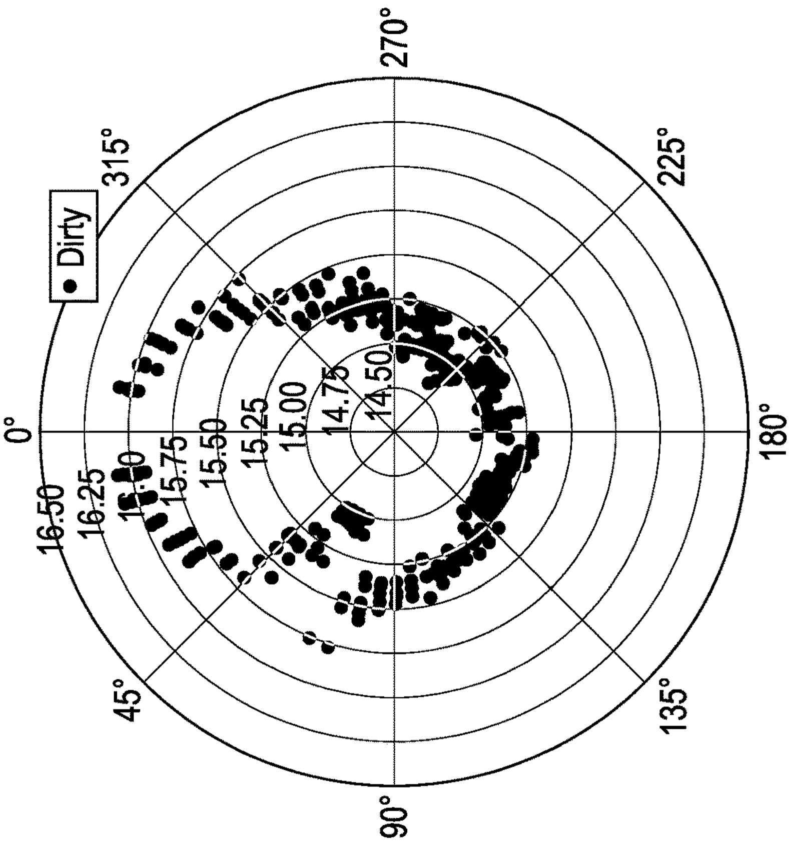
Figure 11F:
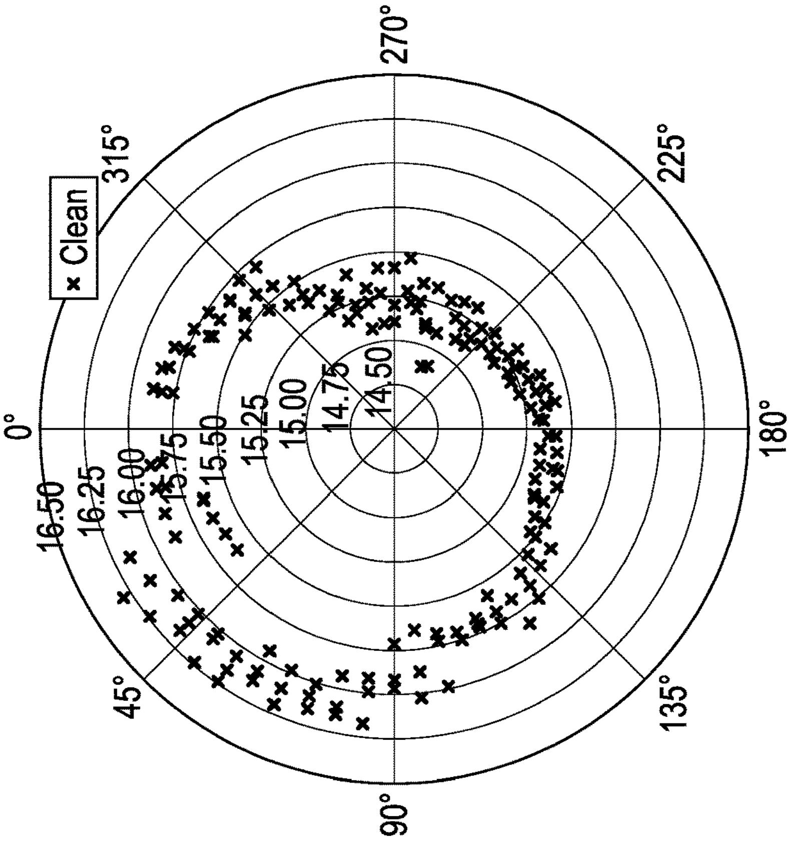
Figure 11H:
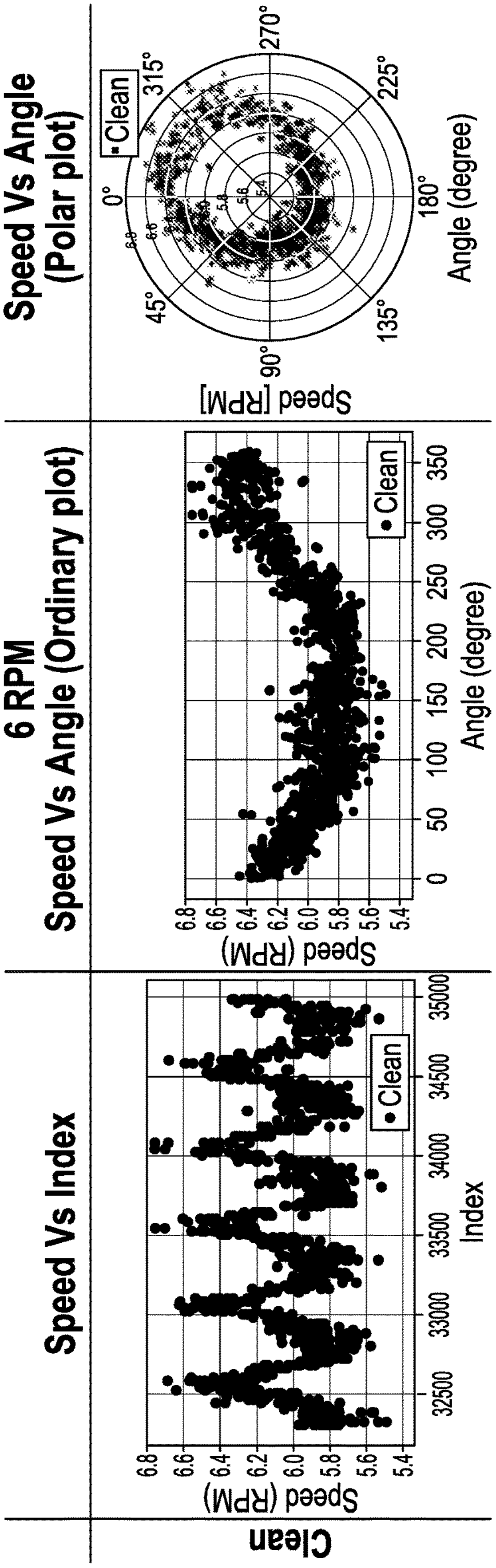
Figure 11:
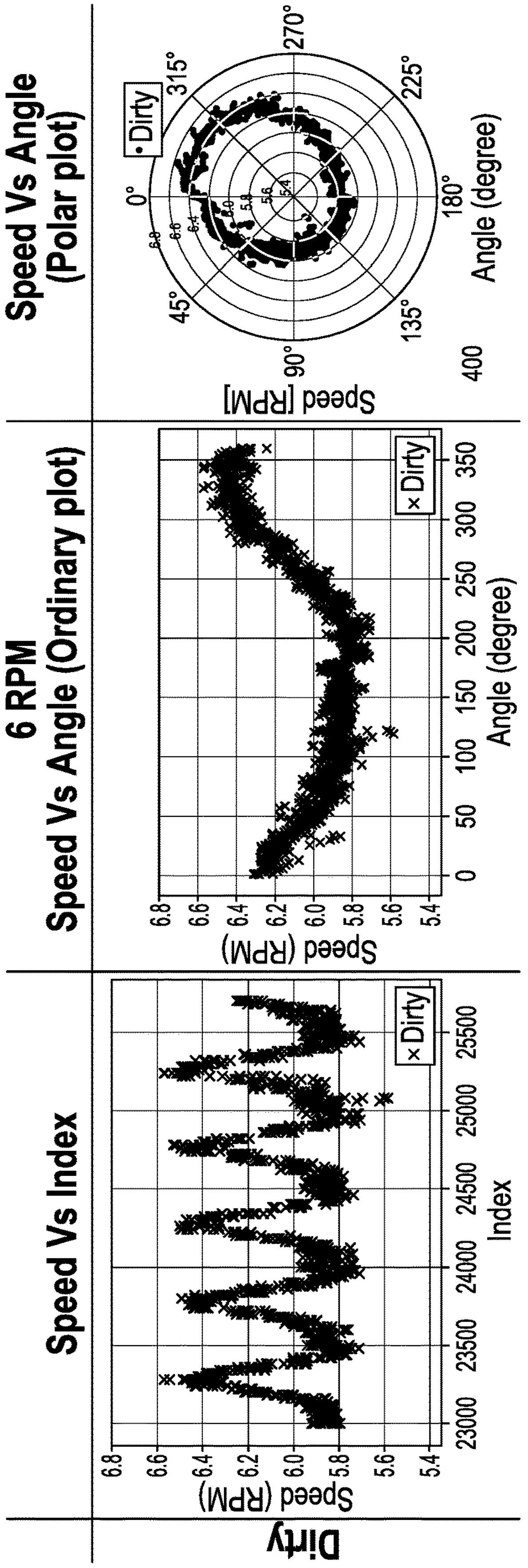
Figure 11I:
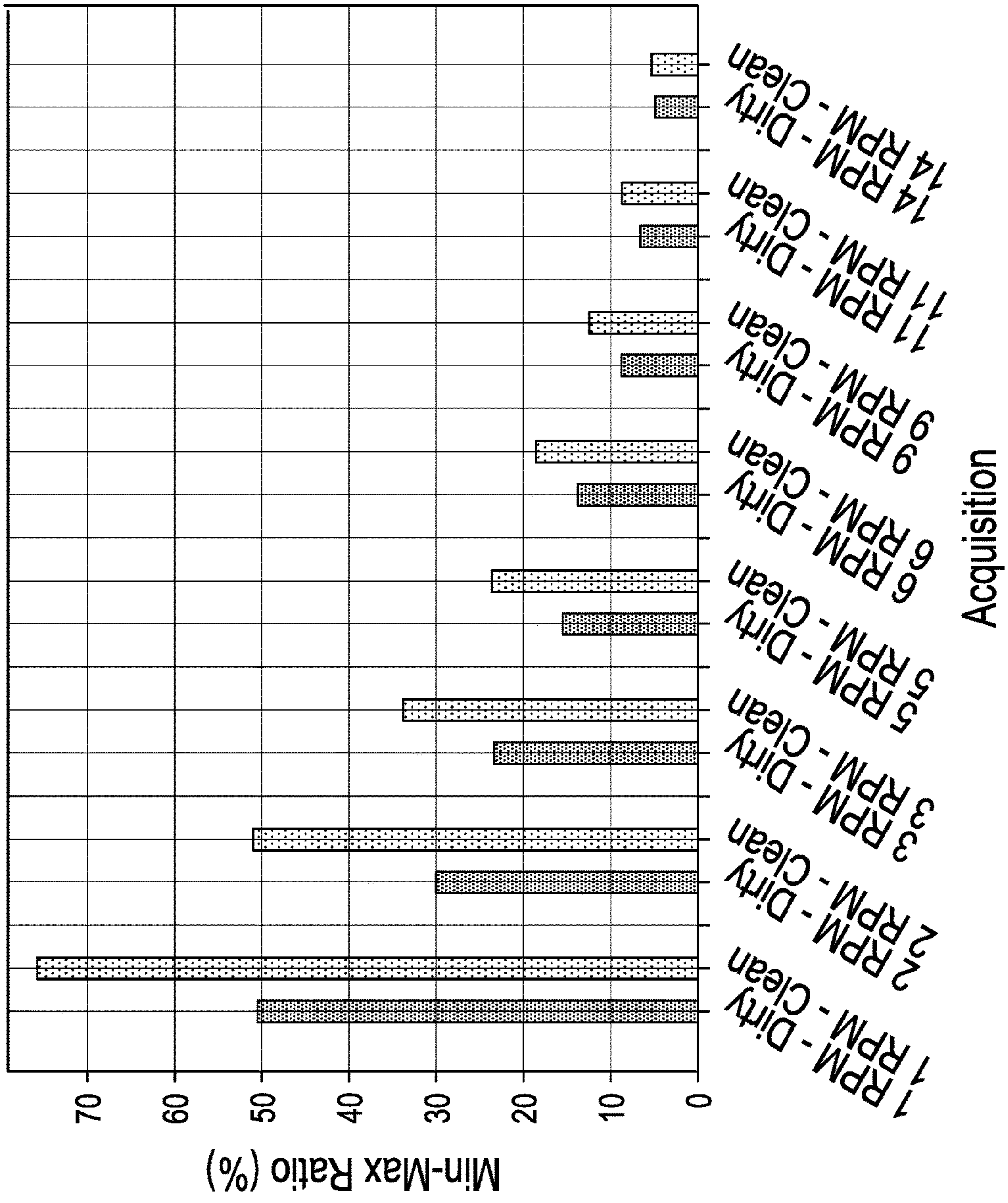
Figure 11K:
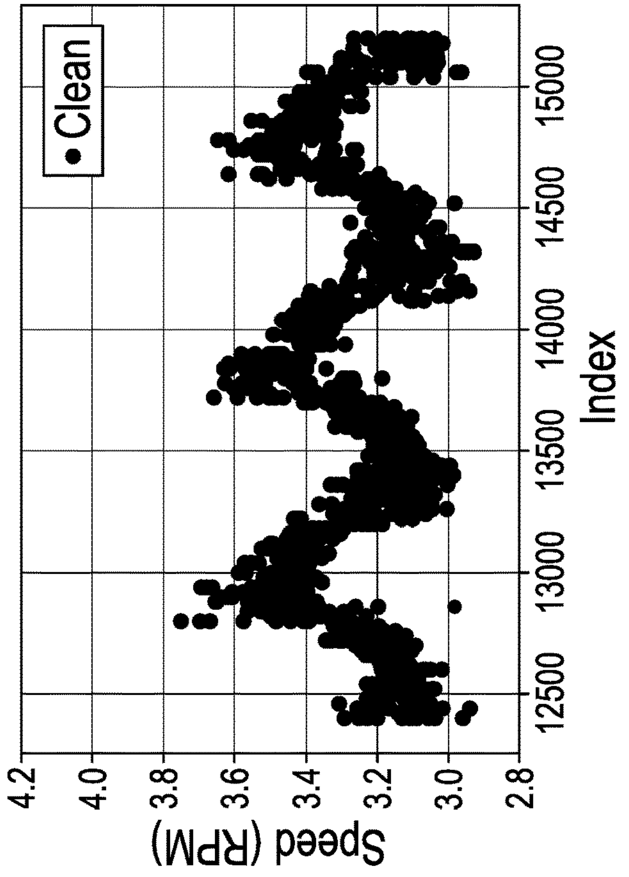
Figure 11L:
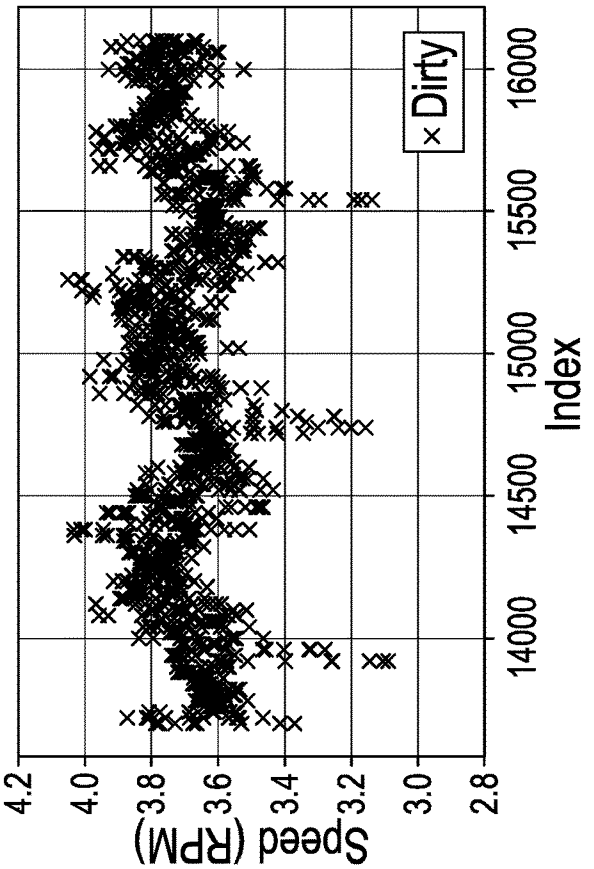
Figure 11M:
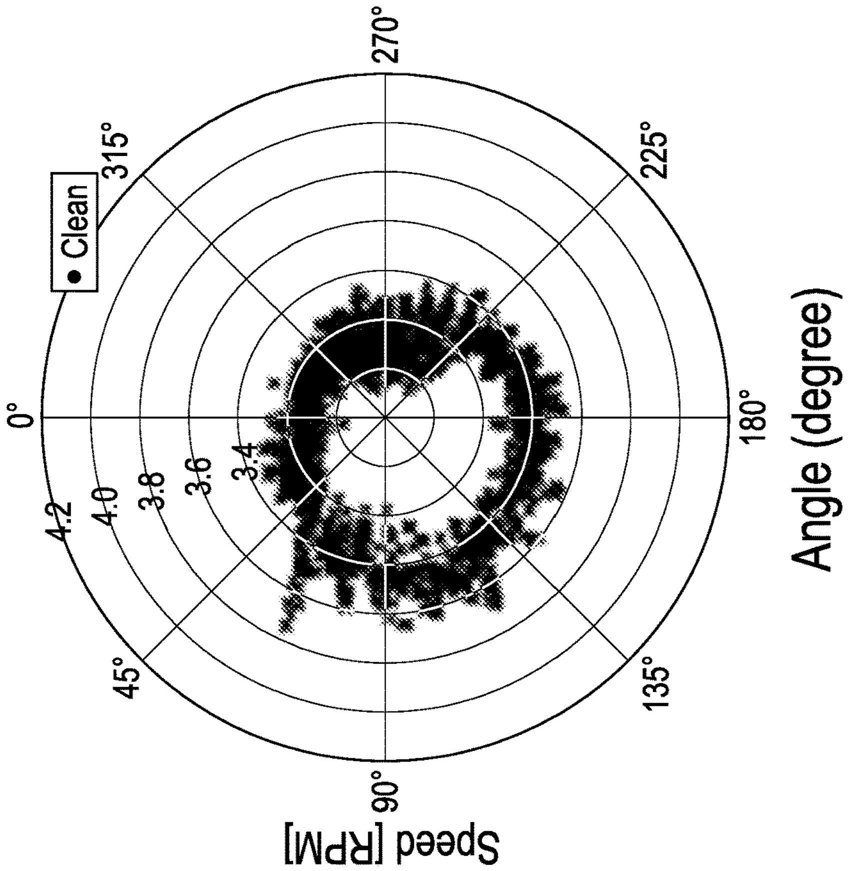
Figure 11N:
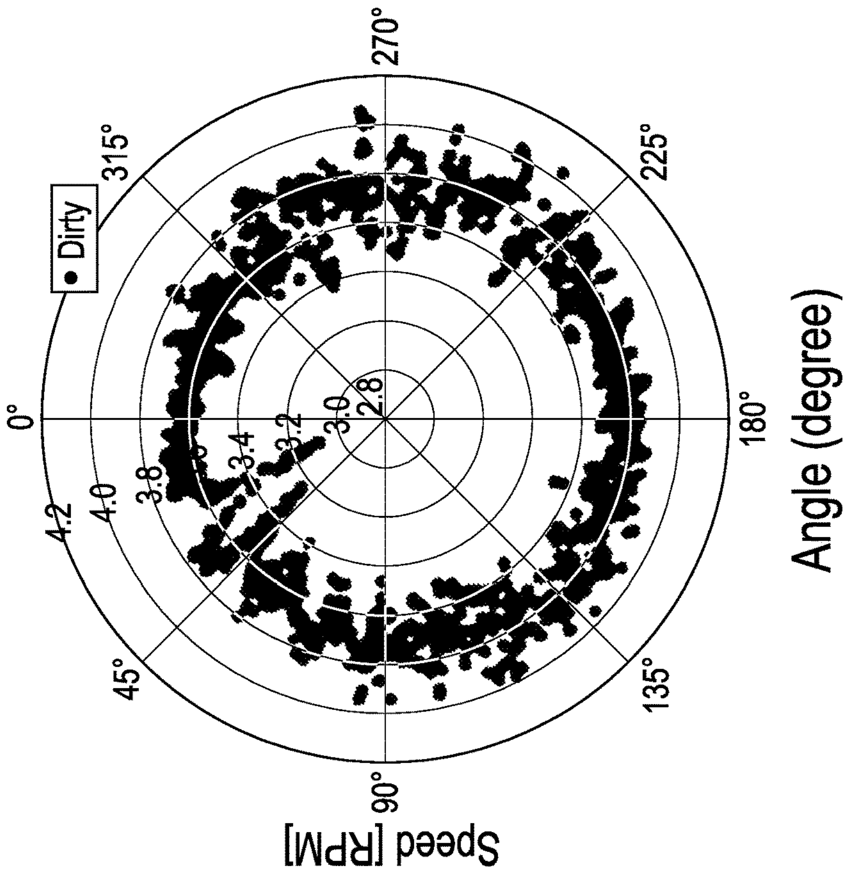
Figure 11D:
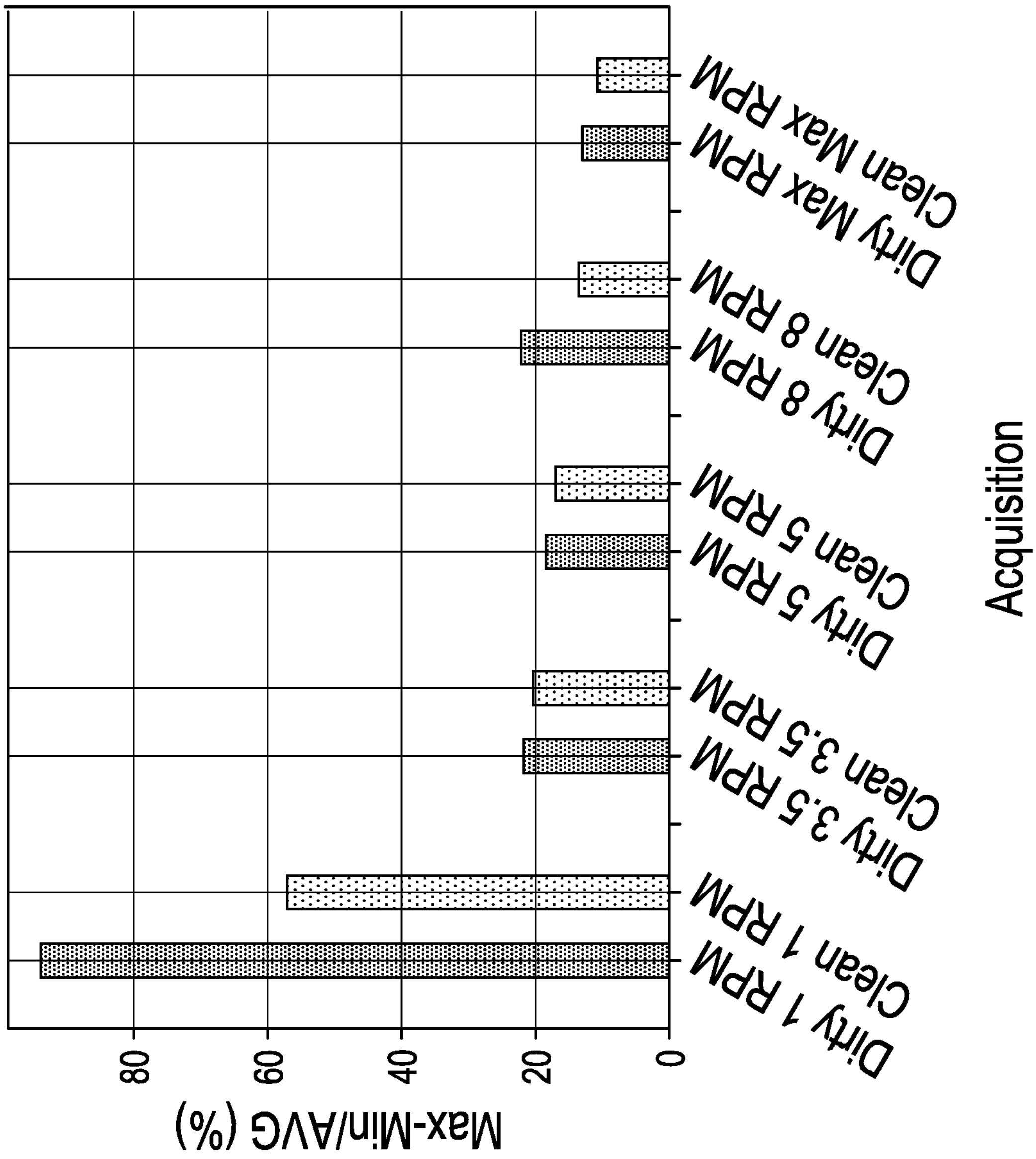

FIG. 11A shows an example of test data sets v(θ) and corresponding truth cleanliness statues with which the data processing engine can be supervisedly trained. FIGS. 11B through 11O illustrate other type of training data sets, including different types of measured values and corresponding truth cleanliness status (e.g., dirty, clean). As depicted, each of the data sets are associated with corresponding truth drum cleanliness statuses thereby allowing the data processing engine to train itself. More specifically, the training data sets shown in FIGS. 11B and 11O were acquired the same day at the same speed (8 RPM) in both clean and dirty situations. It was found that the lowest speed values, and the circumferential positions at which these lowest speed values were reached, can be indicative of the drum cleanliness status. The training data sets shown in FIGS. 11D and 11E were acquired the same day at the same speed (15 RPM) in both clean and dirty situations. As shown, a speed decrease in the drum speed value can be observed at around 50 degrees for the case of the dirty drum. When these drum speed values are plotted in polar plots, such as shown in FIGS. 11F and 11G, the spread (e.g., shape) of the resulting patterns can also be indicative of the drum cleanliness status. Other patterns of drum speed values plotted in different manners for both clean and drum statuses are shown in FIGS. 11H and 11I. The difference between the maximal and minimal speed values can also be indicative of the dirtiness of the drum, as exemplified in FIG. 11J. Other example training data sets are shown in FIG. 11K through FIG. 11O. In some embodiments, the data processing engine is trained using a significant number of such data sets and corresponding truth drum cleanliness statuses such as when a given data set is inputted, the trained data processing engine can output a drum cleanliness status indicative of whether the drum is clean, partially dirty or fully dirty.

It is known to determine whether the drum is clean or dirty based on patterns of drum speed values. An example of such a determination technique is described in at least in U.S. Provisional application Ser. No. 16/916,310, the contents of which are hereby incorporated by reference. For instance, it was found that should the drum be dirty, e.g., with some hardened concrete stuck on the blades, the rotation of the drum 16 would be asymmetric with respect to its rotation axis and therefore the instantaneous drum speed values would not be constant even when driven with a constant torque. Such a behaviour can be interpreted from some of the training data sets described above. One or more additional differences can be calculated for values measured at some values or ranges of circumferential positions. For instance, the determine of whether the drum is dirty or clean may be based on the determination that the drum is empty in the first place. In these embodiments, probe pressure values measured by the rheological probe can be used to that effect. In some other embodiments, the data processing engine can be trained with training data sets pertaining to different drum speed values, fresh concrete compositions, types of drums, ambient temperature and the like. As such, the data processing engine can receive a drum speed value and/or a probe pressure values and use them in its determination.

Example 7—Determining an Air Content Value Using an Acoustic Transducer in the Drum of the Concrete Mixer In some embodiments, such as the one shown in FIG. 12, an acoustic probe assembly is mounted inside the drum of the concrete mixer. As illustrated, the drum 16 is loaded with fresh concrete 12 and rotated with respect to arrows 218. An example of the acoustic probe assembly 200 is shown. The acoustic probe assembly 200 has an acoustic path 209, an acoustic emitter 210 configured to emit an acoustic signal along the acoustic path 209, and at least one acoustic receiver, such as first acoustic receiver 220, configured to receive the acoustic signal after propagation along the acoustic path 209. As shown, the acoustic emitter 210 is spaced from the first acoustic receiver 220 by a spacing distance SD. In some embodiments, the spacing distance SD is 10 cm. The acoustic probe assembly 200 is configured and adapted to generate one or more electromagnetic signal(s) indicative of a duration of time (hereinafter "the duration ΔT") taken by the acoustic signal to travel from the acoustic emitter 210 to the acoustic receiver 220 across a fresh concrete sample 16A handled by the concrete mixer. In this example, the value to be determined by the data processing engine is an air content value indicative of air content of the fresh concrete in the drum. The determination of the air content value can require amplitude values indicative of amplitude of movement of a vibrating membrane of the acoustic emitter 210 when immersed in the fresh concrete. Indeed, the amplitude of vibration of the membrane of the acoustic emitter 210 is affected by the air content of the fresh concrete against which the membrane rests. For any given acquisition, the acoustic emitter can send an acoustic signal at different frequencies (e.g., frequency sweeping between 100 Hz and 1800 Hz with a 25 Hz increment). For each frequency, an accelerometer glued to the membrane of the acoustic emitter measures the amplitude of movement of it. As discussed below, in some embodiments, the acoustic receiver may be optional in embodiments where an accelerometer is affixed to a vibrating membrane of the acoustic emitter.

Figure 13A:
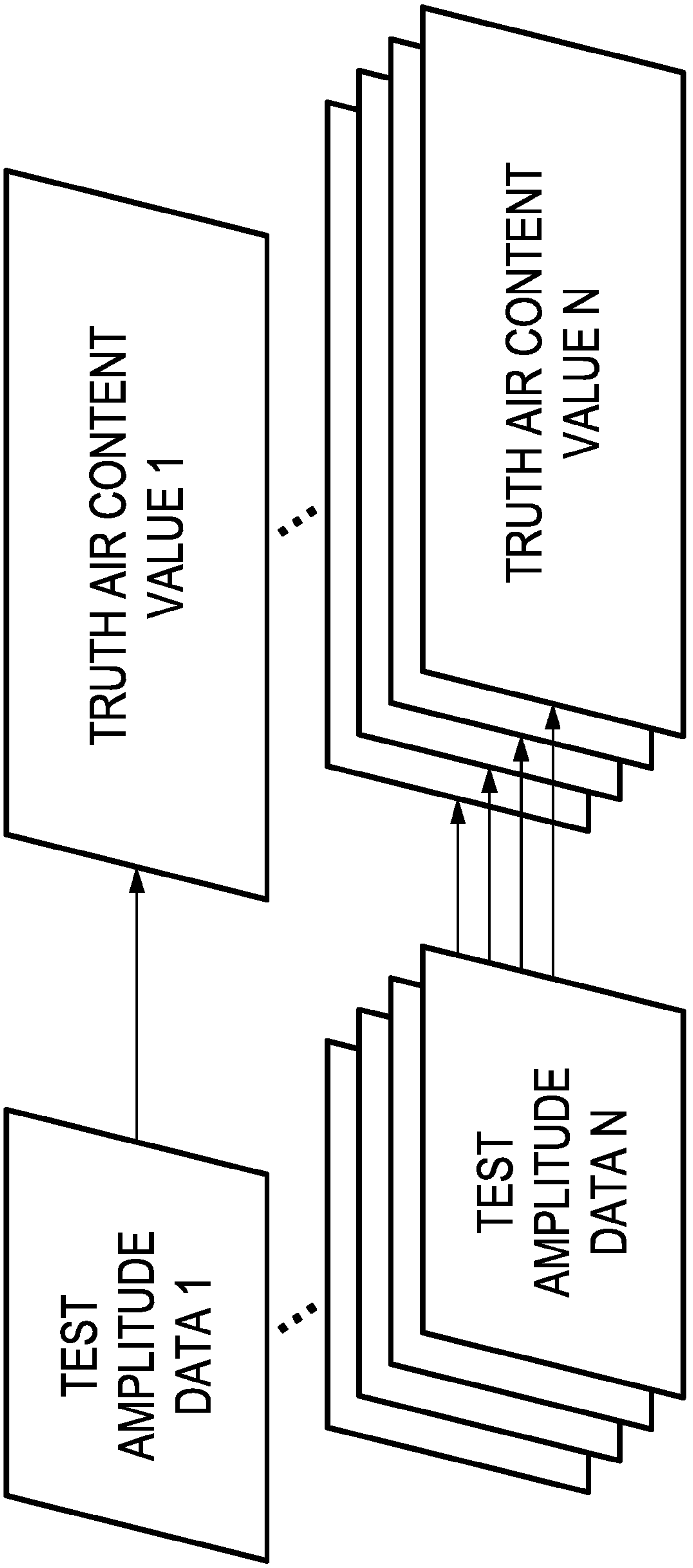
FIG. 13A is a schematic view of exemplary training data sets incorporating test amplitude data and corresponding truth air content values, in accordance with one or more embodiments.
Figure 13B:
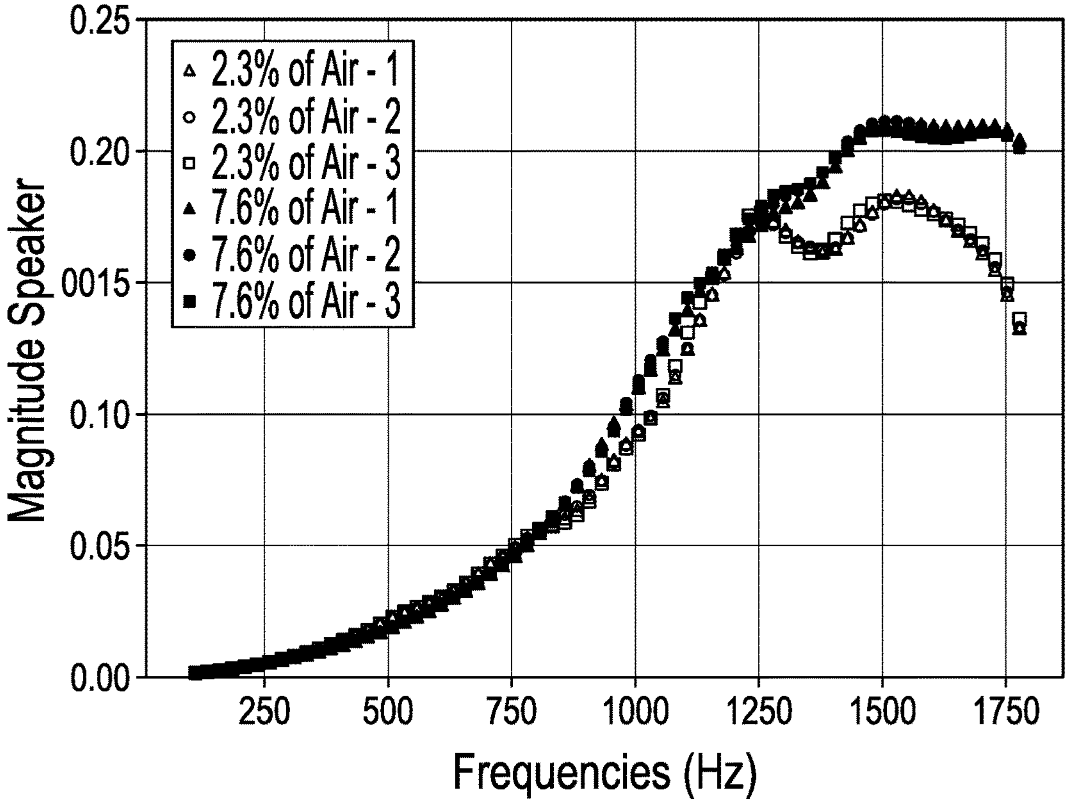
FIGS. 13B to 13L are graphs showing examples of the training data sets of FIG. 13A, in accordance with one or more embodiments.
Figure 13C:
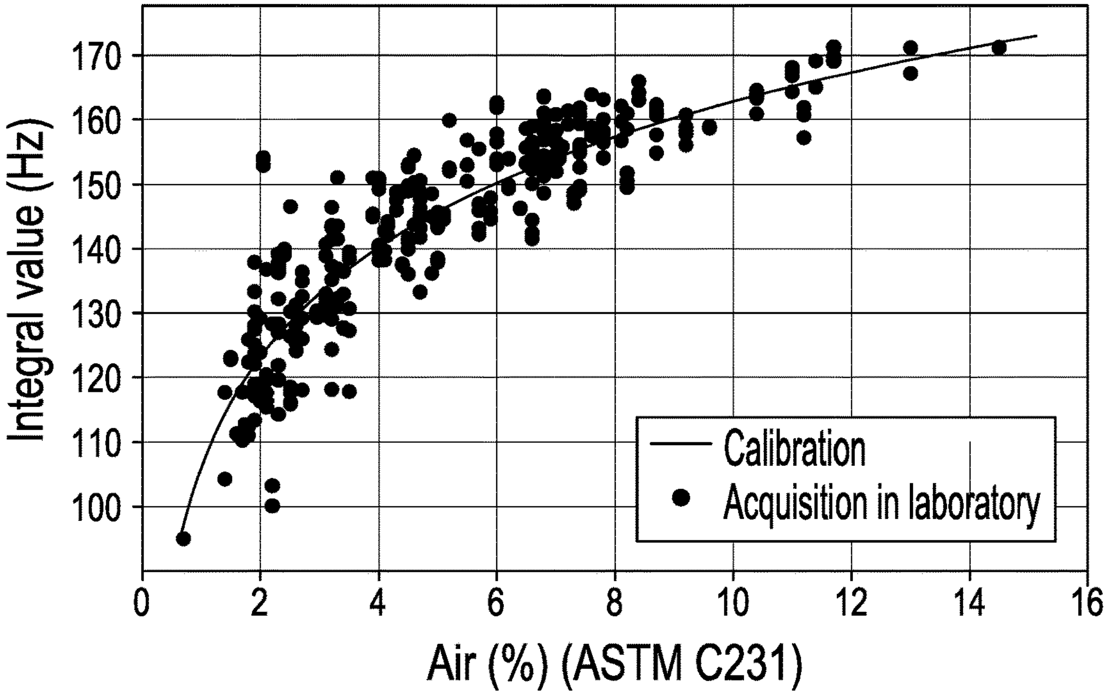
Figure 13D:
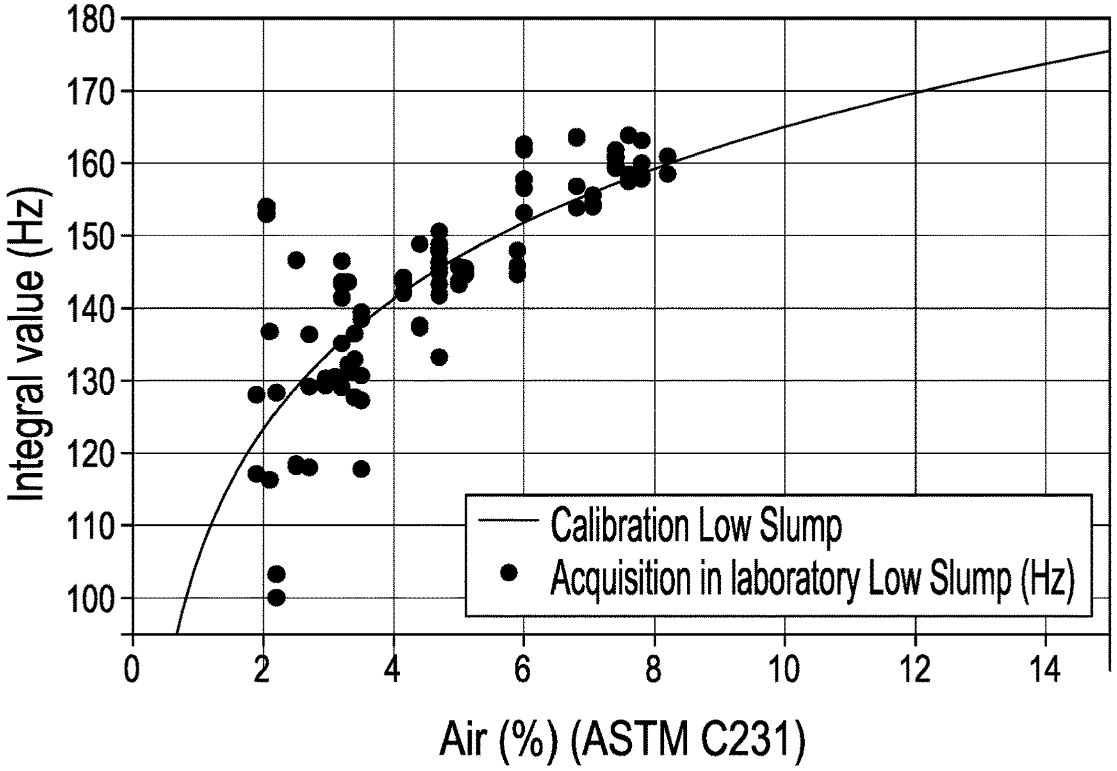
Figure 13E:
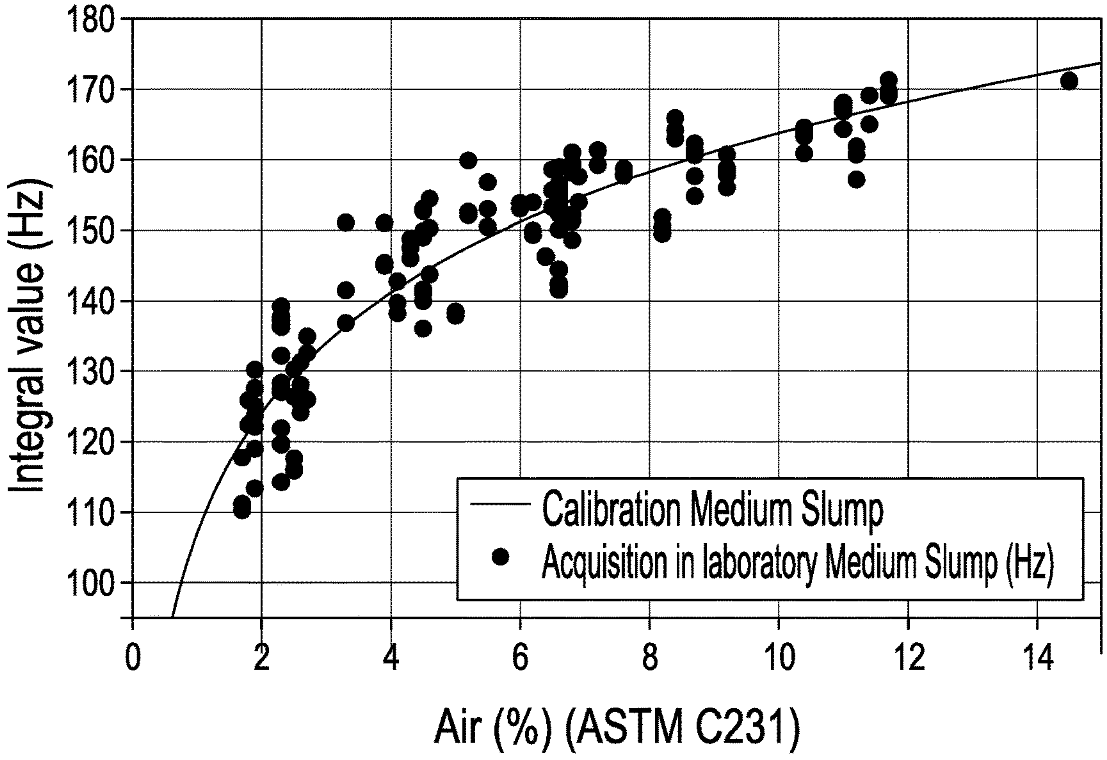
Figure 13F:
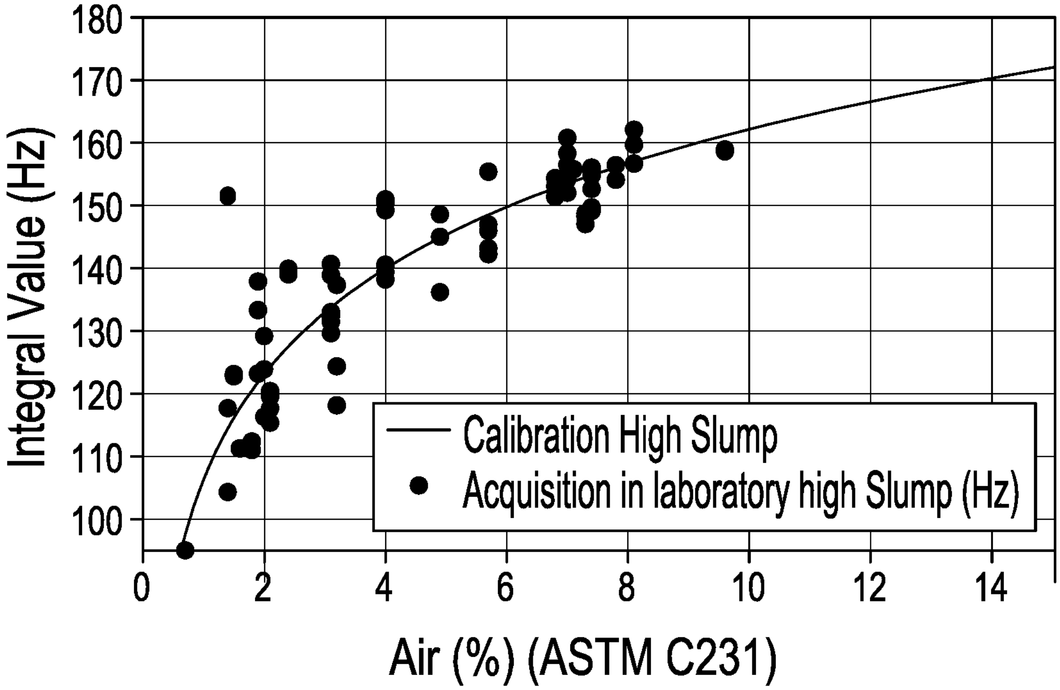

FIG. 13A shows an example of test data sets and corresponding truth air content values with which the data processing engine can be supervisedly trained. FIGS. 13B through 13I illustrate other types of training data sets, including different graphs showing membrane amplitude values as function of frequencies of the corresponding acoustic signal, graphs showing the integral value as a function of air content, and the like. More specifically, FIG. 13B shows test data sets acquired in fresh concrete having a 2.3% of air content and test data sets acquired in fresh concrete having 7.6% of air content. As shown, after about 1250 Hz, the measured amplitude value is higher as air content increases. This correlation has been observed on many tests in laboratory set-ups or ready-mix truck setups. FIG. 13C shows the integral value calculated between 800 Hz and 1800 Hz of the data set shown in FIG. 13B for more than 200 different data sets. The integral value shown in FIG. 13 is known as the magnitude difference. The magnitude difference shows an exponential calibration curve which demonstrates that air content and integral value are correlated in an interesting way. One can notice the variability is significant between each data set, thereby increasing the need for a trained data processing engine which can decipher such data sets to determine air content value in a manner which factors in parameters which can differ from one experiment to another. For instance, one of these parameters which must be considered is slump such as shown in FIGS. 13D, 13E and 13F which plot the above-mentioned integral value as function of air content for fresh concrete samples of low slump values (e.g., 0 to 90 mm), medium slump values (e.g., 90 to 160 mm), high slump value (e.g., 160 to 300 mm), respectively. Curves fitted on each one of these data sets are similar to one another. However, the $R^2$ value of the curve fit is smaller for low slump values. Although not confirmed yet, a low slump value may lead to a low accuracy of measurements with this method. Temperature can be another parameter.

Figure 13G:
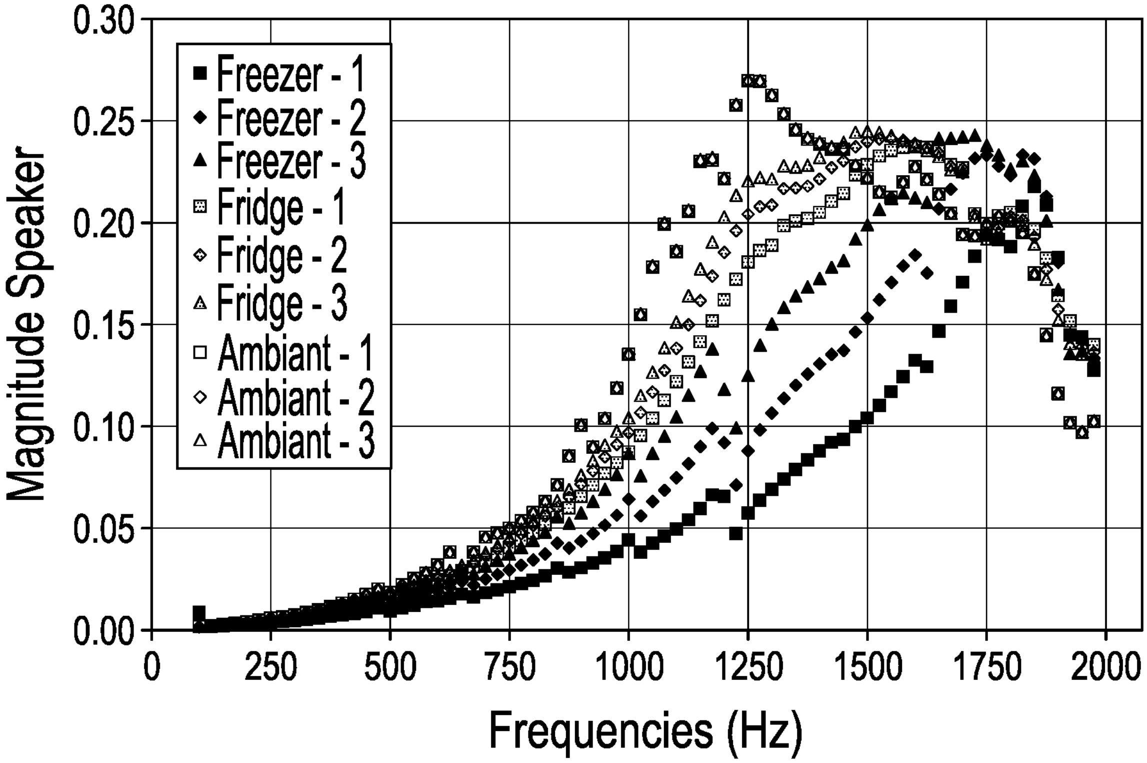
Figure 13H:
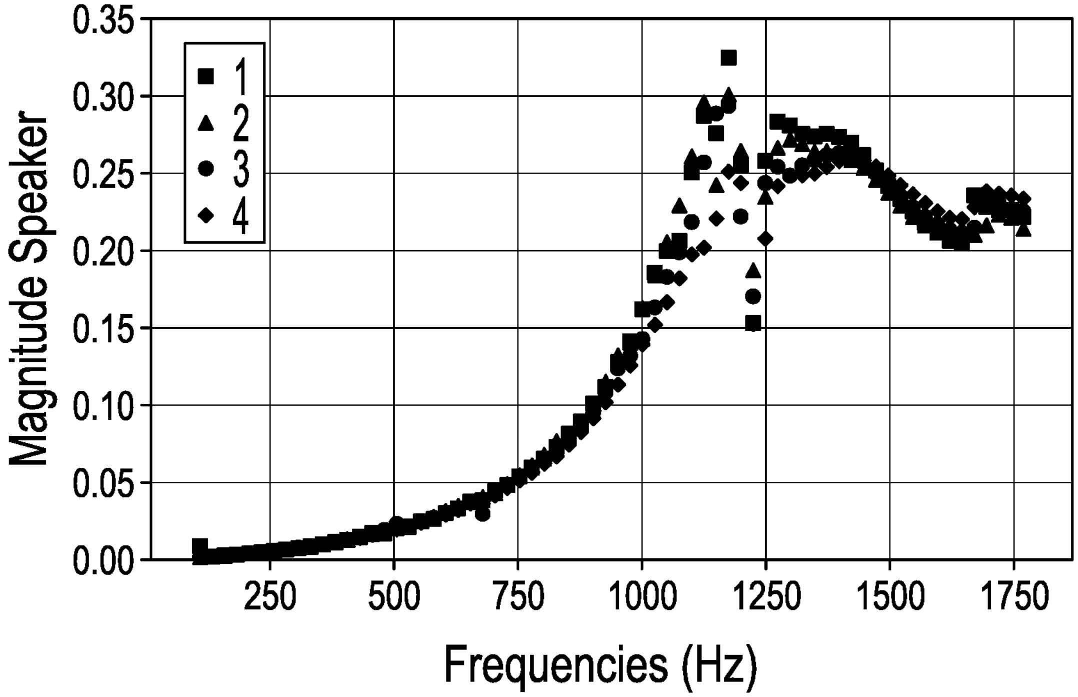
Figure 13I:
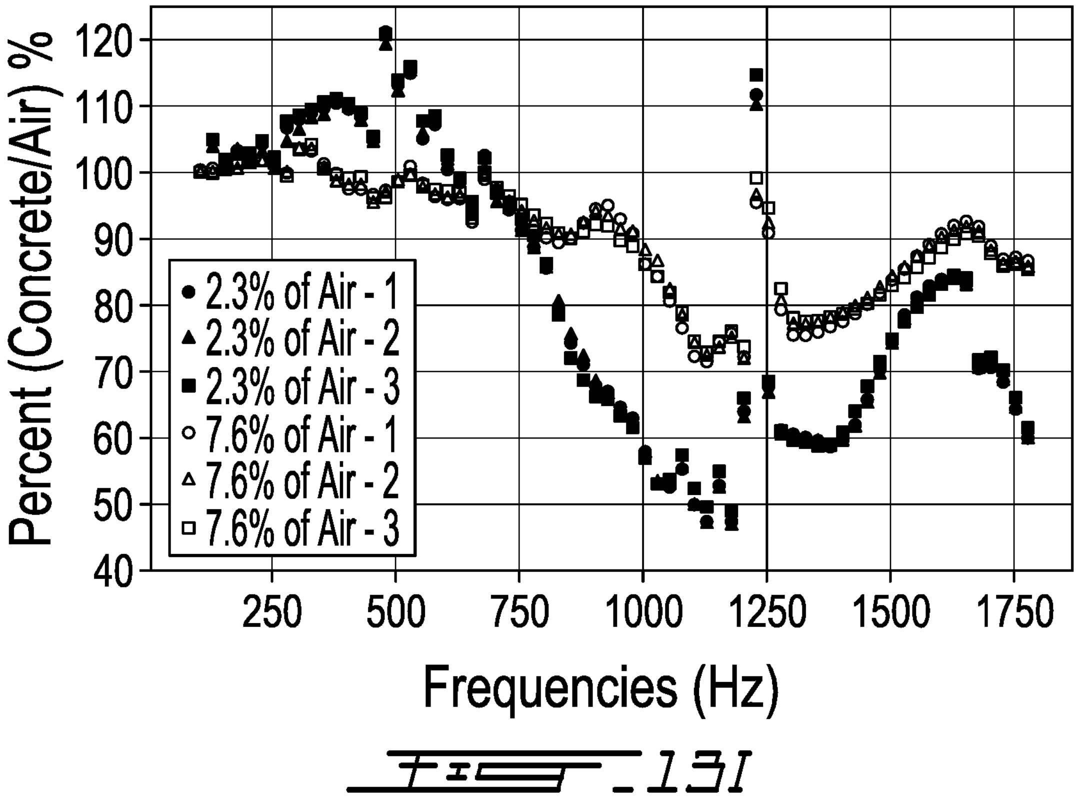

FIG. 13G shows amplitude values of the acoustic emitter membrane as function of frequencies when no fresh concrete is present at ambient temperature (e.g., about 18 degrees Celsius), fridge temperature (e.g., −4 degrees Celsius), and freezer temperature (e.g., −18 degrees Celsius). It is noted that the influence of temperature of the amplitude values and peak position is noticeable. Accordingly, temperature can be an important factor to consider when evaluating the air content of the fresh concrete based on the amplitude of movement of the acoustic emitter membrane. It was also found useful to normalize the amplitude of movement of the acoustic emitter membrane as it moves in fresh concrete with the amplitude of movement of the acoustic emitted membrane as it moves in absence of fresh concrete. FIG. 13H shows the amplitude value of the acoustic emitted membrane as it moves in air. The normalized values are shown in FIG. 13I. Currently, calculation of the integral value may lead to satisfactory results. The calculation of calibration curve allows correct determination of air content which might be improved by having a better understanding of how temperature, slump and other parameters influence the response of the acoustic emitter membrane. Other analyses can be done to make prediction on concrete air content. For example, correlation might be improving by doing the same analysis by choosing another frequency range for integral calculation. Maybe the integral value is not best way to sum up one acquisition with one data. Other parameters of the curves such as peak magnitude, peak localization, minimum/maximum ratio might be suitable for finding a correlation. Moreover, doing an acquisition in air just before the acquisition in fresh concrete help us knowing the current state of the speaker. It adds a lot of information to the data which may help reducing influence of external parameters (temperature particularly). Working on the magnitude ratio presented on FIG. 13I can be suitable. By hand analysis is complex although tests were done in the laboratory with a great control of several parameters. Other parameters may have an influence of the acoustic emitter membrane response including, but not limited to, mix design, height of concrete above the sensor, outside temperature, hardened concrete on the speaker. In addition, a "base response" variability from an acoustic transducer to another might be noticeable in practice. The method to reduce this variability is not fully determined (maybe by doing an acquisition in the air when the speaker is on the top of drum). As can be understood, the data processing engine can be trained using a significant number of such data sets and corresponding truth air content values such as when a given data set is inputted, and some other parameters are known or inputted, the trained data processing engine can output an air content value indicative of air content of the fresh concrete inside the drum in a satisfactory way. Density values could also be determined this way.

Figure 13J:
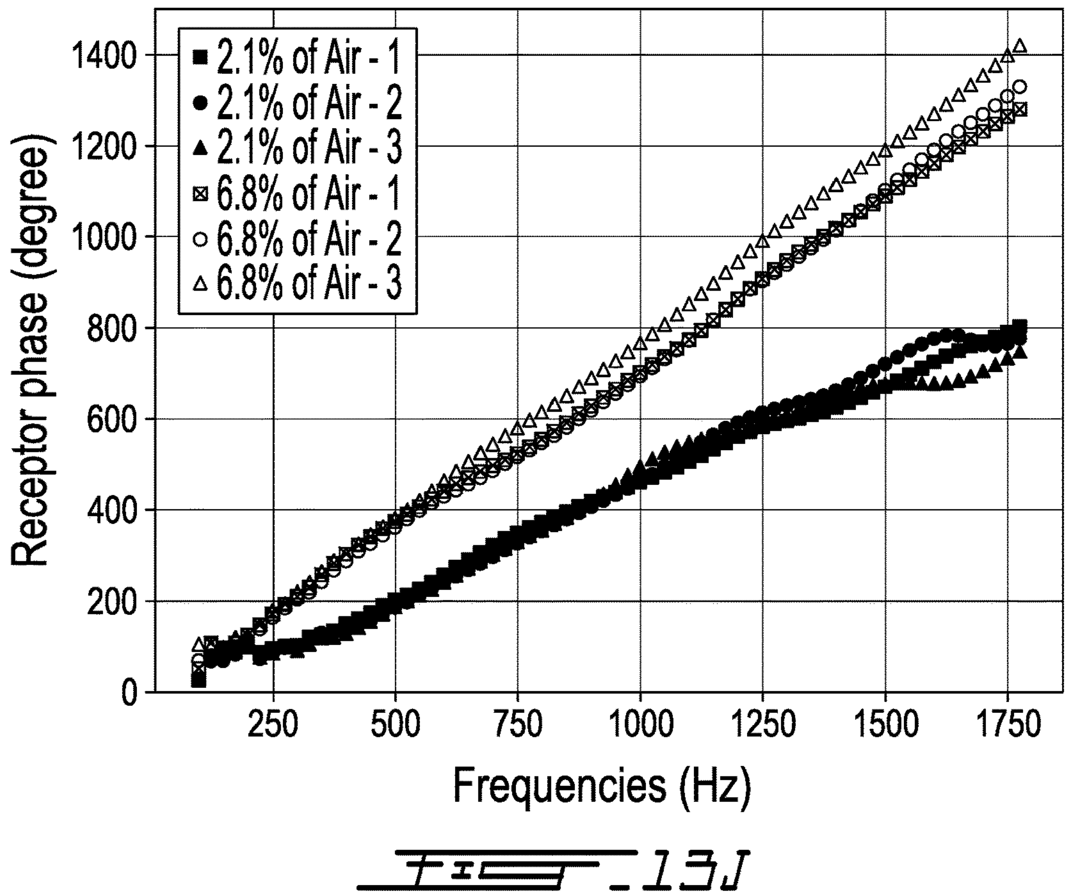
Figure 13K:
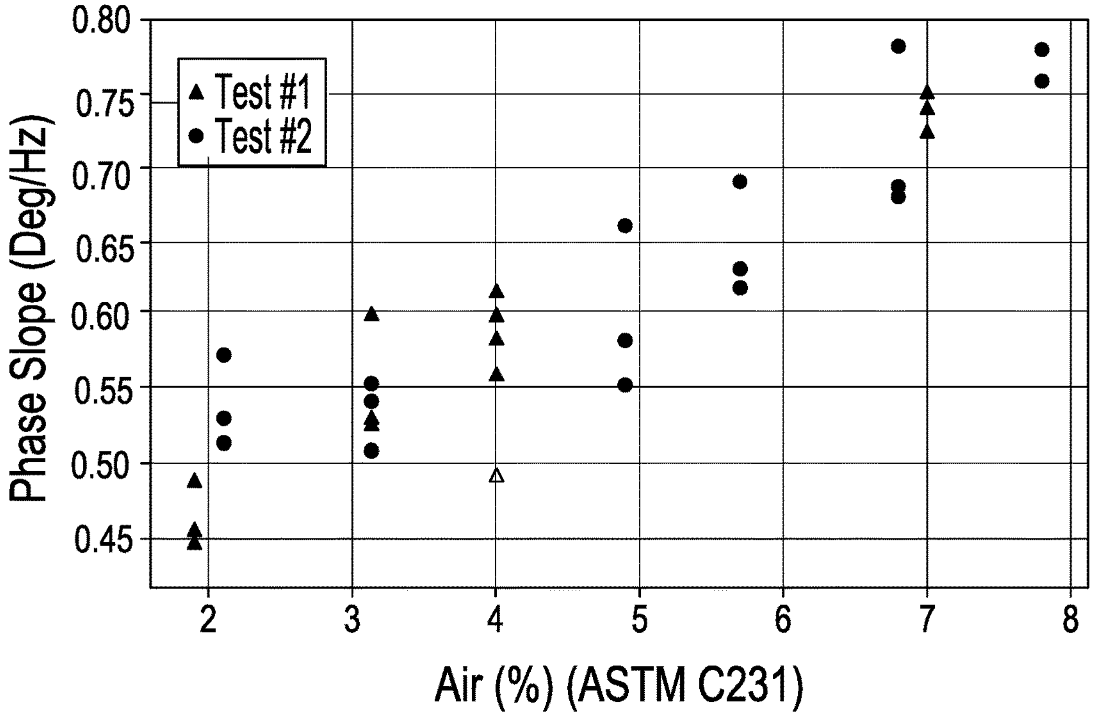
Figure 13:
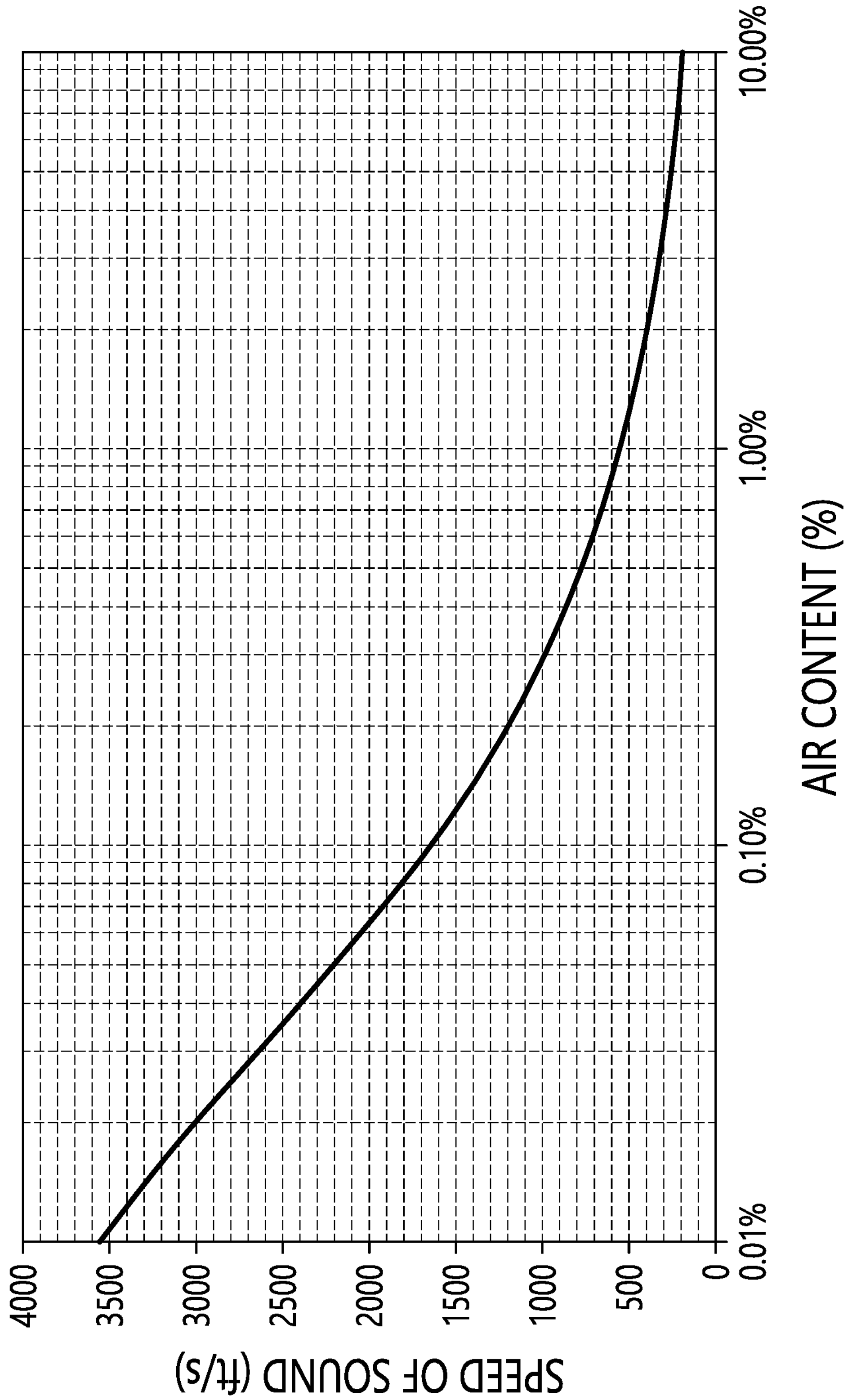

In some embodiments, an acoustic receiver is placed in front of the acoustic emitter. The acoustic receiver can measure a phase for each frequency received. Such a technique can yield training data sets showing the phase of the acoustic signal received as a function of frequency, an example of which being shown in FIG. 13J. Such as the amplitude technique discussed above, the phase slope technique can give acceptable air content results as well. More specifically, FIG. 13K shows slope values indicative of slopes of the phase values varying as function of frequency shown in FIG. 13J. As can be appreciated, a correlation can be determined between the slope values and the air content values. Phase slope is increasing as air content is increasing. This is represented in FIG. 13J with 3 acquisitions in fresh concrete at 1.9% of air and 3 acquisitions in fresh concrete at 6.8% of air. As such, the data processing engine can be trained using a significant number of such data sets and corresponding truth air content values. The training of the data processing engine can best help in identifying which frequency range yields the best air content estimations. In some embodiments, the phase slope technique is performed in addition to the amplitude technique discussed above. As can be appreciated, a trained data processing engine is of interest as a huge amount of data may be collected. One acquisition is a frequency sweep with a lot of information. An acquisition in the air before the acquisition in fresh concrete is doubling the amount of data for one acquisition. In addition, machine learning may help to give a prediction of air content based on a lot of input information such as outside temperature, pressure value of the rheological probe, volume of concrete inside the drum. The trained data processing engine can in a way do all those analyses automatically to find the most suitable to predict air content in any given situations. As the density and air content values are influenced by other parameters, such as slump, mixture composition and temperature, the trained data processing engine can factor in other parameters to enhance the density and/or air content determination.

Other methods involving the acoustic probe assembly such as those described in Published PCT Application No. PCT/EP2017/066658, the contents of which are hereby incorporated by reference, can also be supervisedly learned by the data processing engine.

In some embodiments, the acoustic emitter transmits an acoustic signal across the fresh concrete towards an acoustic receiver facing the acoustic emitter. The acoustic receiver is configured to measure a set of speed of sound values in response to the transmitting. In these embodiments, the controller is typically communicatively coupled to the acoustic emitter and to the acoustic receiver. The controller accesses the set of measurand values generated by the acoustic emitter and receiver, determining a speed of sound value indicative of speed of sound of the acoustic signal propagating through the fresh concrete based on the set of measurand values using a trained data processing engine, and outputting a signal based on said determining. In some embodiments, the signal can be indicative of an air content value indicative of the air content in the fresh concrete across which the acoustic signal has propagated. The trained data processing engine can be trained using a training data set such as the one shown in FIG. 13L. As shown, for any given fresh concrete composition, an air content can be associated to any measured speed of sound. Other training data sets can be used in some other embodiments. The acoustic receiver is not necessarily facing the acoustic emitter in some embodiments, as it can also be adjacent thereto. In such embodiments, the acoustic receiver can measure acoustic signal reflected by the fresh concrete facing the acoustic receiver.

Figure 14:
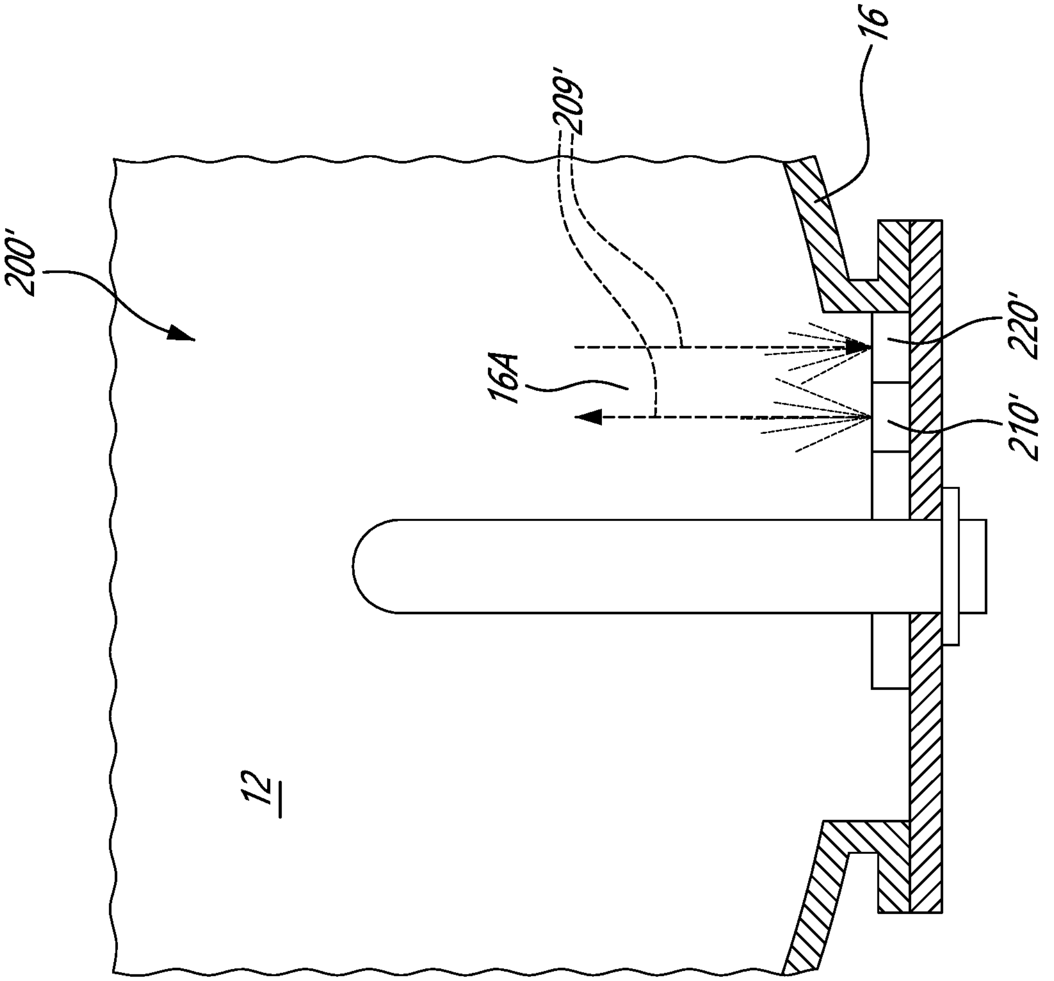
FIG. 14 is a sectional and fragmented view of a drum of a concrete mixer truck, showing a high energy photon probe assembly mounted therein, in accordance with one or more embodiments.

Example 8—Determining an Air Content Value Using a High-Energy Photon Probing Assembly 200' in the Drum of the Concrete Mixer In some embodiments, such as the one shown in FIG. 14, a high-energy photon probing assembly 200' is mounted inside the drum 16 of the concrete mixer. As shown, the high-energy photon probing assembly 200' is mounted to an interior wall of the drum 16. However, in some other embodiments, the high-energy photon probing assembly 200' can be mounted elsewhere relative to the drum 16. For instance, the high-energy photon probing assembly 200' can be mounted proximate to the discharge chute. It is intended that some parts of the high energy photon probing assembly 200' can be mounted inside the drum 16 whereas some other parts of the high energy photon probing assembly 200' can be mounted outside the drum 16, depending on the embodiment. During use, the high-energy photon source 210' emits high energy photons towards the photon path 209' at least when the photon path 209' is immersed in the fresh concrete 12. The emission can occur as the drum 16 rotates or then the drum 16 is immobile, with the photon path 209' being immersed in the fresh concrete 12. Then, the photon detector 220' counts high energy photons received from the photon path 209' at least during a given period of time. The photon detector 220' then generates one or more signal indicative of a number of counted events during the given period of time. The number of counted events N can be determined based on the signal(s) generated by the photon detector 220'. As mentioned above, the number of counted events N can either be received directly from the signal(s) or calculated from the signal(s).

Figure 15A:
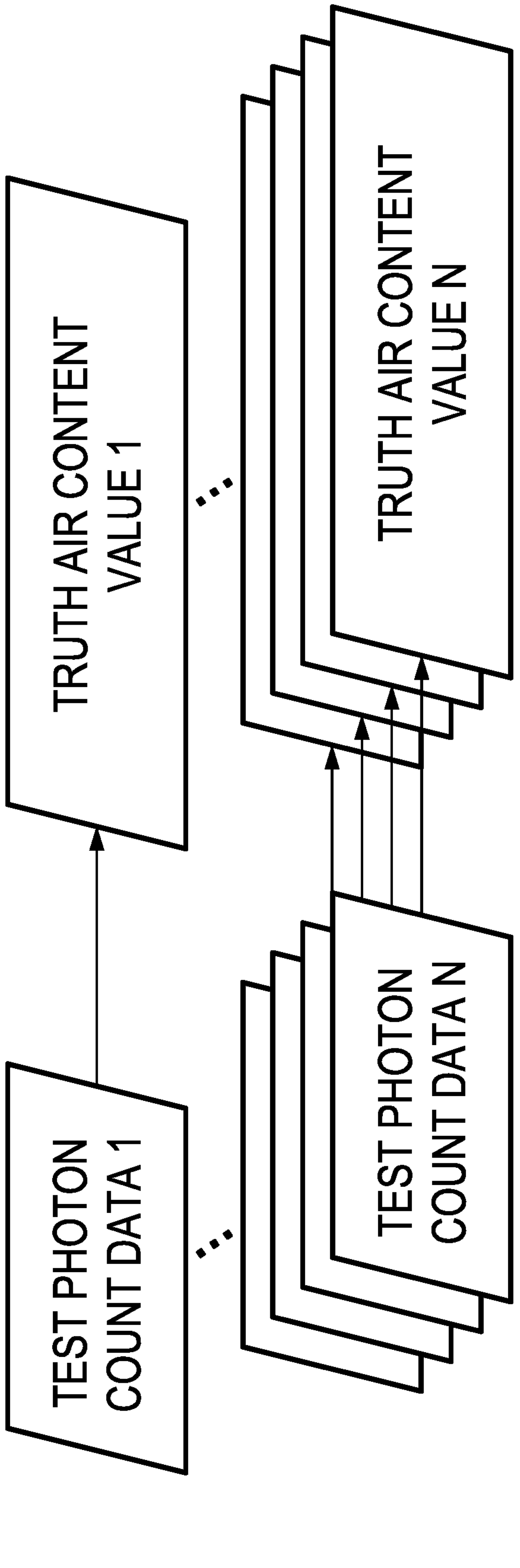
FIG. 15A is a schematic view of exemplary training data sets incorporating test photon count data and corresponding truth air content values, in accordance with one or more embodiments.
Figure 15B:
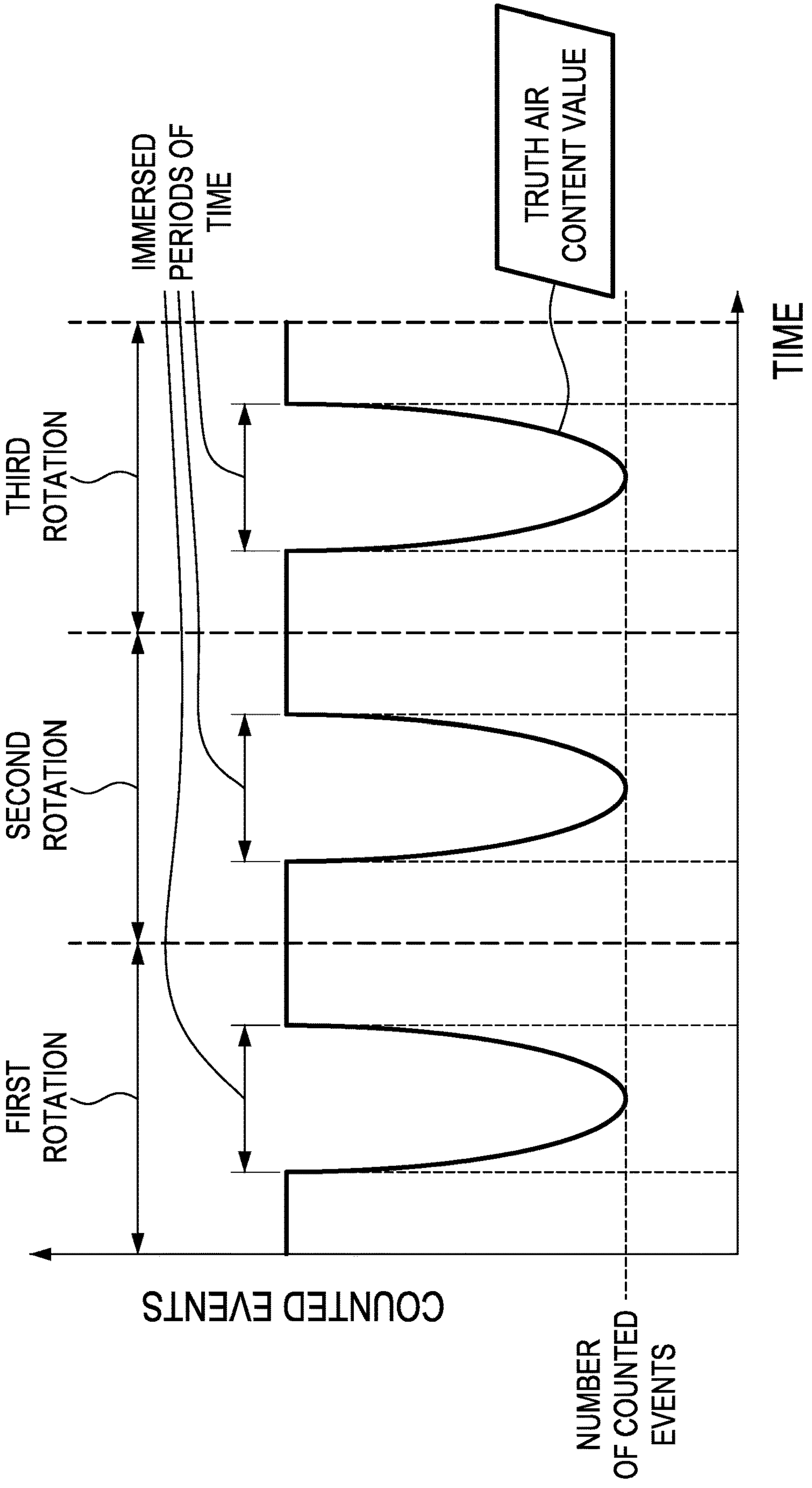
FIG. 15B is a graph showing an example of the training data sets of FIG. 15A, in accordance with one or more embodiments.

It is known that the air content value AC can be determined based on the generated signal and on reference data. An example of such a determination technique is described in International Patent Application No. PCT/US2020/025890, the contents of which are hereby incorporated by reference. In this specific example, the air content value can be determined by finding patterns in the number of counted events N, and/or energy carried by each of the detected photons. The data processing engine can be trained to recognize these patterns using training data sets. FIG. 15A shows an example of a training data set, incorporating a test photon count data and a corresponding truth air content value. FIG. 15B shows an example of such a training data set. One or more additional deviation can be calculated for other ranges of circumferential positions, e.g., following entry of the rheological probe in the fresh concrete, just before the exit of the rheological probe out of the fresh concrete. In some other embodiments, the data processing engine can be trained with training data sets pertaining to different drum speed values, fresh concrete compositions, fresh concrete temperature and the like. As such, the data processing engine can receive a drum speed value and use it in its density determination. Other properties of the fresh concrete can also be used in the determination including, but not limited to, an air content value indicative of air content of the fresh concrete, and the like. The data processing engine can be trained using unsupervised learning in some other embodiments.

Figure 17:
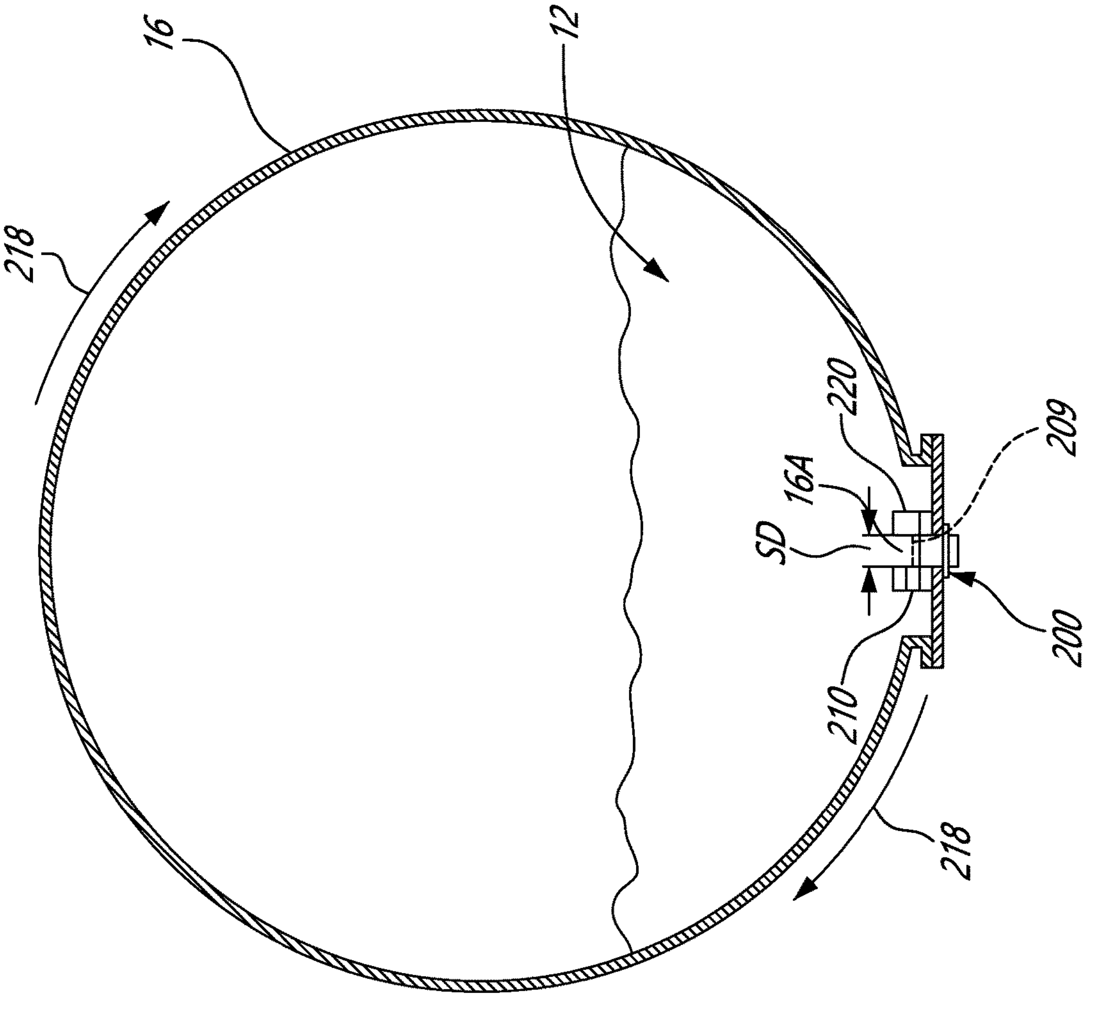
FIG. 17 is a schematic view of exemplary training data sets incorporating test compounded sensor data and corresponding truth value(s), status(es) and alert(s), in accordance with one or more embodiments.
Figure 16:
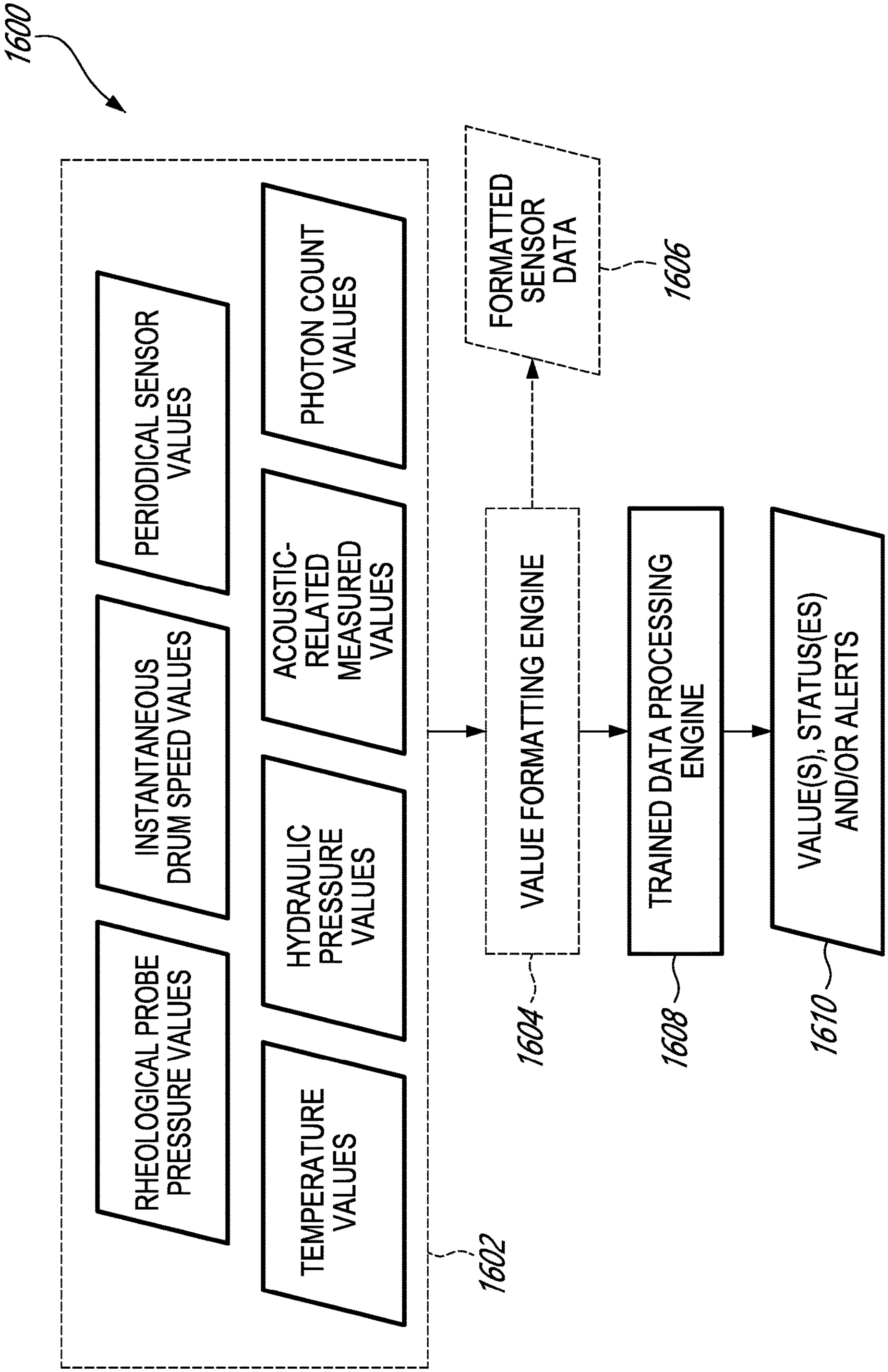
FIG. 16 is a schematic view of another example of a software application of the controller of FIG. 1, showing multiple sensor data inputs, in accordance with one or more embodiments.
Figure 17:
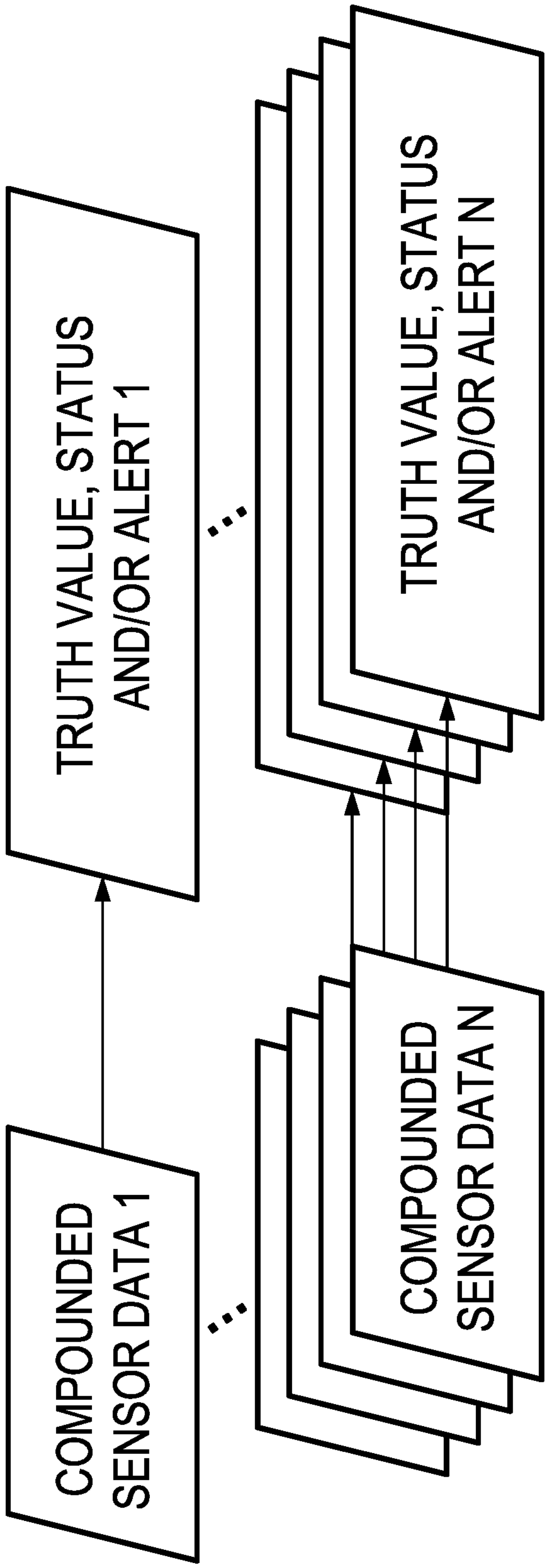

Example 9—Determining Properties and Generating Alerts Using Data Sets Incoming from Multiple Sensors FIG. 16 shows an example of the software application 1600 that can be executed by the computing device described above. As shown, the software application 1600 can receive one or more sets of sensor data 1602 including, but not limited to, probe pressure values, drum speed values, periodical sensor values, temperature values, hydraulic pressure values, acoustic-related measured values, photon count values, and the like. In some embodiments, the sensor data have been measured during a portion of a drum rotation, however, in some other embodiments the sensor data 1602 have been measured during more than one drum rotation. The sensor data can be received directly from the corresponding sensors or from an accessible memory system, depending on the embodiment. In some embodiments, the software application 1600 has a value formatting engine 1604 which when the probe pressure values are not suitably formatted outputs formatted values 1606 for subsequent processing and/or storing. As depicted, the software application 1600 has a trained data processing engine 1608 which receives directly or indirectly the raw probe pressure values 1602 and/or the formatted sensor data 1606. The trained data processing engine 1608 is configured to access the sensors data 1602, to perform at least one of determining a property value indicative of a property of the fresh concrete based on the set of probe pressure values and determining that the set of probe pressure values is indicative of abnormal fresh concrete conditions, and to output a signal based on the determination step(s). In some embodiments, the outputted signal is indicative of the determined property value 1610. Additionally or alternatively, the outputted signal is indicative of an alert 1610 when the sensor data 1602 stray away from expected sensor data. In some instances, the alert 1610 can indicate that it was determined that the set of sensor data 1610 is indicative of abnormal fresh concrete conditions. In some embodiments, the alert 1610 is transmitted to an external network. In some other embodiments, the alert 1610 is stored in an accessible memory system for subsequent consultation, e.g., for maintenance purposes. FIG. 17 shows an example of training data sets with which the data processing engine can be supervisedly trained. More specifically, the training data sets can include a number of test compounded sensor data sets and corresponding truth value (s), status(es) and alert(s).

With the increasing number of sensors mounted on mobile equipment such as concrete ready-mix trucks, there are possibilities to integrate the reading of many sensors (as opposed to few ones) to evaluate certain properties such as rheological properties. Also, for other properties such as density or air content, one way to get a precise evaluation is to take care of many parameters. Defining and building the calibration curves for such sensors to take into account all available parameters can be a major challenge. As discussed herein, using a trained data processing engine processing a significant number of data sets to output a calibration curve or a measurement can be highly beneficial. In some embodiments, the trained data processing engine use statistical tools that can be used to isolate the relevant information such as Principal Component Analysis (PCA). In some embodiments, the trained data processing engine involves is trained using a neural network using all existing available data and generate a calibration model. In some embodiments, the trained data processing engine relies on sensors to give simple yes/no classification answer (e.g., is air content value more than 5%, yes or no?) instead of a numeric value. In some embodiments, the trained data processing engine is trained to classify the properties of the fresh concrete which can be easier in some cases and may still provide valuable insight in applications that are more complex, such as the determination of the air content. In some embodiments, the trained data processing engine can detect events during the operation of the concrete mixer truck. For instance, examples of such events include detecting that the drum is empty, detecting that the ingredients are properly mixed, determining that the drum is clean, etc. In some embodiments, the trained data processing engine detects anomalies that might indicate that a maintenance is required. Broad examples of anomalies are drum rotation speed becoming irregular due to a failing hydraulic pump, failing bearings, dirty drum, etc. All those numeric values can be inputted in a first layer of a neural network. That layer then performs linear or non-linear combinations of the inputs using a set of "weight coefficients". Each output of that layer is such a combination, and that layer can have as many outputs a required. This process is repeated for a few layers up to a point that, if all the "weight coefficients" are properly set, then the outputs are classified. One for a 0 mm slump, one for a 10 mm slump, etc. Ideally, for a given set of input data all the output will have near zero values except for the one or two outputs that are the closest to the actual slump. That is known as a classification network. It is still then possible to add a final (weighted sum, center of mass) merge layer that will provide a single numerical value of the slump. That is known as a regression network. The question is how to set all the "weight coefficients" to get the network to provide meaningful results. In a typical machine learning scenario a very large set of input raw data (pressure patterns, temperature, speed) and corresponding labels are required. This is referred to as training data sets above. The machine learning training process can consist of inputting each available raw datum in the network, compare its outputs with the expected known output, adjust the weights coefficients according if the network yielded the right or wrong answer. This process is repeated iteratively with all the available data until the network reliably gives the expected output. This is a very CPU intensive algorithm and a large database is required. Most important is that a labelled database is required. However, once the weight coefficients are known, the resulting neural network model can be embedded in a small processor. For this example, if the initial labelled database is large enough to cover most common concrete mixes in various conditions, then there is a good chance that the neural network can be successfully trained (to correctly re-identify the training data set), and most important, to correctly identify the new and slightly different patterns in real world usage even if they do not exactly match the training data set. Emphasis must be made on the availability of a large labelled data set for successful training. In some embodiments, large databases of lab trials can be accessed for which the concrete properties (slump, air content, . . . ) have already been measured by other means (raw data+labels). In some embodiments, the truck sensors and the in-drum sensors (pressure, air-content transducer, speed sensor) can send their data in a cloud network and in a central database to continuously provide new raw data. In some embodiments, the concrete properties can be measured by manual techniques (field technicians) and those results can be inserted in the database to label truth values. In some embodiments, an alternate sensor can provide the label (e.g., for a new drum rotation sensor based on hydraulic pressure pump patterns an externally mounted drum rotation sensor can be installed) to continuously acquire new truth data. In some embodiments, neural networks can be created and trained based on that training data sets. In some embodiments, the trained data processing engine and corresponding neural network models can be used either on the truck to display information to the driver directly from the sensor data, in the sensor themselves to take decisions and change their operation mode, and in the central operation center to give information to the managers. In some embodiments, all the neural networks can be regularly updated when new data become available and is properly labelled (manually or automatically when possible).

As can be understood, the examples described above and illustrated are intended to be exemplary only. For instance, the training of the data processing engine can involve a number of data processing techniques including, but not limited to, artificial intelligence, machine learning, neural networks, classification networks, regression networks, statistical analysis, principal component analysis, raw data analysis, labelled data analysis, supervised learning, unsupervised learning, calibration techniques, data drift analysis, anomaly detection, human in the loop engines, human out of the loop engines, cloud computing, edge computing and the like. The scope is indicated by the appended claims.

What is claimed is:

1. A method for monitoring fresh concrete being handled in a drum of concrete mixer, the method comprising:

establishing a wireless communication link between a first controller remotely positioned relative to the concrete mixer and a second controller coupled to a sensor associated with the concrete mixer;

the first controller having a processor and a non-transitory memory having stored thereon instructions that when executed by the processor perform the steps of:

the first controller receiving, from the second controller via the wireless communication link, a set of measurand values generated by the sensor, the measurand values being associated with at least one of the fresh concrete, the drum and components of the concrete mixer;

using a trained data processing engine stored on the non-transitory memory, the first controller at least one of determining a property value indicative of a property of the fresh concrete, determining a parameter value indicative of a parameter of the drum, and determining that the set of measurand values are indicative of operating conditions of the concrete mixer; and the first controller transmitting a signal indicative of said determining to the second controller, the second controller displaying, on a display interface coupled thereto, at least one of said property value, said parameter value and said operating conditions based on said signal;

wherein, using a value formatting engine stored on the non-transitory memory of the first controller or on a non-transitory memory of the second controller, reformatting the measurand values of the set upon determination that a format of the measurand values of the set is unsatisfactory.

2. The method of claim 1 wherein the property is a property selected in a group consisting of: viscosity, yield, slump, density and air content.

3. The method of claim 1 wherein the parameter is selected in a group consisting of: drum cleanliness and drum speed.

4. The method of claim 1 wherein said determining includes determining that the set of measurand values are indicative of abnormal operating conditions of at least one of the sensor, the drum and the concrete mixer.

5. The method of claim 1, wherein said transmitting the signal includes transmitting the signal from the first controller to the second controller via the wireless communication link.

6. The method of claim 1, wherein said determining is performed at a first moment in time, and said transmitting the signal is performed at a second moment in time later than the first moment in time.

7. The method of claim 1, wherein set of measurand values includes a set of probe pressure values indicative of pressure exerted on a rheological probe by the fresh concrete as the drum rotates.

8. The method of claim 1, wherein the set of measurand values includes a set of drum speed values indicative of a rotation speed of the drum as measured by a drum speed sensor associated with the concrete mixer, said determining being further based on said set of drum speed values.

9. The method of claim 1, wherein the set of measurand values includes a set of hydraulic pressure values indicative of pressure exerted on a hydraulic fluid used to drive rotation of the drum as measured by a hydraulic pressure sensor associated with the concrete mixer, said determining being further based on said set of hydraulic pressure values.

10. The method of claim 1, wherein the set of measurand values includes a set of temperature values indicative of temperature of the fresh concrete inside the drum as measured by a temperature sensor associated with the concrete mixer, said determining being further based on said set of temperature values.

11. The method of claim 1, wherein said determining is further based on a data set measured by at least another sensor.

12. The method of claim 1, wherein the trained data processing engine is configured to associate property values to corresponding measurand values.

13. The method of claim 1, further comprising generating an alert upon comparing the determined property value of the fresh concrete to a corresponding property value threshold, the alert being indicative of abnormal operating conditions.

14. The method of claim 13, wherein said generating includes at least one of transmitting the alert to an external network and storing the alert in an accessible memory system.

15. The method of claim 13, further comprising triggering maintenance of at least one of the sensor, the drum and the concrete mixer based on the alert.

16. The method of claim 1, wherein said determining performed by the first controller further involves executing at least one of: one or more artificial neural network(s), one or more support vector machine(s), one or more capsule-based network(s), one or more linear discriminant analysis module(s), and one or more classification tree module(s).

* * * * *